US008503869B2

(12) United States Patent
Nakamura et al.

(10) Patent No.: US 8,503,869 B2
(45) Date of Patent: Aug. 6, 2013

(54) STEREOSCOPIC VIDEO PLAYBACK DEVICE AND STEREOSCOPIC VIDEO DISPLAY DEVICE

(75) Inventors: Tomonori Nakamura, Osaka (JP); Germano Leichsenring, Osaka (JP); Tomokazu Kanamaru, Osaka (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 12/560,598

(22) Filed: Sep. 16, 2009

(65) Prior Publication Data
US 2010/0074594 A1    Mar. 25, 2010

Related U.S. Application Data

(60) Provisional application No. 61/111,056, filed on Nov. 4, 2008, provisional application No. 61/219,486, filed on Jun. 23, 2009.

(30) Foreign Application Priority Data

Sep. 18, 2008   (JP) ................................. 2008-239386
Jun. 22, 2009   (JP) ................................. 2009-147495

(51) Int. Cl.
*H04N 13/00* (2006.01)
*H04N 5/76* (2006.01)

(52) U.S. Cl.
USPC ........................................................ 386/353

(58) Field of Classification Search
None
See application file for complete search history.

(56) References Cited

U.S. PATENT DOCUMENTS

| 5,786,814 | A | 7/1998 | Moran et al. | |
|---|---|---|---|---|
| 6,313,866 | B1 | 11/2001 | Akamatsu et al. | |
| 6,462,746 | B1* | 10/2002 | Min et al. | 345/545 |
| 2002/0101568 | A1* | 8/2002 | Eberl et al. | 351/211 |
| 2005/0086612 | A1* | 4/2005 | Gettman et al. | 715/848 |
| 2006/0087556 | A1* | 4/2006 | Era | 348/51 |

(Continued)

FOREIGN PATENT DOCUMENTS

| CN | 1795683 | 6/2006 |
|---|---|---|
| EP | 0905988 | 3/1999 |

(Continued)

OTHER PUBLICATIONS

Lenny Lipton, "Foundations of the Stereoscopic Cinema", Van Nostrand Reinhold, New York, 1982.
China Office action, mail date is Mar. 7, 2013.
Search report from E.P.O., mail date is Mar. 4, 2013.

*Primary Examiner* — Thai Tran
*Assistant Examiner* — Sunghyoun Park
(74) *Attorney, Agent, or Firm* — Greenblum & Bernstein, P.L.C.

(57) ABSTRACT

A video plane generation unit decodes stream data into a pair of left-view and right-view video planes, and outputs the pair alternately in a 3D display mode and either of the pair repeatedly in a pseudo 2D display mode. An image plane generation unit generates a pair of left-view and right-view image planes having an OSD at different horizontal locations according to its depth to be perceived, and alternately output the pair of image planes. A pseudo 2D display control unit instructs the video plane generation unit to operate in the 3D display mode and the pseudo 2D display mode in periods where the image plane generation unit does not and does output the image planes, respectively. The adder unit combines a video plane and an image plane generated by the video plane generation unit and the image plane generation unit, respectively, onto a frame, and outputs the frame.

7 Claims, 39 Drawing Sheets

U.S. PATENT DOCUMENTS

| | | |
|---|---|---|
| 2007/0003134 A1 | 1/2007 | Song et al. |
| 2007/0058034 A1* | 3/2007 | Numazaki et al. ............... 348/51 |
| 2007/0097208 A1 | 5/2007 | Takemoto et al. |
| 2007/0182730 A1 | 8/2007 | Mashitani et al. |
| 2007/0236560 A1* | 10/2007 | Lipton et al. .................... 348/43 |
| 2008/0088644 A1 | 4/2008 | Paquette |
| 2008/0094525 A1* | 4/2008 | Song ............................. 348/739 |
| 2008/0145031 A1 | 6/2008 | Tanaka et al. |
| 2009/0142041 A1* | 6/2009 | Nagasawa et al. ............ 386/124 |

FOREIGN PATENT DOCUMENTS

| | | |
|---|---|---|
| EP | 1739980 | 1/2007 |
| JP | 8-249493 | 9/1996 |
| JP | 2003-260028 | 9/2003 |
| JP | 2004-354540 | 12/2004 |
| JP | 3943635 | 4/2007 |
| WO | 2005/119675 | 12/2005 |

* cited by examiner

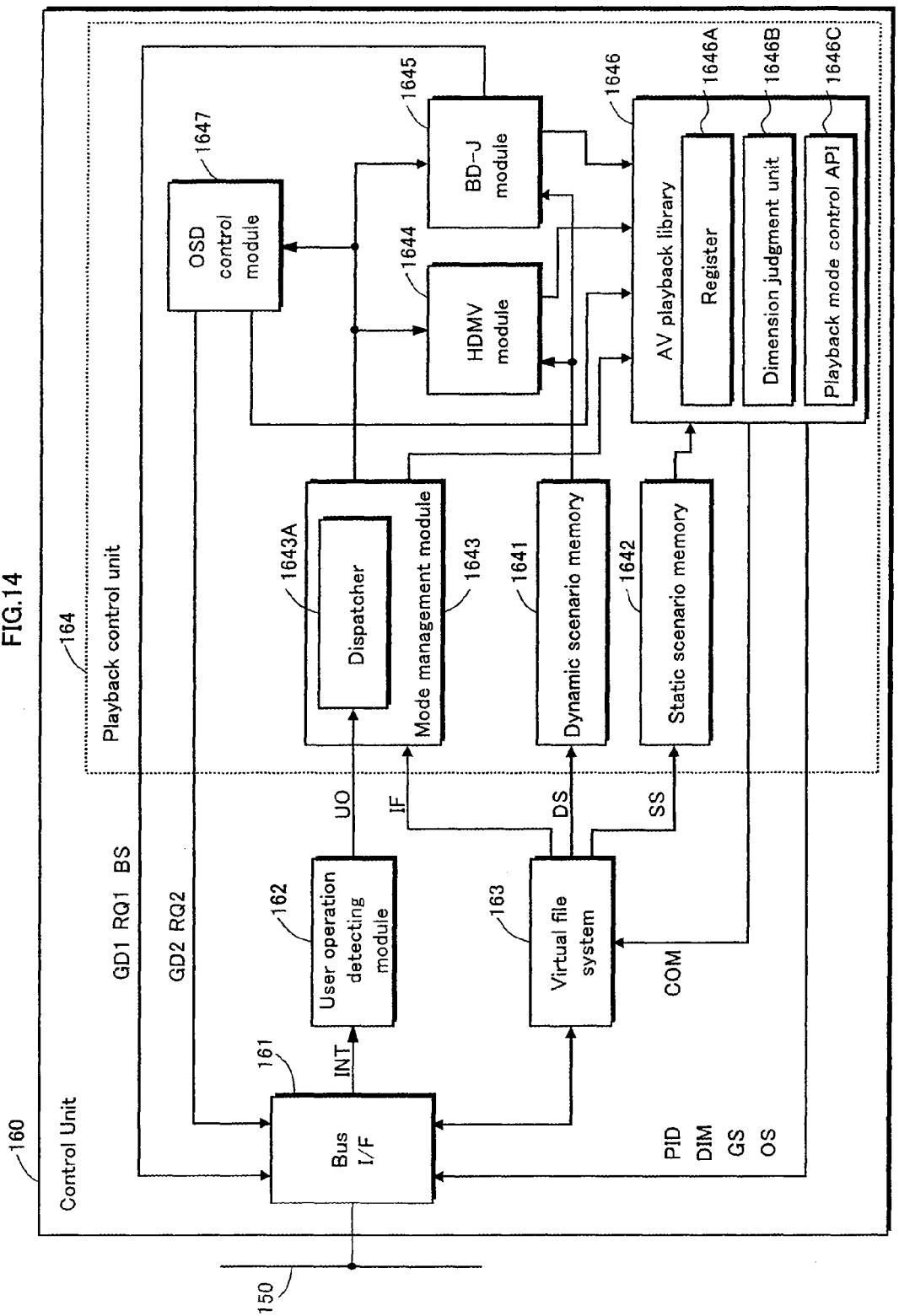

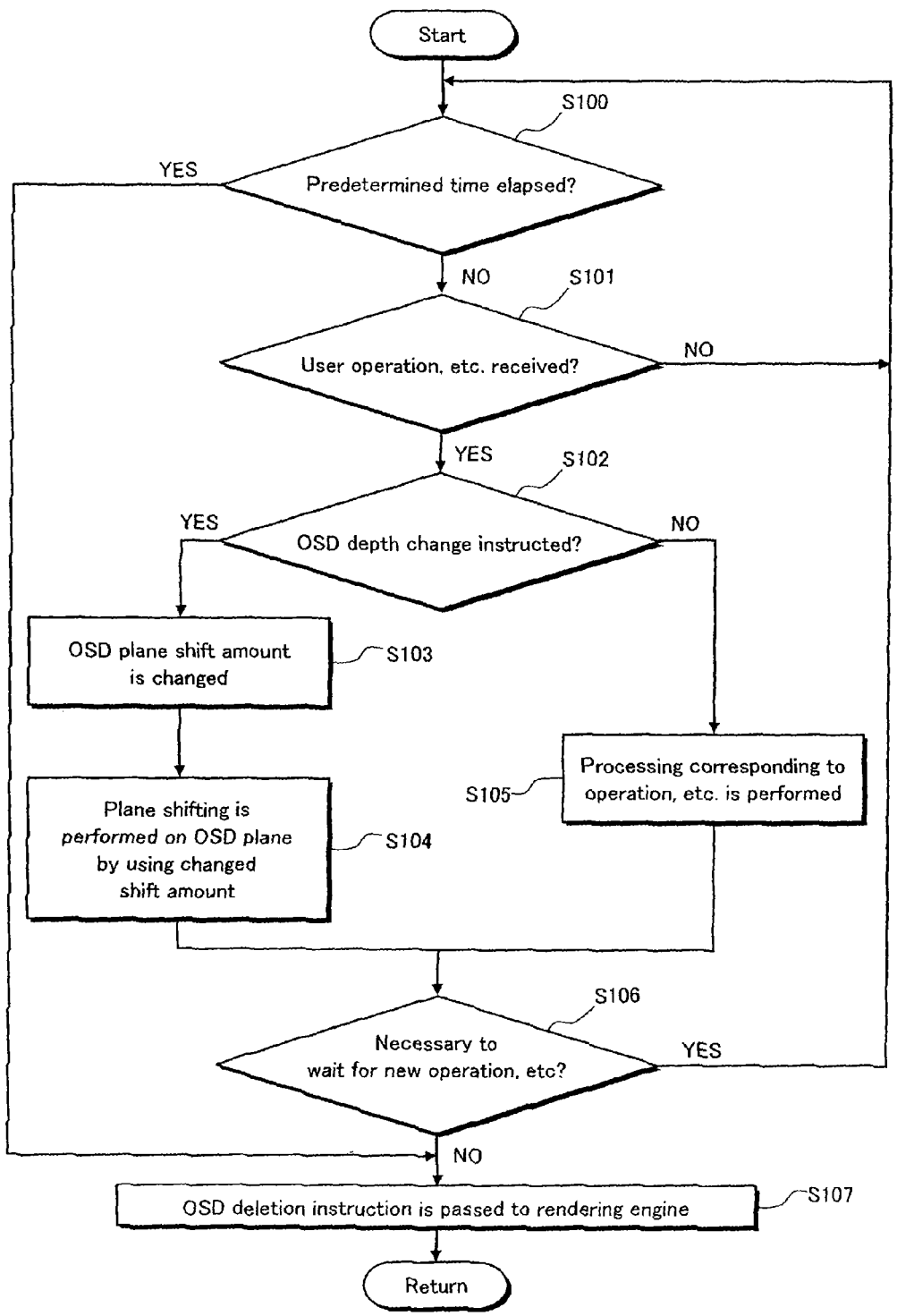

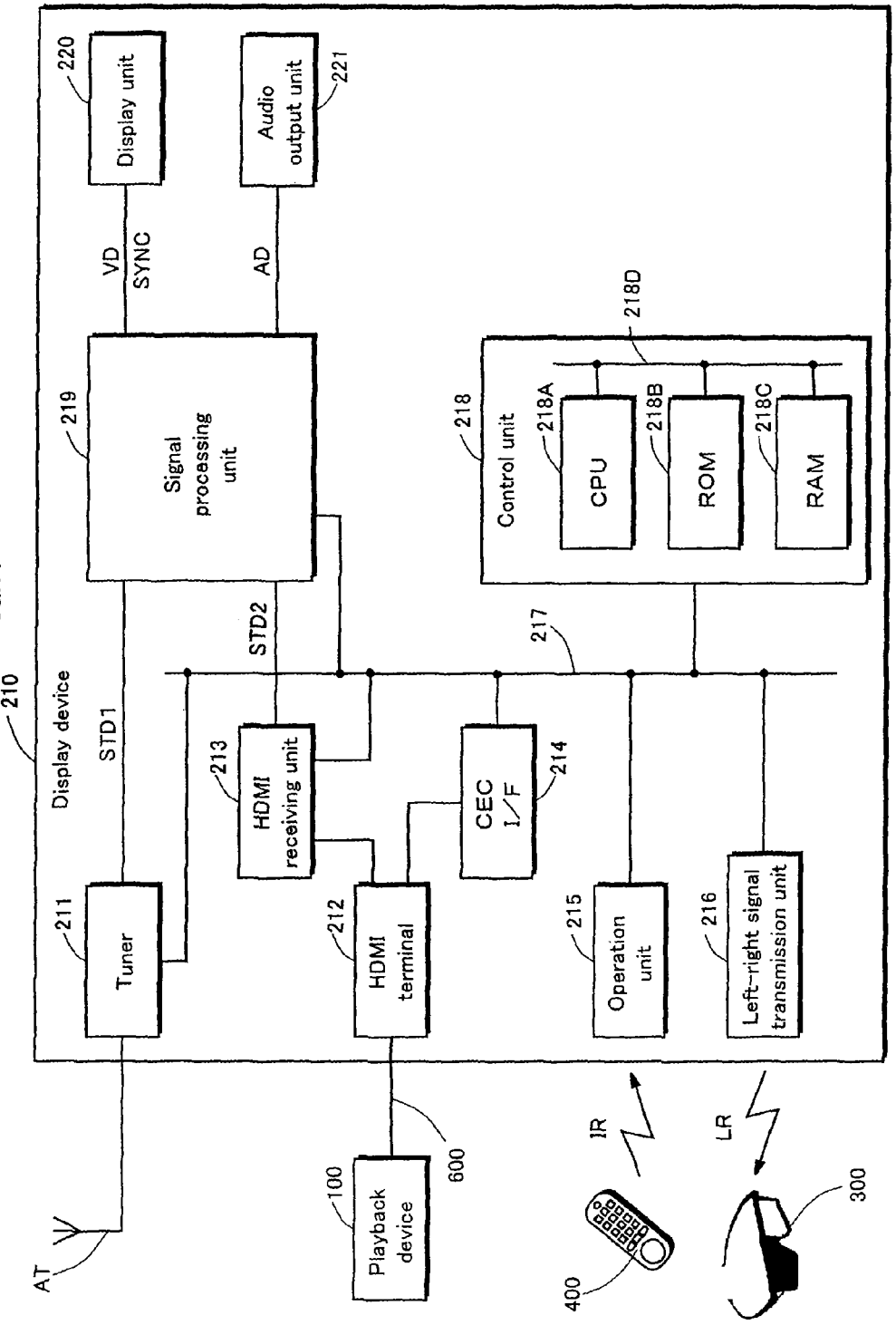

STEREOSCOPIC VIDEO PLAYBACK DEVICE AND STEREOSCOPIC VIDEO DISPLAY DEVICE

BACKGROUND OF THE INVENTION

1. Field of the Invention

The present invention relates to technologies for displaying stereoscopic video images, and in particular to a technology to stereoscopically superimpose an on-screen display (OSD) on stereoscopic video images.

2. Description of the Related Art

Technologies for displaying stereoscopic video images are promising as a display technology for the next generation, and have been rapidly developed in recent years. Basically, the technologies use the following fact: "Persons perceive the three-dimensional shapes and depths of objects from binocular parallax" (See Non Patent Document 1 for example). More specifically: first two video frames in a single scene are shot; the same object has slightly different locations in the horizontal direction in the two video frames; and then one of the two video frames is projected to the left eye of a viewer, and almost simultaneously, the other video frame is projected to the right eye of the viewer. As a result, the viewer perceives the three-dimensional shape and depth of the object from the slight displacement of the object between the video frames projected to the respective eyes.

As seen from the example explained above, the technologies for displaying stereoscopic video images generally require two video frames to display a single scene, one for the left eye and the other for the right eye. This means that the data size of stereoscopic video images for a given length of display time is generally larger than that of conventional two-dimensional video images. Thus, a large-capacity optical disc such as a Blu-ray disc (BD) and a disc drive therefor are necessary for playback of stereoscopic video images.

Conventional two-dimensional video display devices and optical disc drives generally have an OSD function. The "OSD function" means a function to display graphics images on the screen of a display device, the graphics images representing, for example, a settings screen for screen brightness, the volume of sound, etc.; information showing operational states such as "Start playing" and "Pause"; or a selection screen for a title and a chapter to be played back. Such graphics images are called "OSDs". In addition, some playback devices for playing back high-quality video images from a read-only BD (BD-ROM disc) have a function to render graphics images on the high-quality video images according to an application program recorded on the BD (See Patent Document 1 for example). Providers of video contents enable the playback devices to realize sophisticated graphical user interfaces (GUIs) by causing the playback devices to render pop-up displays, animations, and the like. Thus, stereoscopic video display devices and playback devices are also demanded to have similar OSD and graphics rendering functions.

An example of a stereoscopic video playback device having such functions is known, which can render a stereoscopic image of a mouse cursor on other stereoscopic images (See Patent Document 2 for example). This playback device generates two types of graphics images which represent the mouse cursor on a screen at slightly different locations in the horizontal direction, and superimposes one of the graphics images on left-view video images, and the other on right-view video images. When the mouse cursor is displayed in the same view direction as a different object in the stereoscopic video images at the same time, the playback device changes the displacement of the mouse cursor between the left-view and right-view video images from the displacement of the object therebetween by a predetermined amount. With this operation, the playback device allows the viewer to see the mouse cursor in front of the object.

REFERENCES

Patent Documents

[Patent Document 1]
International Publication No. 2005/119675
[Patent Document 2]
Japanese Patent Application Publication No. 2004-354540

Non-Patent Documents

[Non-Patent Document 1]
Lenny Lipton, "Foundations of the Stereoscopic Cinema", Van Nostrand Reinhold, New York, 1982

SUMMARY OF THE INVENTION

Problems to be Solved by the Invention

Usually, OSDs and pop-up displays are information to be perceived by viewers in priority to other images. Accordingly, the conventional technologies for displaying two-dimensional video images displays OSDs and the like to be superimposed on objects, subtitles, or graphics elements contained in other images so as to cut off the view of them. Similarly, the technologies for displaying stereoscopic video images should display OSDs and the like to be perceived by viewers in priority to other stereoscopic images.

As such stereoscopic display technologies, the mouse cursor display technology explained above seems to be applicable. That is, changing the displacement of an OSD or the like between left-view and right-view video images from the displacement of a specific object therebetween by a predetermined amount seems to be applicable; the specific object is to be displayed nearest to the viewer's eyes among objects to be displayed in the same view direction as the OSD. However, the depths of objects in stereoscopic video images vary greatly and widely, in general. Accordingly, the depth of the OSD or the like, when determined in relation to the depths of other objects or the likes as described above, varies generally in each scene of the stereoscopic video images. This variation involves the risk of preventing the OSD or the like from being easy to see. Especially when the visibility of settings screens and pop-up displays might be degraded, the operability of GUI which uses them might be degraded.

On the other hand, holding an OSD or the like at a constant depth by keeping the displacement of the OSD or the like between left-view and right-view video images at a constant value also seems to be applicable. However, when the OSD or the like is displayed in the view direction of an object that is displayed in front of the constant depth, the OSD or the like looks as if embedded in the object. This is undesirable, because it might not only degrade the visibility of the OSD or the like but also cause eyestrain of viewers.

The present invention aims to solve the problems described above. In particular, the present invention aims to provide stereoscopic video playback and display devices that are capable of improving the visibility of OSDs and pop-up displays.

Means for Solving the Problems

A stereoscopic video playback device according to an embodiment of the present invention includes a video plane generation unit, an image plane generation unit, a pseudo two-dimensional (2D) display control unit, and an adder unit. The video plane generation unit decodes stream data into a pair of left-view and right-view video planes. The video plane generation unit is operable in a three-dimensional (3D) display mode for alternately outputting the pair of video planes, and a pseudo 2D display mode for repeatedly outputting either of the pair of video planes, and the video plane generation unit outputs video planes in one of the operation modes according to an instruction. The image plane generation unit generates a pair of left-view and right-view image planes having an OSD or a pop-up display at different display locations in a horizontal direction, and alternately outputs the pair of image planes. Here, the display locations are to be determined from a depth of the OSD or the pop-up display to be perceived. The pseudo 2D display control unit instructs the video plane generation unit to operate in the 3D display mode in a period where the image plane generation unit does not output the pair of image planes, and the pseudo 2D display control unit instructs the video plane generation unit to operate in the pseudo 2D display mode in a period where the image plane generation unit outputs the pair of image planes. Each time the video plane generation unit outputs a video plane and the image plane generation unit generates an image plane, the adder unit combines the video plane and the image plane into a single frame and output the frame.

Here, the term "OSD" refers to specific graphics elements or combinations thereof that a display device displays thereon under the control of a playback device per se, in particular, a firmware thereof; the specific graphics elements or combinations represent the contents of settings or the operational states of the playback device, or information about the stream data to be played back or the provider thereof. Information that the playback device displays by using OSDs includes, for example, the operational states thereof such as "Start playing", "Stop", "Pause", "Forward play", or "Backward play", and playback information such as the title being played back, the playback time, or the language or output format of subtitles or audio contents.

On the other hand, the term "pop-up display" refers to graphics elements or combinations thereof that a display device displays thereon under the control of an application program executed by a playback device. The pop-up displays include, for example, GUI (graphical user interface) screens such as pop-up menus. The GUI screens include, for example, a screen for selecting a title, a chapter, or a scene to be played back, and a screen for selecting the language or output format of subtitles or audio contents.

As explained above, in the stereoscopic video playback device, the video plane generation unit is operable in the two operation modes for outputting video planes, namely the 3D display mode and the pseudo 2D display mode. Furthermore, in the period where an OSD or a pop-up display is displayed on the screen, the video plane generation unit switches to the pseudo 2D display mode, and either of the pair of left-view and right-view video planes is repeatedly outputted. Thus, while the OSD or the like is being three-dimensionally displayed on the screen, video images represented by stream data are two-dimensionally displayed. This can further improve the visibility of the OSD or the like.

The stereoscopic video playback device according to the above-mentioned embodiment of the present invention may further include an OSD processing unit and an operation mode selection unit. The OSD processing unit performs processing of an OSD such that, within a stereoscopic image represented by a pair of left-view and right-view frames, a part to be perceived in front of the OSD does not include an area that is hidden behind the OSD in one of the pair but not in the other thereof. The operation mode selection unit selects either a mode for enabling the pseudo 2D display control unit or a mode for enabling the OSD processing unit according to a user operation or an instruction from an application program. This allows the user or the application program to select whether to display video/subtitles images of contents as 2D video images or stereoscopic images, together with OSDs. Moreover, in the operation mode for displaying video/subtitles images of contents as stereoscopic images together with OSDs, the above-mentioned processing of the OSD allows viewers to properly perceive the difference in depth between the OSD and the stereoscopic image. Here, the processing includes extending a width of the OSD in the horizontal direction to cover the full widths of the frames, or making at least a part of the OSD translucent. The part overlaps the stereoscopic image. Alternatively, the processing of the OSD may include the following steps when the stereoscopic image to be seen in depth in front of the OSD: adding a strip to a right side of the OSD on the left-view image plane when a right end of the OSD overlaps the stereoscopic image, and adding a strip to a left side of the OSD on the right-view image plane when a left end of the OSD overlaps the stereoscopic image. These steps can further improve the visibility of the OSD even in the mode for displaying video/subtitles images of contents as stereoscopic images together with OSDs.

A stereoscopic video display device according to an embodiment of the present invention includes a video signal receiving unit, a display unit, an OSD plane generation unit, a pseudo 2D display control unit, and an adder unit. The video signal receiving unit receives a video signal, and extracts a pair of left-view and right-view video frames from the video signal. The video signal receiving unit is operable in a 3D display mode for alternately outputting the pair of video frames, and a pseudo 2D display mode for repeatedly outputting either of the pair of video frames, and the video signal receiving unit outputs video planes in one of the operation modes according to an instruction. The display unit includes a display panel, and adjusts brightness of the display panel in units of pixels according to video frames outputted from the video signal receiving unit. The display unit thus reproduces an image represented by the video frames on the display panel. The OSD plane generation unit generates a pair of left-view and right-view OSD planes having an OSD at different display locations in a horizontal direction, and alternately outputs the pair of OSD planes. Here, the display locations are to be determined from a depth of the OSD to be perceived. The pseudo 2D display control unit instructs the video signal receiving unit to operate in the 3D display mode in a period where the OSD plane generation unit does not output the pair of OSD planes, and the pseudo 2D display control unit instructs the video signal receiving unit to operate in the pseudo 2D display mode in a period where the OSD plane generation unit outputs the pair of OSD planes. Each time the video signal receiving unit outputs a video frame and the OSD plane generation unit generates an image plane, the adder unit combines the video plane and the OSD plane into a single video frame and outputs the video frame.

Here, the term "OSD" refers to specific graphics elements or combinations thereof that a display panel displays thereon under the control of a display device; the specific graphics elements or combinations represent the contents of settings of the display device, or information about video images played back or the provider thereof. OSDs used by the display device include, for example, a screen for setting brightness, color and tint, resolution, refresh rate, and the like of the display panel, and a screen for setting volume of sound.

As explained above, in the stereoscopic video playback device, the video signal receiving unit is operable in the two operation modes for outputting video frames, namely the 3D display mode and the pseudo 2D display mode. Furthermore, in the period where an OSD is displayed on the screen, the video signal receiving unit switches to the pseudo 2D display mode, and either of the pair of left-view and right-view video frames is repeatedly outputted. Thus, while the OSD is being three-dimensionally displayed on the screen, video images represented by video frames is two-dimensionally displayed. This can further improve the visibility of the OSD.

Advantageous Effects of Invention

As explained above, the present invention can provide the stereoscopic video playback device and display device that are capable of further improving the visibility of OSDs and pop-up displays.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 5A shows a scene of the video played back in the HDMV mode and FIG. 5B shows a scene of the video played back in the BD-J mode;

FIG. 13A shows an OSD G1 for indicating playback starting, FIG. 13B shows an OSD G2 for indicating pausing, FIG. 13C shows an OSD G3 for indicating fast-forwarding, FIG. 13D shows an OSD G4 of a screen for setting the brightness of the screen, FIG. 13E shows an OSD G4 of a screen for setting the volume of sound and FIG. 13F shows pop-up displays G6 for selecting a chapter to be played back;

FIG. 14 is a functional block diagram of the control unit shown in FIG. 12;

FIG. 33A shows a left-view video frame obtained through the OSD processing A. FIG. 33B shows a right-view video frame obtained through the OSD processing A. FIG. 33C schematically shows stereoscopic video images displayed on the screen of the display device with the pair of video frames shown in FIGS. 33A and 33B;

FIG. 34A shows a left-view video frame obtained through the OSD processing B. FIG. 34B shows a right-view video frame obtained through the OSD processing B. FIG. 34C schematically shows a stereoscopic video image displayed on the screen of the display device with the pair of video frames shown in FIGS. 34A and 34B;

FIG. 35A shows a left-view video frame obtained through the OSD processing C, FIG. 35B shows a right-view video frame obtained through the OSD processing B, and FIG. 35C schematically shows a stereoscopic video image displayed on the screen of the display device with the pair of video frames shown in FIGS. 35A and 35B;

FIG. 36 is a flowchart showing a process for changing an OSD plane shift mount, performed by a playback device in accordance with the third embodiment of the present invention;

FIG. 37 is a block diagram showing a hardware configuration of a display device in accordance with the fourth embodiment of the present invention;

DESCRIPTION OF THE EMBODIMENTS

The following explains preferable embodiments of the present invention, with reference to the drawings.

First Embodiment

Figure 1:
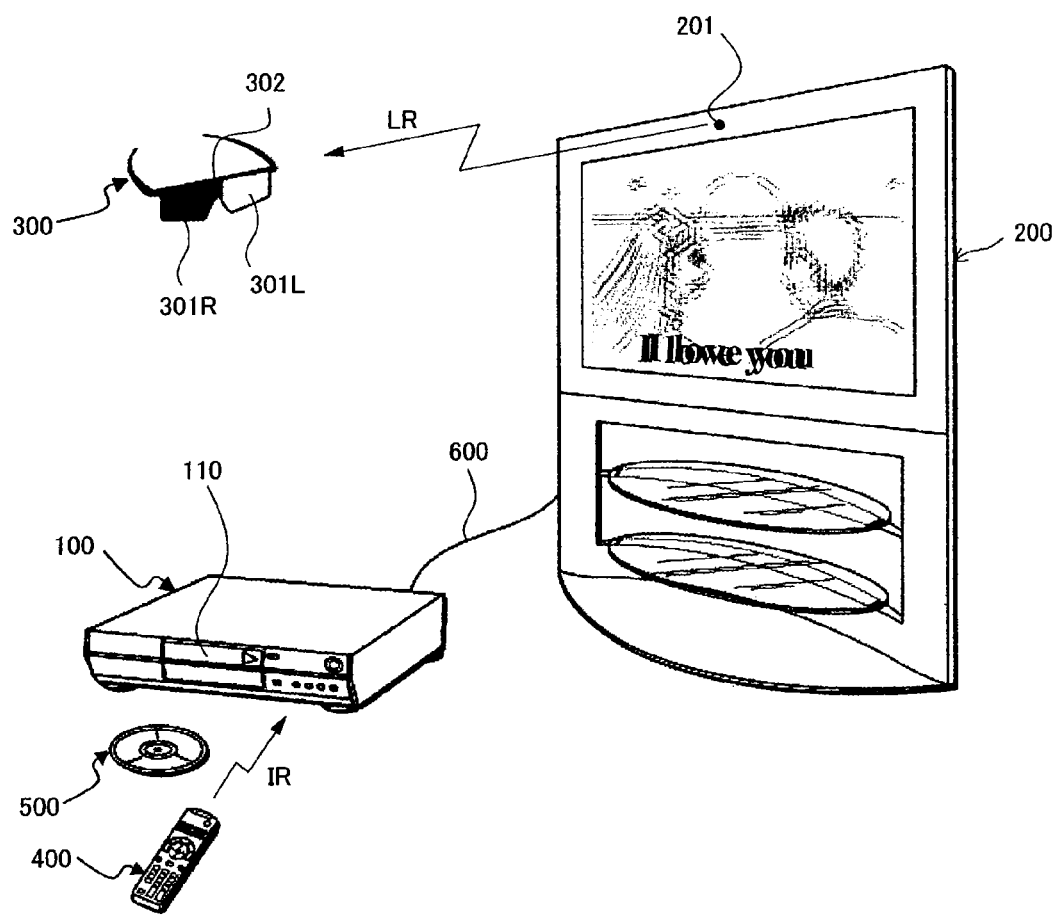
FIG. 1 is a schematic diagram showing a stereoscopic video display system in accordance with the first embodiment of the present invention.

FIG. 1 is a schematic diagram showing a stereoscopic video display system according to the first embodiment of the present invention. As shown in FIG. 1, this system includes a playback device 100, a display device 200, liquid crystal shutter glasses 300, a remote control 400 and an optical disc 500.

The Optical disc 500 is a BD-ROM disc for example, and contains a stereoscopic video content. In particular, left-view and right-view video streams are both multiplexed with an audio stream into a single set of stream data.

The playback device 100 is equipped with an optical disc drive 110, which complies with the BD-ROM standards for example. The playback device 100 uses the optical disc drive 110 to read stream data of stereoscopic video images from the optical disc 500 and decode the stream data into video/audio data. In particular, video data includes both left-view and right-view video frames. The playback device 100 is connected to the display device 200 via a HDMI (High-Definition Multimedia Interface) cable 600. The playback device 100 converts the video/audio data to video/audio signals complying with the HDMI standards, and sends the signals to the display device 200 through the HDMI cable 600. Both the left-view and right-view video frames are time-division multiplexed into the video signals.

The display device 200 is, for example, a liquid crystal display. Alternatively, it may be a flat panel display such as a plasma display or an organic EL display, or a projector. The playback device 200 reproduces video images on a screen 201 according to the video signals, and generates sounds from a built-in speaker according to the audio signals. Note that left-view and right-view video images are alternately reproduced on the screen 201. The display device 200 is further equipped with a left-right signal transmission unit 202, and uses it to send a left-right signal LR to the liquid crystal shutter glasses 300 by infrared rays or by radio. The left-right signal LR indicates whether the video displayed on the screen 201 at the moment is for the left eye or for the right eye. The display device 200 distinguishes between the left-view video frame and the right-view video frame based on a control signal accompanying the video signal, and synchronizes the waveform switching of the left-right signal LR with the frame switching.

The liquid crystal shutter glasses 300 include two liquid crystal display panels 301L and 301R and a left-right signal receiving unit 302. The crystal display panels 301L and 301R respectively constitute the left and right lens parts. The left-right signal receiving unit 302 receives the left-right signal, and sends signals to the left and right liquid crystal display panels 301L and 301R according to the change of the waveform of the left-right signal LR. Each of the left and right liquid crystal display panels 301L and 301R transmits the light or blocks the light uniformly throughout the whole body thereof, according to the signals. Specifically, when the left-right signal LR indicates that the video is for the left eye, the crystal display panel 301L for the left eye transmits the light, and the crystal display panel 301R for the right eye blocks the light. It is the opposite when the left-right signal LR indicates that the video is for the right eye. In this manner, the left and right liquid crystal display panels 301L and 301R alternately transmit the light in synchronization with the frame switching. As a result, while the viewer wearing the liquid crystal glasses 300 is watching the screen 201, the left-view video is projected only to the left eye of the viewer, and the right-view video is projected only to the right eye of the viewer. In the meantime, the viewer perceives the difference between the images projected to the left and right eyes as the binocular parallax of the single stereoscopic object, and sees the object stereoscopically.

The remote control 400 includes an operation unit and a transmission unit. The operation unit includes a plurality of buttons. The buttons are each allocated for functions of the playback device 100 or the display device 200, such as power-on and power-off, playback start, stop, and the like. The operation unit detects the user's pressing of each key, and passes a signal identifying the pressed key to the transmission unit. The transmission unit notifies the playback device 100 or the display device 200 of the signal, by infrared rays or by radio IR. Thus, the user remotely operates the playback device 100 and the display device 200.

<Principles of Stereoscopic Image Display>

Figure 2:
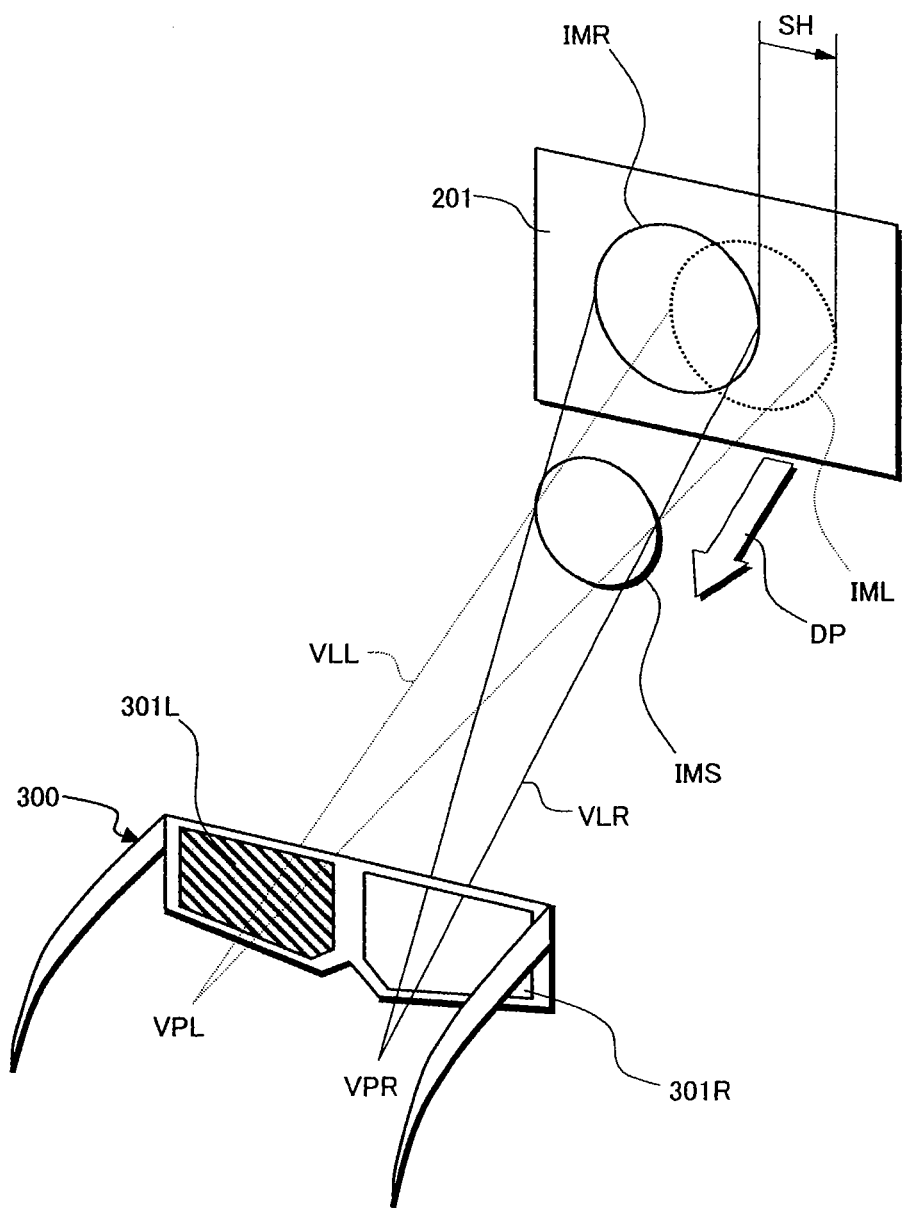
FIG. 2 is a schematic diagram showing principles of stereoscopic video display performed by the system shown in FIG. 1.

FIG. 2 is a schematic diagram showing principles of stereoscopic image display performed by the system described above. As shown in FIG. 2 with a solid line, when an image IMR for the right eye is displayed on the screen 201 of the display device, the liquid crystal display panel 301L for the left eye blocks the light, and the liquid crystal display panel 301R for the right eye transmits the light. As a result, only the viewer's right eye sees the image IMR. On the contrary, as shown in FIG. 2 with a dotted line, when an image IML for the left eye is displayed on the screen 201, the liquid crystal display panel 301R for the right eye blocks the light, and the liquid crystal display panel 301L for the left eye transmits the light. As a result, only the viewer's left eye sees the image IML. Here, the locations of the right-view image IMR and the left-view image IML in the horizontal direction are different from each other by a displacement SH. Thus, a view line VLR from a view point VPR of the right eye to the right-view image IMR intersects with a view line VLL from a view point VPL of the left eye to the left-view image IML, at a point away from the screen 201 forward or backward. According to the example in FIG. 2, the intersection point is nearer to the viewer than the screen 201 by the distance indicated by an arrow DP. When the frame rate is high enough, the left eye captures the left-view image IML while the right eye is holding the afterimage of the image IMR. Consequently, the viewer sees the images IMR and IML as a single stereoscopic image IMS emerging at the intersection point of the right-eye view line VLR and the left-eye view line VLL. That is, the viewer confuses the displacement between the image IMR, which only the right eye can see, and the image IML, which only the left eye can see, with the binocular parallax of a single stereoscopic object. Thus, it is possible to make the stereoscopic image IMS look as if it is displayed at a depth DP that is different from the depth of the screen 201.

Figure 3A:
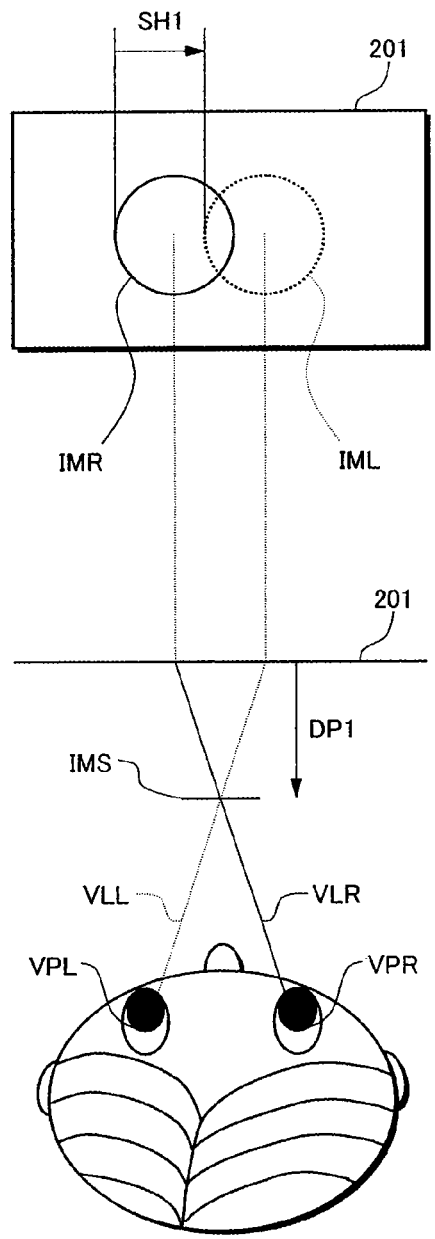
FIGS. 3A and 3B are schematic diagrams each showing the depth of a stereoscopic image perceived by a viewer due to a displacement between a right-view image and a left-view image.
Figure 3B:
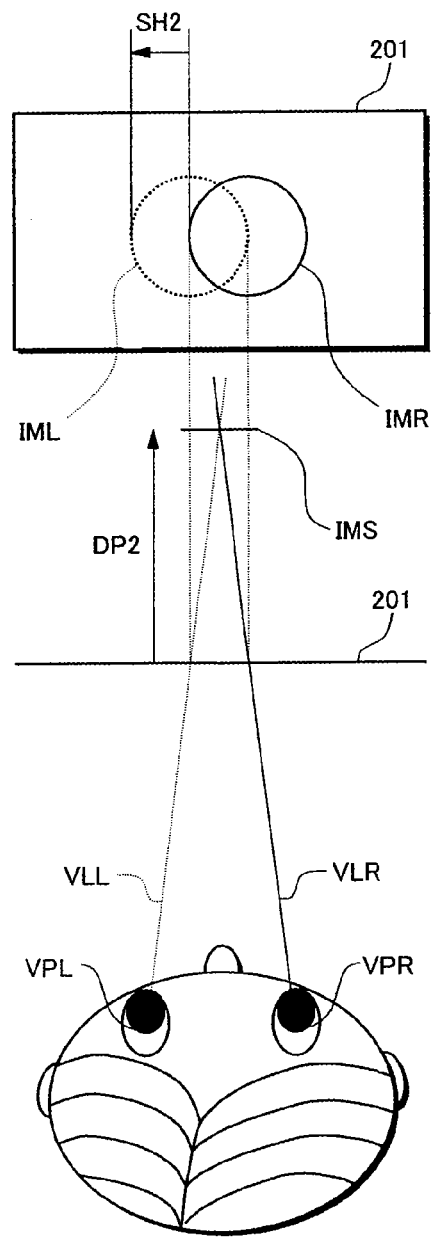

FIGS. 3A and 3B schematically show the depth DP of the stereoscopic image IMS perceived by the viewer, due to the displacement SH between the right-view image IMR and the left-view image IML. In FIG. 3A, the left-view image IML is displaced to the right by a displacement SH1 in the relationship with the right-view image IMR. In this case, the view line VLR of the right-eye view point VPR and the view line VLL of the left-eye view point intersects at a point a distance DP1 nearer than the screen 201. Thus, the stereoscopic image IMS looks as if it is the distance DP1 nearer than the screen 201. In FIG. 3B, the left-view image IML is displaced to the left by a displacement SH2 in the relationship with the right-view image IMR. In this case, the view line VLR of the right-eye view point VPR and the view line VLL of the left-eye view point intersects at a point a distance DP2 farther than the screen 201. Thus, the stereoscopic image IMS looks as if it is the distance DP2 farther from than the screen 201. As explained above, it is possible to adjust the depth to be perceived of the stereoscopic image IMS, by adjusting the direction and the amount of the displacement of the left-view image IML in the relationship with the right-view image IMR.

<Data Structure of Optical Disc 500>

Figure 4:
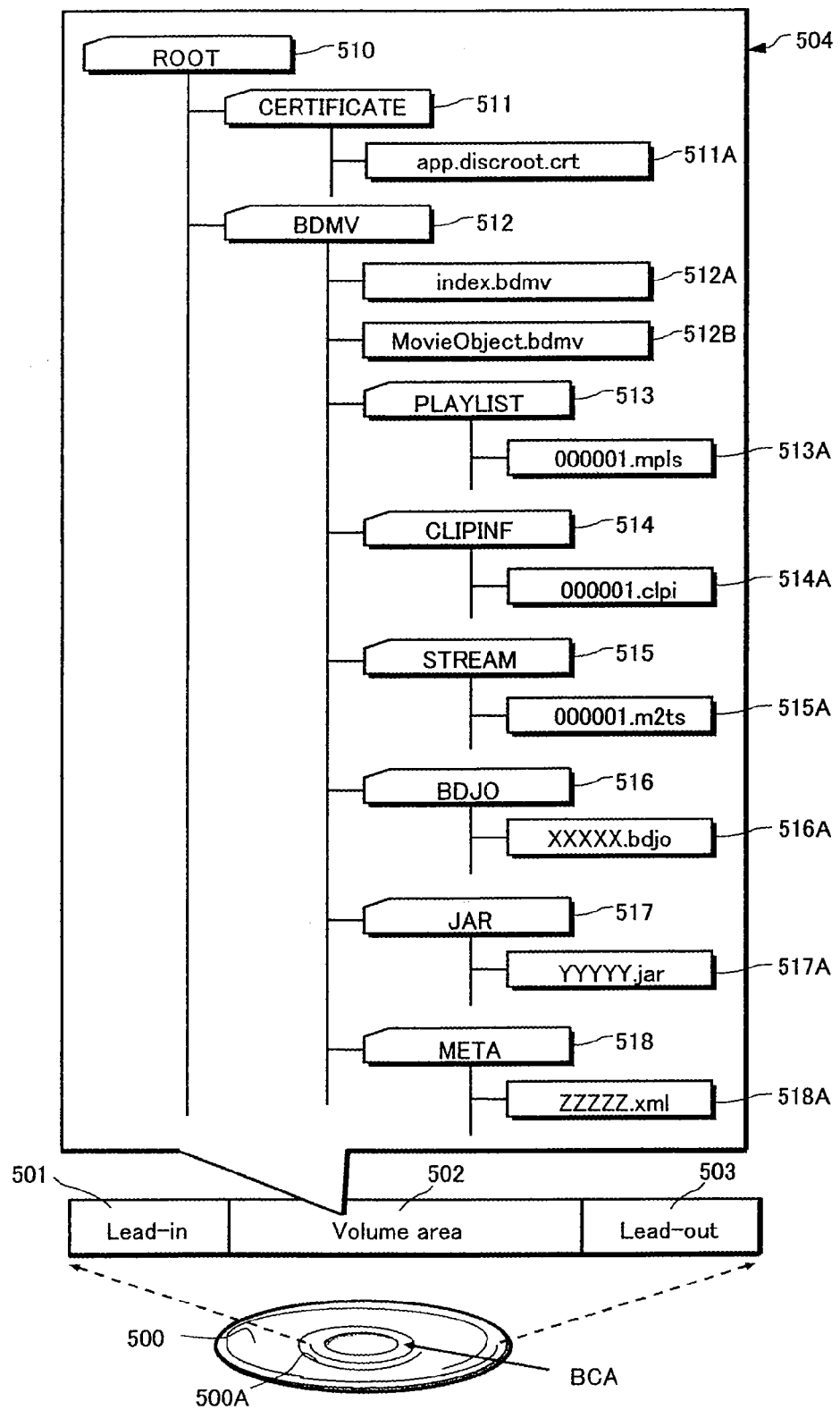
FIG. 4 is a schematic diagram showing the structure of data recorded on the optical disc shown in FIG. 1.

FIG. 4 is a schematic diagram showing the structure of data recorded on the optical disc 500 when the optical disc is a BD-ROM. As shown in FIG. 4, a BCA (Burst Cutting Area) is provided on the innermost part of the data recording areas on the BD-ROM disc 500. The BCA permits access from only the optical disc drive 110, and prohibits access from application programs. The BCA is therefore used for copyrights protection technologies, for example. In data recording area outer than the BCA, an area 500A spirals from the inner circumference outwards to the outer circumference of the BD-ROM disc 500. The area 500A is called a track. The track 500A includes a lead-in area 501, a volume area 502 and a lead-out area 503 in this order from the inner circumference. The track 500A in FIG. 4 is laterally stretched out to the sides, and the inner circumference side is shown on the left and the outer circumference side is shown on the right. The lead-in area 501 is provided just outside the BCA. The lead-in area 501 stores information required for access to the volume area 502, such as the sizes and the physical addresses of pieces of data recorded in the volume area 502. The lead-out area 503 is provided on the outermost part of the BD-ROM disc 500, and indicates the termination of the volume area 502. The volume area 502 is provided between the lead-in area 501 and the lead-out area 503. The volume area 502 stores application data such as video data and audio data.

As a file system for the volume area 502, the UDF (Universal Disc Format) of the ISO 9660 is adopted, for example. The volume area 502 is managed as a single logical address space. Furthermore, pieces of data recorded in the volume area 502 are organized to constitute directories and files. Thus, the pieces of data can be accessed in units of the directories or the files.

FIG. 4 also depicts a directory structure 504 of the data recorded in the volume area 502. According to the directory structure 504, directories immediately below the root (ROOT) directory are a certificate (CERTIFICATE) directory 511 and a BD movie (BDMV) directory 512. The CERTIFICATE directory 511 stores authentication information for the content recorded on the BD-ROM disc 500. The BDMV directory 512 stores stream data that is the body of the content.

The CERTIFICATE directory 511 stores, in particular, an application certificate file (app.discroot.crt) 511A. The file 511A is unique to the provider (hereinafter called "content provider") of the content recorded on the BD-ROM disc 500. The application certificate file 511A is a so-called digital certificate, and is used for authentication of a Java™ application program. Here, the Java application program is a bytecode program complying with the Java, and is read and executed from the BD-ROM disc 500 by a Java virtual machine (described below) implemented in the playback device 100. Specifically, the Application certificate file 511A is used for verification of the signature of the Java application program when the Java application program is read from the BD-ROM disc 500 by the Java virtual machine. The signature verification is performed for checking whether or not the Java application program has been tempered, and identifying the source of the program. Thus, it is possible to allow the Java virtual machine to execute only Java application programs that have been given permission by the content provider, or to selectively give Java application programs the rights to access storage devices included in the playback device 100.

The BDMV directory 512 stores an index file (index.bdmv) 512A and a movie object file (MovieObject.bdmv) 512B. The BDMV directory 512 further includes a playlist (PLAYLIST) directory 513, a clip information (CIIPINF) directory 514, a stream (STREAM) directory 515, a BD-J object (BDJO) directory 516, a Java archive (JAR) directory 517 and a meta (META) directory 518. The PLAYLIST directory 513 stores a playlist file (000001.mpls) 513A. The CLIP-INF directory 514 stores a clip information file (000001.clpi) 514A. The STREAM directory 515 stores an audio/visual stream file (000001.m2ts) 515A. The BDJO directory 516 stores a BD-J object file (XXXXX.bdjo) 516A. The JAR directory 517 stores a JAR file (YYYYY.jar) 517A. The META directory 518 stores an XML (Extensible Markup Language) file (ZZZZ.xml) 518A. The following explains these files one by one.

<<Index File 512A>>

The index file 512A includes an index table. The index table includes items "First Play", "Top Menu" and "Title". Each item is associated with a movie object or a BD-J object. Each time the title or the menu is called in response to a user operation or by an application program, the control unit of the playback device 100 refers to the corresponding item in the index table, and calls the object corresponding to the item from the optical disc 500. The control unit then executes the program according to the called object. Specifically, the item "First Play" specifies the object to be called when the optical disc 500 is inserted into the optical disc drive 110. The item "Top Menu" specifies the object to be used for displaying a menu on the display device 200 when a command "go back to menu" is input in response, for example, to a user operation. The item "Title" specifies the object to be used for playing back, when a user operation for example requests a title to be played back, the stream data corresponding to the title from the optical disc 500.

<<Movie Object File 512B>>

The movie object file 512B generally includes a plurality of movie objects. Each movie object includes an array of navigation commands. The navigation commands cause the playback device 100 to execute playback processes similarly to general DVD players. The navigation commands include, for example, a read-out instruction to read out a playlist file corresponding to a title, a playback instruction to play back stream data from an AV stream file indicated by a playlist file, and a transition instruction to make a transition to another title. The control unit of the playback device 100 calls a movie object in response, for example, to a user operation and executes navigation commands contained in the called movie object in the order of the array. Thus, in a manner similar to general DVD players, the playback device 100 displays a menu on the display device to allow a user to select one of the commands. The playback device 100 then executes a playback start/stop of a title or switching to another title in accordance with the selected command, thereby dynamically changing the progress of video playback. Such an operation mode of the playback device 100 according to movie objects is called HDMV (High Definition Movie) mode.

<<BD-J Object File 516A>>

The BD-J object file 516A includes a single BD-J object. The BD-J object is a program to cause the Java virtual machine implemented in the playback device 100 to execute processes of title playback and graphics rendering. The BD-J object stores an application management table and identification information of the playlist file to be referred to. The application management table indicates a list of Java application programs that are to be actually executed by the Java virtual machine. Particularly in the application management table, the application IDs and icon locators are associated with each other. Each application ID is an identifier of the Java application program to be executed. Each icon locator indicates an address of the data of the icon that is associated with the corresponding Java application program. The identification information of the playlist file to be referred to identifies the playlist file that corresponds to the title to be played back. The Java virtual machine calls a BD-J object in accordance with a user operation or an application program, and executes signaling of the Java application program according to the application management table contained in the BD-J object. Consequently, the playback device 100 dynamically changes the progress of the video playback of the title, or causes the display device 103 to display graphics independently of the title video. Such an operation mode of the playback device 100 according to BD-J objects is called BD-J mode.

Figure 5A:
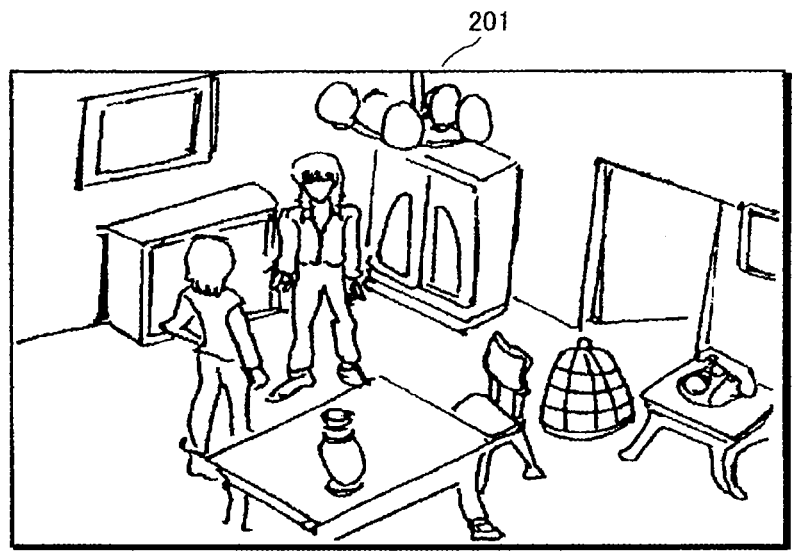
FIGS. 5A and 5B are schematic diagrams showing videos displayed on the screen of the display device in an HDMV mode and a BD-J mode, respectively, where
Figure 5B:
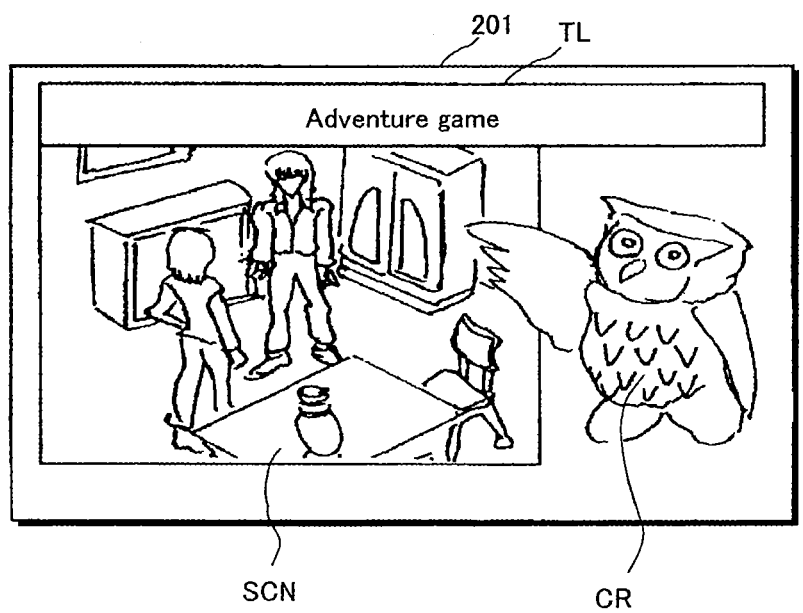

FIGS. 5A and 5B are schematic diagrams showing videos displayed on the screen of the display device in an HDMV mode and a BD-J mode, respectively. FIG. 5A shows a scene of the video played back in the HDMV mode. In the HDMV mode, a single video image of the played back content is generally displayed over the whole screen 201 in the similar manner as the video image played back from a DVD. Meanwhile, the FIG. 5B shows a scene of the video played back in the BD-J mode. In the BD-J mode, the Java virtual machine in the playback device 100 is enabled to render graphics together with the video played back from the optical disc 500. For example, as shown in FIG. 5B, a scene SCN of a movie, the tile TL of the movie, and an animation CR of an owl giving a commentary on the movie are displayed on the screen 201 all together.

<<JAR Directory>>

The JAR file 517A stores the body of each Java application program executed in accordance with a BD-J object. The Java application programs include those for causing the Java virtual machine to execute playback of a title and those for causing the Java virtual machine to execute graphics rendering. The JAR file 517A further includes data pieces of icons respectively associated with Java application programs. The icons are used by the Java applications as graphics elements. Each Java application program is consisted of a small program called "xlet" and data. According to a BD-J object, the Java virtual machine loads required xlet and data from the JAR file 517A to a heap area (also referred to as a work memory) of the built-in memory.

<<AV Stream File 515A>>

Figure 6:
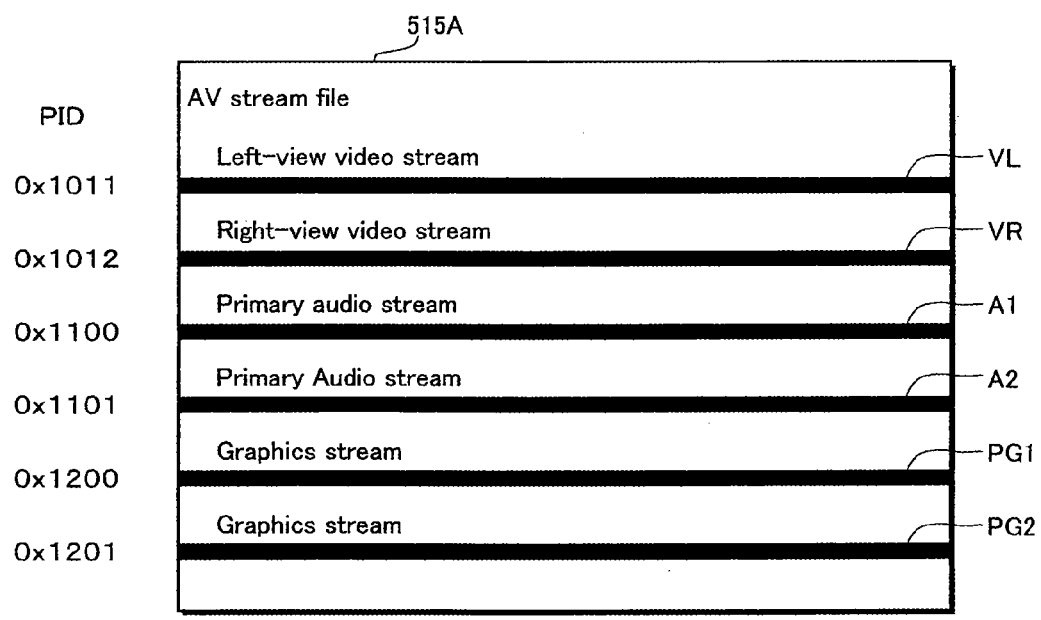
FIG. 6 is a schematic diagram showing a plurality of elementary streams constituting an AV stream file, in the order of playback times thereof.

The AV stream file 515A is stream data as the body of the content. A plurality of elementary streams such as a video stream and an audio stream are multiplexed into the AV stream file 515A. For example, when the content is a stereoscopic movie, the elementary streams represent a stereoscopic video, sounds, and subtitles of the movie. FIG. 6 is a schematic diagram showing a plurality of elementary streams constituting an AV stream file, in the order of playback times thereof. As shown in FIG. 6, the AV stream file 515A includes two types of primary video streams VL and VR, two types of primary audio streams A1 and A2, and two types of graphics streams PG1 and PG2. A left-view video stream V1 represents the primary video of the movie for the left eye, and a right-view video stream V2 represents the primary video of the movie for the right eye. Each of the primary audio streams A1 and A2 represents the primary audio of the movie. The two types of primary audio streams A1 and A2 have different audio languages. In addition, the output method may be different. Each of the graphics streams PG1 and PG2 represents subtitles of the movie, in the form of graphics. The graphics streams PG1 and PG2 have different subtitle languages.

For the AV stream file 515A, the MPEG-2 transport stream (TS) format is used to multiplex the plurality of elementary streams. That is, each elementary stream in the AV stream file 515A is divided into TS packets. Each TS packet is assigned a packet ID (PID). Each elementary stream has a different packet ID (PID). Thus, the elementary stream that a TS packet belongs to is identified by the PID of the TS packet. For example, as shown in FIG. 6, a PID "0x1011" is assigned to the left-view video stream V1, and a PID "0x1012" is assigned to the right-view video stream V2. To each of the primary audio stream A1 and A2, one out of "0x1100" to "0x111F" is assigned as a PID.

Figure 7:
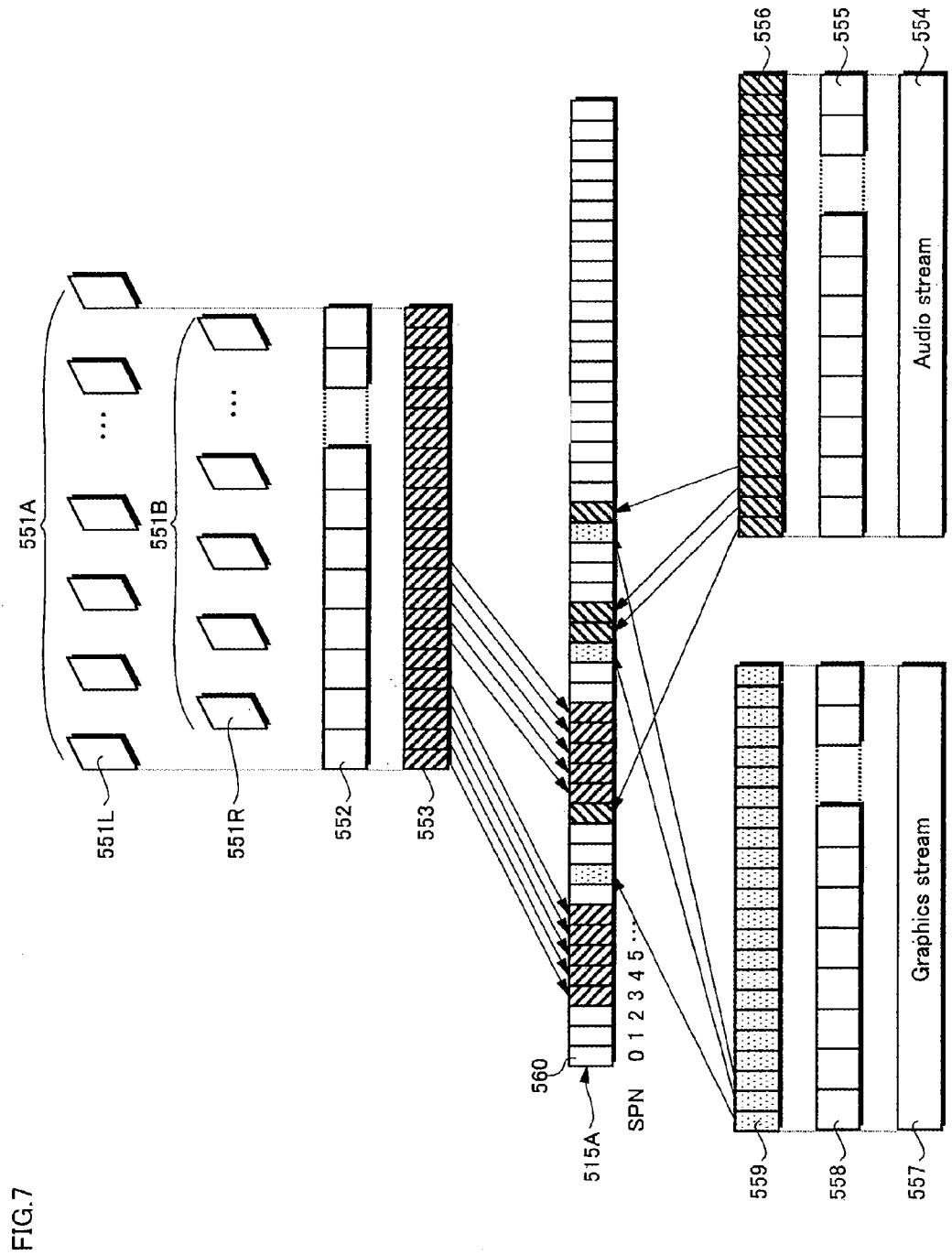
FIG. 7 is a schematic diagram showing an arrangement of TS packets of elementary streams constituting an AV stream file.

FIG. 7 is a schematic diagram showing an arrangement of TS packets of elementary streams constituting an AV stream file 515A. A left-view video stream 551A, a right-view video stream 551B, an audio stream 554 and a graphics stream 557 are first converted into a series of PES (Packetized Elementary Stream) packets 552, 555 and 558 respectively, and then converted into a series of TS packets 553, 556 and 559. Subsequently, a header is added to each of the TS packets. A TS packet with the header added is called a source packet. Finally, the source packets 560 are sequentially arranged in line to form a string of the AV clip file 515A. Here, as shown in FIG. 7, the source packets 560 are numbered from the top. Each of the numbers is called SPN (Source Packet Number). SPNs are used as addresses of the TS packets within the AV clip file 515A.

For example, a TS packet sequence 553 is obtained from the video streams 551A and 551B in the following manner. First, left-view video frames 551L contained in the left-view video stream 551A and right-view video frames 551R contained in the right-view video stream 551B are alternately converted into PES packets 552. Each PES packet 552 includes a PES header and a PES payload. Each of the video frames 551L and 551R is compressed into a single picture according to an encoding scheme such as MPEG-2, MPEG-4 AVC or VC-1, and is stored in the PES payload. Meanwhile, each PES header stores therein a display time (PTS: Presentation Time-Stamp) of the picture stored in the PES payload of the corresponding PES packet. A PTS indicates a time to output data of a single frame decoded from a single elementary stream by the decoder provided in the playback device 100. Next, generally, each PES packet 552 is converted into a plurality of TS packets 553. TS packets 553 are fixed-length packets each including a TS header and a TS payload. Each TS header includes the PID of the video stream 551A or 551B stored in the corresponding TS payload. Each PES packet 552 is generally divided into pieces, and stored in a plurality of TS payloads. Finally, a header is added to each TS packet 553, and the TS packet 553 with the header is converted into a source packet 560.

Similarly, as to the PES packet 555 converted from the audio stream 554, audio data in the LPCM (Linear Pulse Code Modulation) format is compressed according to a predetermined encoding scheme and is stored into the PES payload, and the PTS of the data is stored into the PES header. Here, as an encoding scheme for encoding the audio stream 554, AC-3, Dolby Digital Plus ("Dolby Digital" is registered trademark), DTS (Digital Theater System: registered trademark), or a DTS-HD LBR is used. As to the PES packet 558 converted from the graphics stream 557, graphics data is compressed according to a predetermined encoding scheme and is stored into the PES payload, and the PTS of the data is stored into the PES header.

<<Clip Information File 514A>>

Figure 8:
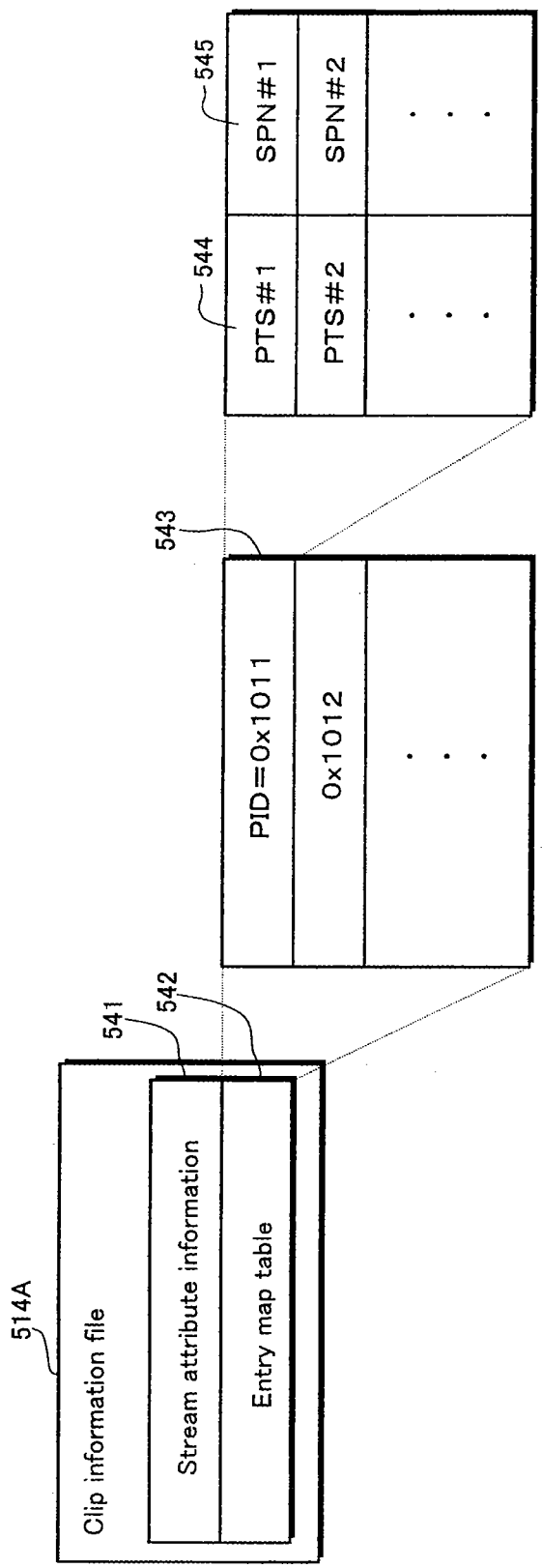
FIG. 8 is a schematic diagram showing a data structure of a clip information file.

FIG. 8 is a schematic diagram showing a data structure of a clip information file. A clip information file 514A located in the CLIPINF directory 514 corresponds one-to-one to the AV stream file 515A located in the STREAM directory 515. The clip information file 514A defines the relation between the SPN and the PTS in the corresponding AV stream file. The clip information file 514A further shows the attributes of the elementary streams multiplexed into the corresponding AV stream file 515A.

As shown in FIG. 8, the clip information file 514A includes stream attribute information 541 and an entry map table 542. The stream attribute information 541 associates attribute information sets relating to the elementary streams contained in the AV stream file 515A with the PIDs of the elementary streams. The details of the attribute information set are different among a video stream, an audio stream and a graphics stream. For example, the attribute information set associated with the PID of a video stream includes identification information of the codec used for the compression, the resolution and the aspect ratio of each picture, and the frame rate. On the other hand, the attribute information set associated with the PID of an audio stream includes identification information of the codec used for the compression, the number of the channels, the language, and the sampling frequency. These attribute information sets are used for the initialization of the decoder within the playback device 100.

The entry map table 542 defines the relation between the SPN and the PTS for each of the elementary streams. For example, as shown in FIG. 8, the entry map table 542 includes entry maps 543 corresponding one-to-one to the PIDS of the video streams. In the entry map 543, the PTS 544 of the top picture, namely the Intra picture (I picture) of each group of the pictures (GOP) in the video stream is associated with the SPN 545 of the source packet including the corresponding I picture. The playback device 100 specifies from the AV stream file 515A the source packet including one at a given PTS out of the frames contained in the video stream, by referring to the entry map 543. For example, to execute special playback such as fast-forward or rewind, the playback device 100 selects the source packets having the SPNs 545 described in the entry map from the AV stream file 515A, and sends them to the decoder. Thus, each I picture is selectively played back.

In the entry map table 542, each entry map associates the PTSs and the SPNs of specific data parts of elementary streams other than the video streams similarly. Thus, as to each of the elementary streams, the playback device 100 can specify the source packet including one at a given PTS out of the frames contained in the elementary stream, by referring to the entry map 543.

<<Playlist File 513A>>

Figure 9:
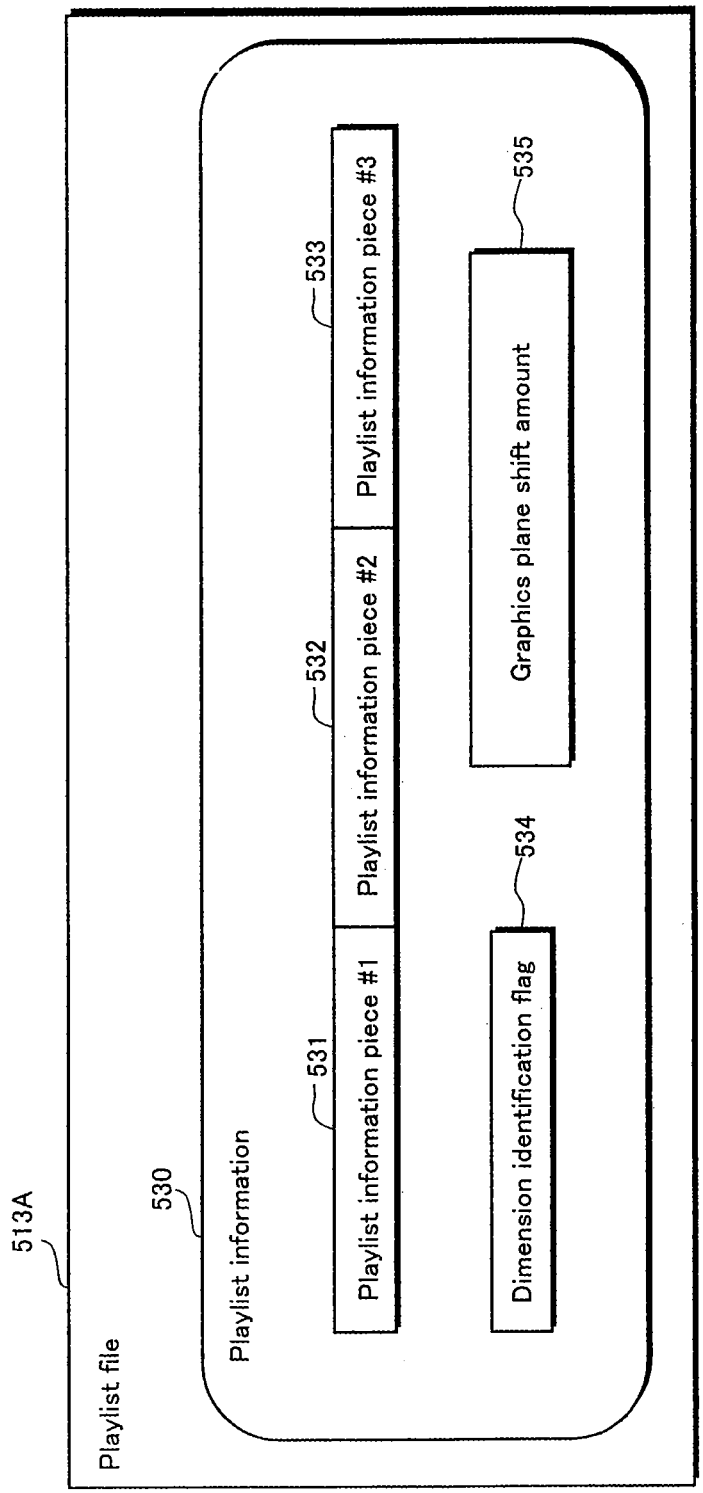
FIG. 9 is a schematic diagram showing a data structure of a playlist file.

FIG. 9 is a schematic diagram showing the data structure of the playlist file 513A. As shown in FIG. 9, the playlist file 513A includes playlist information 530. The playlist information 530 defines the playback path of the AV stream file 515A (i.e. the part to be played of the AV stream file 515A) by using the playback time (i.e. PTS) thereof. The playlist information 530 includes one or more playitem information pieces 531, 532 and 533, a dimension identification flag 534, and a graphics plane shift amount 535.

Each of the playitem information pieces 531-533 defines a part in the AV stream file 515A to be continually played back, by using a playback section, namely a pair of the playback start time and the playback end time. The playitem information pieces 531-533 are given sequential numbers. The sequential numbers represent the playback order of the parts of the AV stream file 515A specified by the playitem information pieces 531-533. The sequential numbers are also used as identifiers of the playitem information pieces 531-533, namely playitem IDs.

The dimension identification flag 534 represents the display dimensions of the playback path specified by the playitem information pieces 531-533. Display dimensions represented by the dimension identification flag 534 includes two types; two dimensions (2D) and three dimensions (3D). Hereinafter, "display dimensions are 2D" means that video images on a playback path are normal 2D video images, and "display dimensions are 3D" means that video images on a playback path are stereoscopic video images.

The graphics plane shift amount 535 represents the depths to be perceived of the graphics images, particularly including subtitles. The graphics images are represented by the graphics streams PG1 and PG2. Here, as shown in FIGS. 3A and 3B, the depth of a graphics image is determined from the displacement between the video projected to the left eye and the video projected to the right eye. Thus, the graphics plane shift amount 535 can be specifically defined as follows, for example: each of the graphics streams PG1 and PG2 includes data of the graphics image as the image to be displayed, and further includes parameters representing the display location of the graphics image within the video frame; the graphics plane shift amount 535 is specified by a pair of displacements relative to the display location represented by the parameters. One of the pair relates to the left-view video frame, and the other to the right-view video frame. The pair has the same size and opposite signs (i.e. opposite displacement directions). Each of the displacements SH1 and SH2 between the right-view image IMR and the left-view image IML shown in FIGS. 3A and 3B represents the difference between the pair of displacements represented by the graphics plane shift amount 535.

Figure 10:
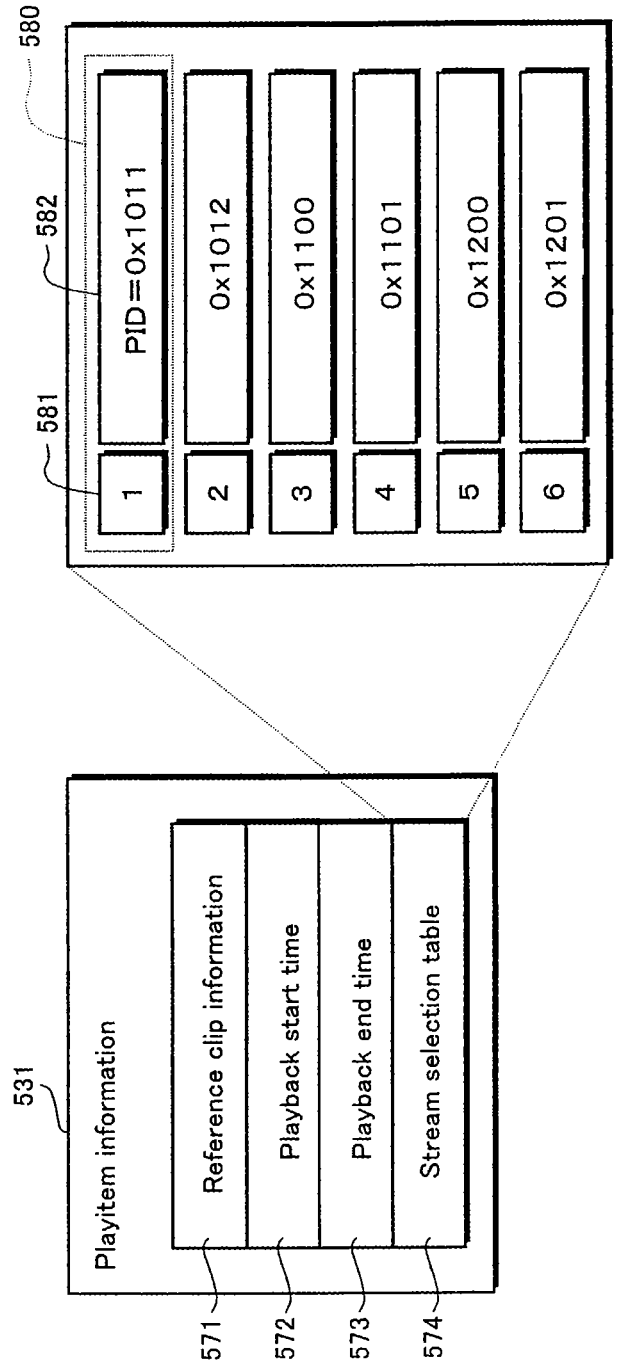
FIG. 10 is a schematic diagram showing a data structure of playitem information.

FIG. 10 is a schematic diagram showing the data structure of the playitem information piece 531. The other playitem information pieces 532 and 533 have the same data structure. As shown in FIG. 10, the playitem information piece 531 includes reference clip information 571, a playback start time 572, a playback end time 573, and a stream selection table 574. The reference clip information 571 is information for identifying clip information file 514A required for reference to the AV stream file 515A. The playback start time 572 and the playback end time 573 respectively show the top PTS and the end PTS of the part to be played contained in the AV stream file 515A. The stream selection table 574 shows a list of elementary streams selectable from the AV stream file 515A by the decoder included in the playback device 100 within the period between the playback start time 572 and the playback end time 573.

As shown in FIG. 10, the stream selection table 574 includes a plurality of stream entries 580. Each stream entry 580 includes a stream selection number 581 and a stream identifier 582. The stream selection numbers 581 are sequential numbers for the stream entries 580. Each stream identifier 582 represents the PID of one of the elementary streams multiplexed into the AV stream file 515A. The elementary stream indicated by the PID is selectable from the AV stream file 515A in the period between the playback start time 572 and the playback end time 573.

Figure 11:
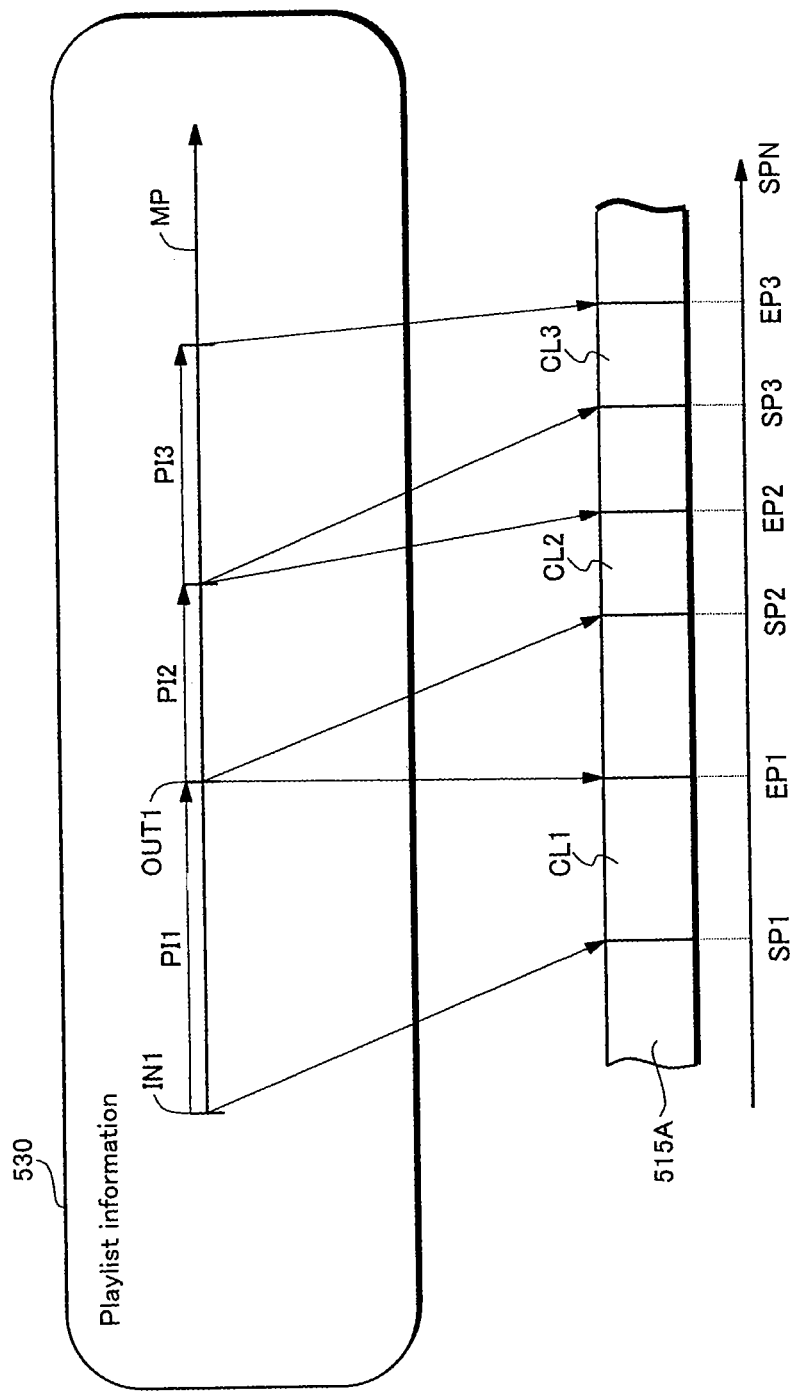
FIG. 11 is a schematic diagram showing sections of an AV stream file played back according to playlist information.

FIG. 11 is a schematic diagram showing sections CL1, CL2 and CL3 of the AV stream file 515A to be played back according to the playlist information 530. The timeline MP shown in FIG. 11 represents the playback time of the content. As explained below, the combination of the playlist information, the clip information file and the AV stream file is used for the playback of the content.

The playback device 100 refers to the playitem information piece #1 531, the playitem item information piece #2 532, and the playitem information piece #3 533, which are contained in the playlist information 530 shown in FIG. 9, in the order of the playitem IDs. For example, when referring to the playitem information piece #1 531, the playback device 100 first searches the entry map table 542 (See FIG. 8) of the clip information file 514A indicated by the reference clip information 571 (See FIG. 10) for the PTS #1 544 corresponding to the playback start time IN1. Next, playback device 100 specifies, as the start address SP1, the SPN #1 545 corresponding to the PTS #1 544. Similarly, the playback device 100 specifies the SPN corresponding to the playback end time OUT1, as the end address EP1. Subsequently, the stream attribute information 541 (See FIG. 8) of the clip information file 514A is used for detecting an elementary stream playable by both the playback device 100 and the display device 200, from the elementary streams registered in the stream selection table 574 (See FIG. 10). In this regard, if both the playback device 100 and the display device 200 support a plurality of output formats of audio data, there is a possibility that a plurality of audio streams are detected. In this manner, when a plurality of elementary streams of the same type but with different attributes are detected, the elementary stream having the smallest stream selection number 581 will be selected, and the PID 582 of the selected elementary stream will be set to the decoder. However, when the display dimensions indicated by the dimension identification flag 534 is 3D, if both the playback device 100 and the display device 200 support the stereoscopic video display, both the PID "0x1011" of the left-view video stream VL and the PID "0x1012" of the right-view video stream VR will be set to the decoder. On the other hand, if any of the playback device 100 and the display device 200 does not support the stereoscopic video display, only the PID of the left-view video stream VL will be set to the decoder. As a result, the elementary stream with a particular PID is extracted by the decoder from the section CL1 corresponding to the address range SP1-EP1 within the AV stream file 515A, and the stream data to be played back in the playback section PI1 between the playback start time IN1 and the playback end time OUT1 is decoded. Similarly, in the playback section PI2 specified by the playitem information #2 532, an elementary stream having a particular PID is extracted and decoded by the decoder from the section CL2 corresponding to the address range SP2-EP2 within the AV stream file 515A. In the playback section PI3 specified by the playitem information #3 533, an elementary stream having a particular PID is extracted and decoded by the decoder from the section CL3 corresponding to the address range SP3-EP3 within the AV stream file 515A.

<<XML File 518A>>

An XML file 518A includes various kinds of information relating to the content recorded on the optical disc 500. The information includes, for example, the identification information of the optical disc 500, the identification information of the content provider, a list of titles contained in the content, information relating to each of the titles, and thumbnail images used for displaying the list of the titles on the screen. Note that the XML file 518A is not essential for the playback of the content, and may be omitted.

<Hardware Configuration of Playback Device 100>

Figure 12:
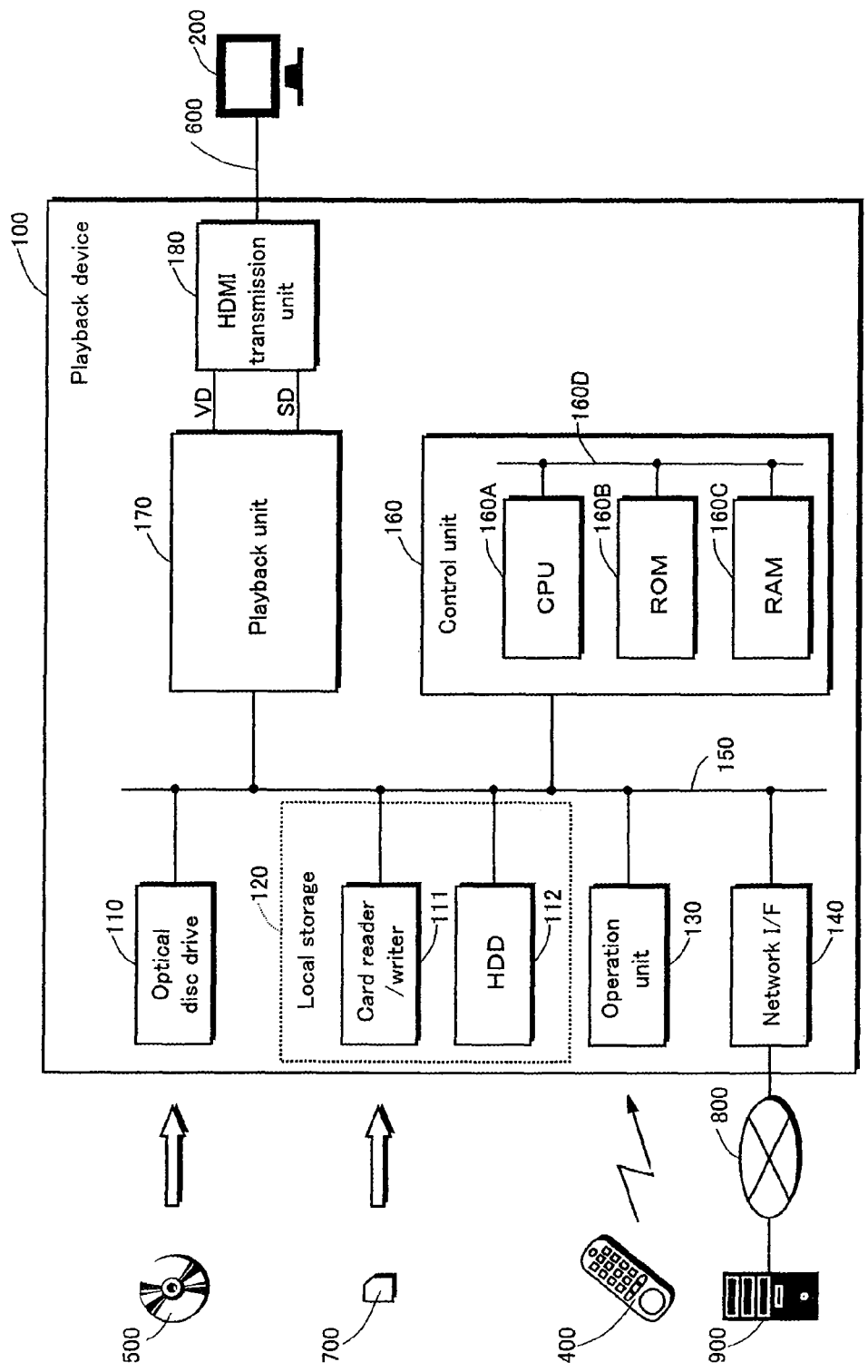
FIG. 12 is a block diagram showing a hardware configuration of the playback device shown in FIG. 1.

FIG. 12 is a block diagram showing a hardware configuration of the playback device 100. Referring to FIG. 12, the playback device 100 includes an optical disc drive 110, a local storage 120, an operation unit 130, a network interface 140, a bus 150, a control unit 160, a playback unit 170, and an HDMI transmission unit 180. The optical disc drive 110, the local storage 120, the operation unit 130 and the network interface 140 communicate with the control unit 160 and the playback unit 170 via the bus 150. Furthermore, the control unit 160 and the playback unit 170 communicate with each other via the bus 150.

The optical disc drive 100 irradiates the optical disc 500 inserted therein with a laser beam, and reads the data recorded on the optical disc 500 based on the changes in the reflected light. The optical disc drive 110 particularly supports BD-ROM discs. When instructed by the control unit 160 to perform data reading, the optical disc drive 110 reads the data from the volume area 502 (See FIG. 4) on the optical disc 500, and transfers the data to the local storage 120, the control unit 160 or the playback unit 170.

The local storage 120 is a rewritable large-capacity storage device, and is used for storing additional contents downloaded from, for example, a server device 900 on an external network 800. The additional contents are, for example, contents to be added to or to replace the original content recorded on the optical disc 500. The additional contents include, for example, secondary audio, subtitles in languages different from the original subtitles language, bonus videos, and updates of application programs. The local storage 120 may further stores parameters, tables, and the like to be used by the control unit 160 according to an application program. In FIG. 12, the local storage 120 includes a card reader/writer 111 and an HDD 112. The card reader/writer 111 reads and writes data from and to the memory card 700 inserted therein. The HDD 112 is incorporated in the playback device 100. In addition, although not shown in FIG. 12, an external HDD may be connected to the bus 150 via a given interface and be used as the local storage 120.

The operation unit 130 receives a command sent from the remote control 400 by infrared rays or by radio, decodes the command, and notifies the control unit 160 of the details of the command. In addition, the operation unit 130 detects pressing of a button provided on the front panel of the playback device 100, and notifies the control unit 160 of the detection.

The network interface 140 connects between the external network 800 and the bus 150 so that they can communicate with each other. Thus, the control unit 160 can communicate with the server device 900 on the network 800 via the network interface 140.

The control unit 160 is a microcomputer system, and includes a CPU 160A, a ROM 160B and a RAM 160C, which are connected with each other via an internal bus 160D. The ROM 160B stores therein a program (i.e. firmware) for controlling basic operations of the playback device 100. The firmware includes device drivers for the components 110-140 and 170 connected to the bus 150. The CPU 160A reads the firmware from the ROM 160B in response to, for example, the power on. This not only controls the initialization of each of the components 110-140 and 170, and but also prepares the Java platform, which is the execution environment for the BD-J object. The RAM 160C provides a work area to be used by the CPU 160A. The control unit 160 executes the firmware and the application program by using the combinations of the components 160A-160C, and controls the other components accordingly.

The control unit 160 particularly reads a desired title from the content recorded on the optical disc 500 or the local storage 120, and causes the playback unit 170 to play back the title. Specifically, the control unit 160 first reads the playlist information corresponding to the title to be played, namely the current playlist information, from the optical disc 500 or the local storage 120. Next, according to the current playlist information, the control unit 160 selects the AV stream file to be played, namely the current AV stream file. Then, the control unit 160 instructs the optical disc drive 110 or the local storage 120 to read the current AV stream file and to provide it to the playback unit 170.

On the other hand, the control unit 160 checks from the current playlist information the display dimensions indicated by the dimension identification flag. When the display dimensions are "2D", the control unit 160 notifies the playback unit 170 of the display dimensions "2D". When the display dimensions are "3D", the control unit 160 further checks whether the playback device 100 and the display device 200 support the stereoscopic video display. When at least one of the playback device 100 and the display device 200 does not support the stereoscopic video display, the control unit 160 notifies the playback unit 170 of playback dimensions being "2D". When both the playback device 100 and the display device 200 support the stereoscopic video playback, the control unit 160 notifies the playback unit 170 of "3D". In parallel, the control unit 160 reads the graphics plane shift amount from the current playlist information, and passes the amount to the playback unit 170 together with a given OSD plane shift amount. Here, the OSD plane shift amount is the depth to be perceived of the OSD. Specifically, similarly to the graphics plane shift amount, the OSD plane shift amount is specified by the displacement between the left-view and right-view video frames relative to the reference location of the OSD.

The control unit 160 also selects the PIDs of elementary streams to be separated from the current AV stream file according to the current playlist information, and notifies the playback unit 170 of the PIDs. In particular, when the playback unit 170 is notified of the display dimensions being "2D", the selected PIDs include the PID of the primary video stream. On the other hand, when the playback unit 170 is notified of the display dimensions being "3D", the selected PIDs include two PIDs of the primary video streams for the left eye and the right eye.

The control unit 160 further has the OSD function. That is, in response to a user operation received by the operation unit 130 or an instruction from an application program, the control unit 160 sends the graphics data of the corresponding OSD to the playback unit 170.

The control unit 160 also has the pop-up display function. That is, in response to a user operation received by the operation unit 130 or an instruction from an application program, the control unit 160 calls the BD-J object for controlling the pop-up display. The control unit 160 further executes an application program according to the BD-J object. The application program causes the control unit 160 to generate graphics data for the pop-up display and send it to the playback unit 170.

Figure 13A:
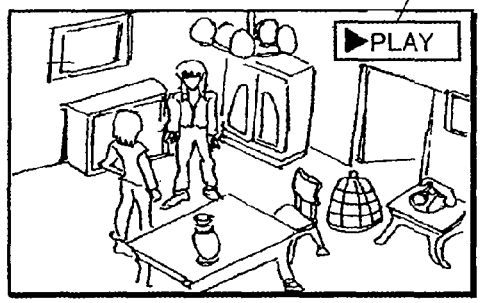
FIGS. 13A to 13F are schematic diagram showing each an OSD and a popup superimposed on a 2D video, where
Figure 13E:
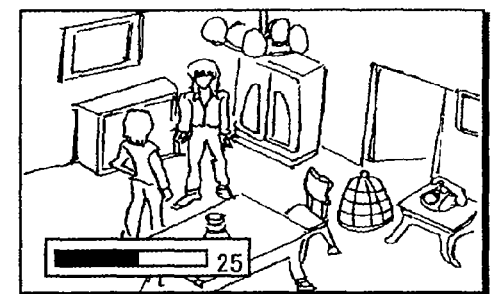
Figure 13B:
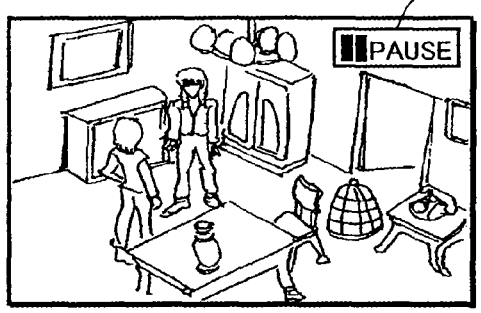
Figure 13F:
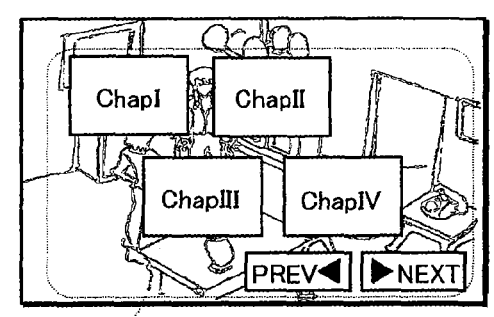
Figure 13C:
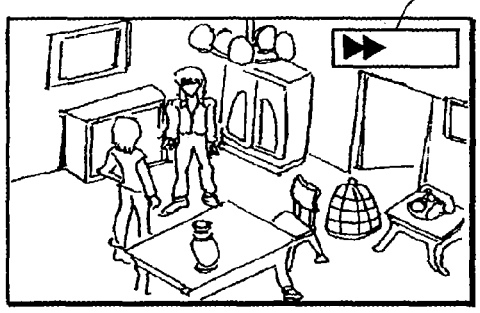
Figure 13D:
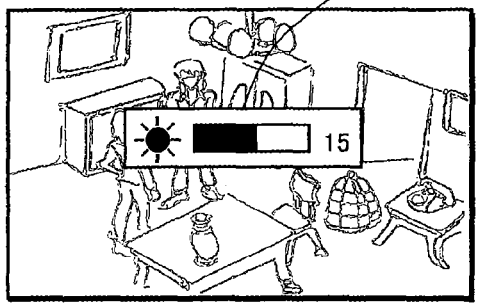

FIGS. 13A to 13F show OSDs and pop-up displays superimposed on 2D images. The OSD G1 in FIG. 13A shows a playback start. The OSD G2 in FIG. 13B shows a pause of the playback. The OSD G3 in FIG. 13C shows fast-forwarding of the playback. The OSD G4 in FIG. 13D shows the screen used for setting the brightness of the screen. The OSD G5 in FIG. 13E shows the screen for setting the volume of sound. The OSD G6 in FIG. 13F shows the screen used for selecting the chapter to be played.

After notifying the playback unit 170 of the display dimensions being "3D", when newly sending the graphics data of the OSD to the playback unit 170, the control unit 160 causes the playback unit 170 to switch the display dimensions to "pseudo 2D" and change the graphics plane shift amount to 0. After sending the graphics data of the OSD, the control unit 160 sends an OSD deletion instruction to the playback unit 170 in response to elapse of a predetermined time, a user operation, or an instruction from an application program. For example, regarding the OSD G1 shown in FIG. 13A, the deletion instruction is sent in response to elapse of a predetermined time. Regarding the OSD G2 shown in FIG. 13B, the deletion instruction is sent in response to a canceling operation of the "pause" input by the user. Regarding the OSD G3 shown in FIG. 13C, the deletion instruction is sent when the application program notifies that the playback section reaches the end of the playback path indicated by the playlist information. The OSD G4 and the OSD G5 shown in FIG. 13D and FIG. 13E are similar to those explained above. The control unit 160 further causes the playback unit 170 to change the display dimensions back to "3D".

After the control unit 160 notifies the playback unit 170 of the display dimensions being "3D", when the application program causes the control unit 160 to send the graphics data of the pop-up display to the playback unit 170, the application program causes the playback unit 170 to switch the display dimensions to "pseudo 2D", and change the graphics plane shift amount to 0. The application program further causes the control unit 160 to send the BD-J plane shift amount to the playback unit 170. Here, the BD-J plane shift amount is the depth to be perceived of the pop-up display. Specifically, similarly to the graphics plane shift amount, the BD-J plane shift amount is specified by the displacement between the left-view and right-view video frames relative to the reference location of the pop-up display.

After causing the control unit 160 to send the graphics data for the pop-up display, the application program causes the control unit 160 to send the instruction to delete the pop-up display to the playback unit 170 according to a user operation. For example, regarding the pop-up display G6 shown in FIG. 13F, when information indicating a desired chapter is received through a user operation, the application program causes the control unit 160 to send the instruction to delete the pop-up display to the playback unit 170. The application program further causes the playback unit 170 to change the display dimensions back to "3D" via the control unit 160.

The playback unit 170 reads a current AV stream file from the optical disc drive 110 or the local storage 120. Then, the playback unit 170 separates, from the read file, elementary streams having PIDs specified in advance by the control unit 160. Furthermore, the playback unit 170 decodes each of the elementary streams separated from the file. As a result, video planes are generated from video streams, audio data pieces are generated from audio streams, and graphics planes are generated from graphics streams. Subsequently, the playback unit 170 combines one each of video planes and graphics planes onto a single video frame. Furthermore, video data VD is constructed from video frames, and outputted together with audio data AD.

The playback unit 170 is, in a process for generating video planes, operable in three operation modes separately used for different display dimensions, namely "2D display mode", "3D display mode", and "pseudo 2D display mode".

When the display dimensions are specified to be "2D", the operation mode is switched to the "2D display mode". In this mode, the playback unit 170 first separates a single primary video stream, indicated by the specified PID, from the current AV stream file. Next, the playback unit 170 decodes pictures contained in the separated video stream into uncompressed video frames, and sequentially uses the video frames as video planes.

When the display dimensions are specified to be "3D", the operation mode is switched to the "3D display mode". In this mode, the playback unit 170 first separates two primary video streams indicated by two specified types of PIDs, namely left-view and right-view video streams, from the current AV stream file. Next, the playback unit 170 decodes pictures contained in each of the separated video streams into uncompressed video frames. Furthermore, the playback unit 170 alternately uses the left-view and right-view video frames one by one as a single video plane.

When the display dimensions are specified to be "pseudo 2D", the operation mode is switched to the "pseudo 2D display mode". In the pseudo 2D display mode, exactly the same process as that in the "3D display mode" is performed until the decoding of the pictures completes. However, unlike the 2D display mode, the pseudo 2D display mode uses only the left-view frames as the video planes (i.e. each left-view video frame is used twice) and the right-view video frames are discarded.

In the 3D display mode, the playback unit 170 further alternately generates graphics images represented by the graphics stream, in particular, left-view and right-view graphics planes in each of which the location of the subtitles is different in the horizontal direction. Here, the playback unit 170 uses the graphics plane shift amount to determine the shift amount between the graphics images in the graphics planes. The left-view graphics planes are combined with the left-view video frames, and the right-view graphics planes are combined with the right-view video frames. The playback unit 170 alternately outputs the left-view and right-view video frames after the combining, to the display device 200. As a result, the video and the subtitles of the current AV stream file are reproduced as a stereoscopic video.

In the pseudo 2D display mode, the graphics plane shift amount is changed to 0. Thus, the playback unit 170 repeatedly uses the generated graphics plane twice without change. That is, the horizontal location of the graphics image represented by the graphics stream is not changed. Furthermore, as explained above, the playback unit 170 uses only the left-view video frames as the video planes. Meanwhile, the playback unit 170 alternately generates the left-view and right-view OSD planes by using the OSD plane shift amount. In each of the OSD planes, the OSD has a different location in the horizontal direction. Similarly, the playback unit 170 alternately generates the left-view and right-view BD-J planes by using the BD-J plane shift amount. In each of the BD-J planes, the pop-up display has a different location in the horizontal direction. Furthermore, the playback unit 170 alternately combines the left-view OSD/BD-J plane and the right-view OSD/BD-J plane alternately for the same combination of the graphics plane and the left-view video plane. The left-view and right-view video frames resulting from the combining are alternately outputted to the display device 200. As a result, the OSD/pop-up display is reproduced as stereoscopic images, whereas the video/subtitles represented by the current AV stream file is reproduced as 2D images.

The control unit 160 and the playback unit 170 are implemented on different chips. Alternatively, the both may be implemented on a single chip. Note that the details of the functions of the control unit 160 and the playback unit 170 will be described below.

The HDMI transmission unit 180 is connected to the display device 200 via the HDMI cable 600. The HDMI transmission unit 180 receives the video data VD from the playback unit 170 and coverts it into video signals in the HDMI format. In particular, both the left-view and right-view video frames are time-division multiplexed into the video signals. Meanwhile, the HDMI transmission unit 180 receives the audio data AD from the playback unit 170 and coverts it into audio signals in the HDMI format. The HDMI transmission unit 180 further multiplexes the converted video and audio signals with a synchronization signal and accompanying data, and transmits the result to the display device 200 through the HDMI cable 600. Note that the HDMI transmission unit 180 may be incorporated in the playback unit 170. Also note that the audio signal may be outputted to an amplifier or a speaker of a surround system or the like externally attached to the display device 200.

<Details of Internal Configuration of Control Unit 160>

FIG. 14 is a functional block diagram of the control unit 160. As shown in FIG. 14, the control unit 160 includes a bus interface 161, a user operation detecting module 162, a virtual file system 163, and a playback control unit 164. The control unit 160 realizes the functional units 161-164 by executing the firmware incorporated therein.

The bus interface 161 connects the functional units included in the control unit 160 to the components 110-140 and 170 via the bus 150 such that they can communicate with each other. The bus interface 161 particularly reads the original content on the optical disc 110 from the optical disc drive 110 and an additional content from the local storage 120, according to an instruction from the virtual file system 163.

The user operation detecting module 162 receives notification INT from the operation unit 130, and identifies the user operation from the notification INT. Furthermore, the user operation detecting module 162 sends an operation signal UO indicating the details of the user operation to the playback control unit 164. Here, user operations include, for example, insertion/ejection of the optical disc 500 into/from the optical disc drive 110 and pressing of the buttons of the remote control 400 or the front panel of the playback device 100 for playback/stop/fast-forward/rewind and the like.

The virtual file system 163 manages file accesses by the playback control unit 164 to the optical disc 500 and the local storage 120. In particular, the virtual files system 163 establishes a virtual package based on the data structure 504 (See FIG. 4) of the original content on the optical disc 500 and the data structure of the additional content in the local storage 120. As a result, the application program describes the original content on the optical disc 500 and the additional content in the local storage 120 as contents on the same virtual package with no distinction from each other.

Furthermore, the virtual file system 163 reads the index file IF from the virtual package in response to an instruction COM from the playback control unit 164, and passes the index file IF to the playback control unit 164. After that, the virtual file system 163 manages the files accesses to the virtual package in response to an instruction COM from the playback control unit 164 and the operation signal UO from the user operation detecting module 162. For example, the virtual file system 163 reads, from the virtual package, scenario information to be played, namely the current scenario information pieces DS and SS, and passes them to the playback control unit 164. Here, the scenario information includes a dynamic scenario information DS and a static scenario information SS. The dynamic scenario information DS includes a movie object file, a BD-J object file and a JAR file. The static scenario information SS includes a playlist file and a clip information file. Furthermore, the virtual file system 163 causes the optical disc drive 110 or the local storage 120 to provide the playback unit 170 with the current AV stream file according to an instruction COM from the playback control unit 164.

The playback control unit 164 executes the firmware to prepare the execution environment for the application program, and under the environment, reads the application program from the dynamic scenario information DS and executes it. As a result, the playback control unit 164 controls the playback of the stream data performed by the components included in the playback device 100, according to the application program.

Specifically, when the operation signal UO from the user operation detecting module 162 indicates an insertion of the optical disc 500 into the optical disc drive 110, the playback control unit 164 first reads the index file IF from the optical disc 500, and refers to the item "First Play" in the index table therein in order to select an object specified in the item. Next, the playback control unit 164 calls the object as a piece of current dynamic scenario information DS from the optical disc 500, and executes application programs according to the object. For example, when the application programs request the building of the virtual package, the playback control unit 1534 first checks whether the additional contents for the original contents recorded in the BDMV directory 511 (See FIG. 4) on the optical disc 500 are held in the local storage 120. If the additional contents are not held, the playback control unit 164 may control the network interface 140 to cause the server device 900 to transfer the additional contents to the local storage 120. The playback control unit 164 subsequently uses an instruction COM to instruct the virtual file system 163 to establish the virtual package using the additional contents.

Next, the playback control unit 164 causes the virtual file system 163 to read the index file IF from the virtual package. After that, the playback control unit 164 selects on of the items of the index table contained in the index file IF according to the operation signal UO from the user operation detecting module 162. Furthermore, the playback control unit 164 determines, as pieces of current dynamic scenario information DS, file groups relating to the object specified in the item, and requests the virtual files system 163 for the dynamic scenario information DS by using an instruction COM. Next, the playback control unit 164 determines, as current static scenario information SS, a playlist file and a clip information file referred to by the play list file, according to the dynamic scenario information DS, and requests the virtual files system 163 for the static scenario information SS by using an instruction COM. Subsequently, the playback control unit 164 selects the current AV stream file according to the static scenario information SS, and specifies the current AV stream file to the virtual file system 164 by using an instruction COM.

Meanwhile, the playback control unit 164 checks the display dimensions indicated by the dimension identification flag from the current playlist information contained in the current static scenario information SS. Furthermore, the playback control unit 164 assigns 2D or 3D as display dimensions to the playback unit 170, depending on the value of the display dimensions indicated by the dimension identification flag and whether or not the playback device 100 and the display device 200 support stereoscopic video display. When setting the display dimensions to 3D, the playback control unit 164 reads the graphics plane shift amount from the current playlist information, and passes the amount to the playback unit 170 together with the OSD plane shift amount. The playback control unit 164 notifies the playback unit 170 of the PIDs of elementary streams to be separated from the current AV stream file.

As shown in FIG. 14, the playback control unit 164 includes a dynamic scenario memory 1641, a static scenario memory 1642, a mode management module 1643, an HDMV module 1644, a BD-J module 1645*m* an AV playback library 1646, and an OSD control module 1647.

Each of the dynamic scenario memory 1641 and the static scenario memory 1642 is one of the areas of the RAM 160C included in the control unit 160 (See FIG. 12). The dynamic scenario memory 1641 receives from the virtual file system 163 the current dynamic scenario information DS, namely the movie object file, the BD-J object file or the JAR file, and stores the received file. These files will be processed by the HDMV module 1644 or the BD-J module 1645. The static scenario memory 1642 receives from the virtual file system 163 the current static scenario information piece SS, namely the current playlist file and the clip information file, and stores the received file. The static scenario information SS is referred to by the AV playback library 1646.

The mode management module 1643 receives and holds the index file IF from the virtual file system 163. Furthermore, the mode management module 1643 uses the index file IF to manage the operation mode of the playback device 100. Specifically, the mode management module 1643 selects one of the items from the index table contained in the index file IF in response to the operation signal UO from the user operation detecting module 162, and assigns the current dynamic scenario information DS to the HDMV module 1644 or the BD-J module 1645 according to the type of the object specified in the item. Specifically, when the object is a movie object, the current dynamic scenario information DS is assigned to the HDMV module 1644, and when the object is a BD-J object, the current dynamic scenario information DS is assigned to the BD module 1645. The former operation mode is the HDMV mode, and the latter operation mode is the BD-J mode. Moreover, when the operation signal UO from the user operation detecting module 162 indicates switching between the operation modes or when the mode management module 1643 is instructed by either of the modules 1644 and 1645 to switch between the operation modes, the mode management module 1643 switches the modules to be assigned the dynamic scenario information DS, between the modules 1644 and 1645.

The mode management module 1643 includes a dispatcher 1643A. The dispatcher 1643A receives operation signals UOs from the user operation detecting module 162, selects from them an operation signal UO appropriate for the current operation mode, and passes the selected signal UO to the module to be assigned the dynamic scenario information DS, namely the module 1644 or the module 1645. For example, when the operation signal UO indicates fast-forwarding playback/rewinding playback, the dispatcher 1643A passes the operation signal UO to the HDMV module 1644 if the operation mode is the HDMV mode, and passes the operation signal UO to the BD-J module 1645 if the operation mode is the BD-J mode. On the other hand, when the operation signal UO indicates insertion of the optical disc 500 into the optical disc drive 110, the dispatcher 1643A instructs the virtual files system 163 to read the index file IF by using an instruction COM, through the AV playback library 1646. The read index file IF will be held by the mode management module 1643. The dispatcher 1643A passes the operation signal UO to the OSD control module 1647 as well, according to the operation indicated by the operation signal UO.

The HDMV module 1644 is a virtual DVD player, and controls the playback of the titles from the optical disc 500 similarly to the control of the playback by common DVD players. Specifically, the HDMV module 1644 reads a movie object from the dynamic scenario information DS in the dynamic scenario memory 1641, and executes the navigation commands contained therein in the arranged order. Thus, the HDMV module 1644 sequentially instructs the AV playback library 1646 to execute the processes indicated by the navigation commands.

The BD-J module 1645 is a Java platform, and particularly includes the Java virtual machine. The BD-J module 1645 reads a BD-J object from the dynamic scenario information DS in the dynamic scenario memory 1641, converts it into native codes for the CPU 160A (See FIG. 12) included in the control unit 160, and passes the native codes to the AV playback library 1646. Thus the BD-J module 1645 instructs the AV playback library 1646 to execute the playback of the title indicated by the BD-J object. The BD-J module 1645 also causes the network interface 140 to communicate with the server device 900 according to the BD-J object and to download an additional content from the server device 900 to the local storage 120.

In addition, the BD-J module 1645 executes a Java application program for controlling the pop-up display, in response to the operation signal UO. The Java application program uses the application program interface (API) provided in the AV playback library 1646 to generate graphics data GD1 for the pop-up display and animations. The pop-up display includes, for example, an interactive screen for GUI, such as a screen G6 for selection from chapters as shown in FIG. 13F, and a menu screen. The animations include, for example, the movie scene SCN, the movie title TL, and the owl animation CR, as shown in FIG. 5B. For the graphics data GD1, raster data such as JFIF (JPEG) or PNG is used. The Java application program further causes the BD-J module 1645 to send the graphics data GD1 to the playback unit 170 via the bus interface 161 and the bus 150. The details of the control of the pop-up display, performed by the Java application program, will be explained below.

The AV playback library 1646 instructs an AV playback process or a playlist playback process according to instructions from the modules 1644 and 1645. The "AV playback process" is a basic process to be performed by playback devices for optical discs, inherited from common DVD players and CD players. For example, the AV playback process includes start and stop of playback, pause on and off, still off, forward play, backward play, switching of audio types, switching of subtitles types, switching of angles, and the likes. On the other hand, the "playlist playback process" mainly means playback of titles according to static scenario information SS. That is, in the playlist playback process, a current AV stream file is selected according to current playlist information, and then specified to the virtual files system 163 with an instruction COM. In addition, the playlist playback process includes the building of a virtual package and the transfer of scenario information DS and SS from the virtual package to the scenario memories 1641 and 1642. The functions for the AV playback process and the playlist playback process are implemented as APIs in the playback library 1646. The AV playback library 1646 executes APIs corresponding to an instructed process, and sends instructions COM to the optical disc drive 110, the local storage 120, the playback unit 170, and the like, via the virtual file system 163. Thus, the AV playback library 1643 realizes the instructed process.

The AV playback library 1646 further includes a register 1646A, a dimension judgment unit 1646B, and a playback mode control API 1646C.

The register 1646A stores parameters showing the current setting states of the playback device 100 and the display device 200, parameters showing settable states thereof, and parameters showing initial settings thereof. The parameters showing the current setting states include, for example, stream selection numbers of the audio and graphics streams to be decoded, and identifiers of the current playlist information and the current playitem information. The parameters showing settable states include, for example, selectable types of audio/subtitles languages and selectable types of encoding format for audio data. The AV playback library 1646 refers to the register 1646A according to the instructions from the modules 1644 and 1645. Thus, elementary streams playable by both the playback device 100 and the display device 200 are detected from the elementary streams registered in the stream selection table of each playitem information piece. Furthermore, the AV playback library 1646 selects the elementary stream with the smallest stream selection number from the detected elementary streams, and stores the stream selection number into the register 1646A. At the same time, predetermined attributes, such as the encoding format and the language types among the attributes of the elementary stream indicated by the stream selection number, are read from the stream attribution information 541 (See FIG. 8) in the clip information file 514A, and are stored into the register 1646A. The AV playback library 1646 further notifies the playback unit 170 of the PID of the selected stream. At this moment, the AV playback library 1646 transfers information required for the decoding of the selected elementary stream, such as the type of the decoding format, from the register 1646A to the playback unit 170.

The dimension judgment unit 1646B checks from the current playlist information the display dimensions indicated by the dimension identification flag. When the display dimensions are "2D", the dimension judgment unit 1464B sets the display dimensions to "2D". When the display dimensions are "3D", the dimension judgment unit 1464B accesses the register 1646A and checks whether the playback device 100 and the display device 200 support the stereoscopic video display. When at least one of the playback device 100 and the display device 200 does not support the stereoscopic video display, the dimension judgment unit 1464B sets the display dimensions to "2D". When both the playback device 100 and the display device 200 support the stereoscopic video playback, the dimension judgment unit 1464B sets the display dimensions to "3D". The dimension judgment unit 1464B sends a dimension signal DIM indicating the display dimensions set in the above-explained manner to the playback unit 170 via the bus interface 161 and the bus 150. In parallel, the dimension judgment unit 1464B reads the graphics plane shift amount GS from the current playlist information, and passes the amount to the playback unit 170 together with a given OSD plane shift amount OS.

The playback mode control API 1646C is executed by the AV playback library 1646 in response to a call from the modules 1644, 1645, or 1647. In the execution, the operation mode of the playback unit 170 is first checked. When the operation mode is the "3D display mode", the AV playback library 1646 further causes the playback unit 170 to temporarily save the graphics plane shift amount and BD-J plane shift amount that have been already set thereto, according to the playback mode control API 1646C, and then reset both of them to 0. As areas for the saving, a memory element in the playback unit 170 or the RAM 160C in the control unit 160 is used. Furthermore, the AV playback library 1646 sends a dimension signal DIM showing that display dimensions are "pseudo 2D" to the playback unit 170 via the bus interface 161 and the bus 150, according to the playback mode control API 1646C. Thus, the AV playback library 1646 causes the playback unit 170 to switch to the "pseudo 2D display mode". On the other hand, when the operation mode of the playback unit 170 is the "pseudo 2D display mode" at the time the playback mode control API 1646C is called, the AV playback library 1646 causes the playback unit 170 to switch to the "3D display mode", by using the dimension signal DIM. Furthermore, the AV playback library 1646 causes the playback unit 170 to restore the graphics plane shift amount and the BD-J plane shift amount from the saving areas, according to the playback mode control API 1646C.

The OSD control module 1647 generates graphics data GD2 of the corresponding OSD according to an operation signal UO or an instruction from one of the other modules 1644 and 1645, and passes the graphics data GD2 to the playback unit 170 via the bus interface 161 and the bus 150. Furthermore, the OSD control module 1647 calls the playback mode control API 1646C. When the operation mode of the playback unit 170 is the "3D display mode", the OSD control module 1647 causes the playback unit 170 to switch the "pseudo 2D display mode". After transmitting the graphics data GD2, when a predetermined time has elapsed, a new operation signal UO has been received, or an instruction has been received from one of the other modules 1644 and 1645, the OSD control module 1647 sends an OSD deletion request RQ2 to the playback unit 170. At this moment, the OSD control module 1647 further calls the playback mode control API 1646C, and causes the playback unit 170 to return from the "pseudo 2D display mode" to the "3D display mode".

The Java application program controls the pop-up display in the following manner. The Java application program causes the BD-J module 1645 to generate the graphics data GD1 and the BD-J plane shift amount BS for the corresponding pop-up display and send them to the playback unit 170 via the bus interface 161 and the bus 150. Furthermore, the Java application program calls the playback mode control API 1646C via the BD-J module 1645. As a result, the playback unit 170 switches to the "pseudo 2D display mode" if it is in the "3D display mode". After transmitting the graphics data GD1 and the BD-J plane shift amount BS, on receipt of a new operation signal UO, the Java application program sends a pop-up display deletion request RQ1 to the playback unit 170 by using the API. At this moment, the Java application program further calls the playback mode control API 1646C. As a result, the playback unit 170 returns from the "pseudo 2D display mode" to the "3D display mode".

<Details of Internal Configuration of Playback Unit 170>

Figure 15:
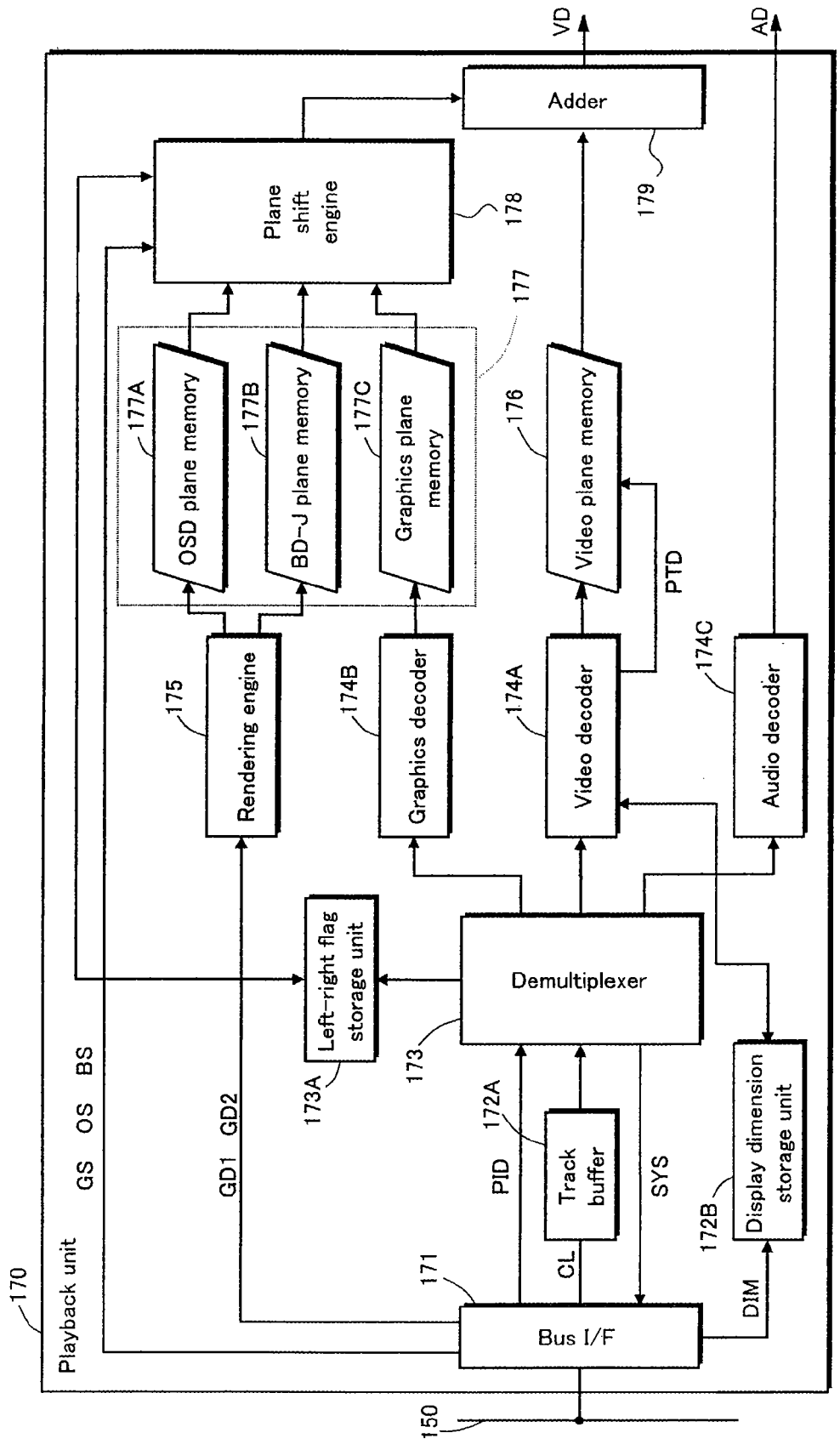
FIG. 15 is a functional block diagram of the control unit shown in FIG. 14.
Figure 16:
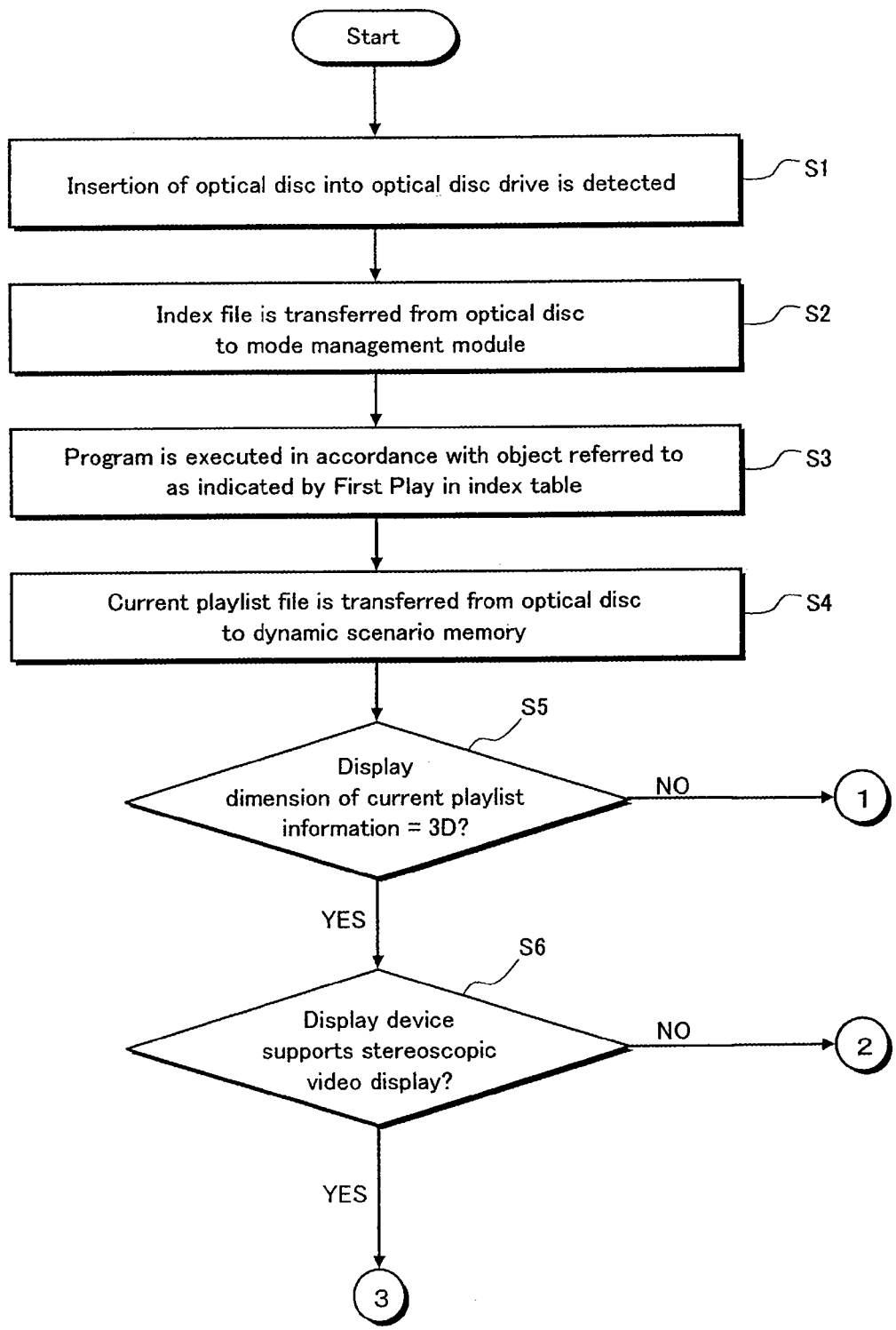
FIG. 16 is the first part of a flowchart of a playlist playback process to be executed by the playback device immediately after an optical disc is inserted into the optical disc drive.

FIG. 15 is a functional block diagram of the playback unit 170. Referring to FIG. 15, the playback unit 170 includes a bus interface 171, a track buffer 172A, a display dimension storage unit 172B, a demultiplexer 173, a left-right flag storage unit 173A, a video decoder 174A, a graphics decoder 174B, an audio decoder 174C, a rendering engine 175, a video plane memory 176, an image plane memory 177, a plane shift engine 178, and an adder 179. The image plane memory 177 includes an OSD plane memory 177A, a BD-J plane memory 177B, and a graphics plane memory 177C. These functional units are implemented on a single chip. Alternatively, some of the functional units may be implemented on a different chip.

The bus interface 171 connects the functional units included in the playback unit 170 to the optical drive 110, the local storage 120, and the control unit 160 that are shown in FIG. 12 via the bus 150 such that they can communicate with each other. The bus interface particularly transfers the current AV stream file CL from the optical disc drive 110 or the local storage 120 to the track buffer 172A, according to an instruction from the virtual file system 163.

The track buffer 172A is a first-in first-out (FIFO) memory incorporated in the playback unit 170. The track buffers 172A and 172B reads the AV stream file CL from the bus interface 171 and temporarily hold it.

The display dimension storage unit 172B stores flags showing display dimensions in a rewritable manner. The flags include one indicating that display dimensions are "2D", one indicating that display dimensions are "3D", and one indicating that display dimensions are "pseudo 2D". At receipt of each dimension signal DIM from the control unit 160 via the bus interface 171 and the bus 150, the display dimension storage unit 172B sets the flag corresponding to the display dimensions indicated by the dimension signal DIM, and clears the other flags.

The demultiplexer 173 receives the PID of an elementary stream to be separated from the current AV stream file CL from the AV playback library 1646. Next, the demultiplexer 173 reads the current AV stream file CL from the track buffer 172A in units of source packets, and extracts a TS packet from each source packet. Furthermore, the demultiplexer 173 reads a PID from the TS header of the TS packet, and compares the read PID with the PID of the elementary stream to be separated. The demultiplexer 173 extracts the TS packet when the PIDs are identical, and thus collects such TS packets in association with their respective PIDs. The demultiplexer 173 reconstructs PES packets from the TS packets collected in the above-explained manner, and sends the PES packets to one of the three types of decoders 174A-174C according to the PID. For example, when the PID of a TS packet is 0x1011 or 0x1012, the PES packet reconstructed from the TS packet is sent to the video decoder 174A. When the PID is one out of 0x1100 to 0x111F, the PES packet is sent to the audio decoder 174C. When the PID is one out of 0x1200 to 0x121F, the PES packet is sent to the graphics decoder 174C.

Here, the information multiplexed into the current AV stream file CL may include information that will be used by the application program as the dynamic scenario information, such as a Navigation Button contained in the graphics stream. When separating such information from the current AV stream file CL, the demultiplexer 173 transfers the separated information SVS to the dynamic scenario memory 1641 (See FIG. 14) via the bus interface 171.

When the PIDs of the elementary streams to be separated from the current AV stream file CL include both the PID "0x1011" of the left-view video stream and the PID "0x1012" of the right-view video stream, every time the demultiplexer 173 reconstructs a PES packet from the TS packet having the PID 0x1011 or the PID 0x1012 and sends it to the video decoder 174A, the demultiplexer 173 sends a left-right signal L/R that shows which between 0x1011 and 0x1012 the PID is to the left-right flag storage unit 173.

The left-right flag storage unit 173A stores a left-right flag in a rewritable manner. The left-right flag shows whether a video plane is for the left eye or the right eye; the video plane is to be decoded from a PES packet being processed by the video decoder 174A. For example, the on state of the left-right flag shows that the video plane is for the left eye, and the off state of the left-right flag shows that the video plane is for the right eye. In this case, the left-right flag storage unit 173A sets the left-right flag to on when the left-right signal L/R shows the PID "0x1011" of left-view video stream, and clears the left-right flag when the left-right signal L/E shows the PID "0x1012" of right-view video stream. Thus, the left-right flag storage unit 173A changes states of the left-right flag, or "flips the flag", at receipt of each left-right signal L/R.

The video decoder 174A receives information from the AV playback library 1646; the information required for decoding a primary video stream to be decoded, such as a type of encoding format. Furthermore, the video decoder 174A accesses the display dimension storage unit 172B, and checks display dimensions. The video decoder 174A determines a type of decoding according to the information and the display dimensions. After that, the video decoder 174A receives PES packets of the primary video stream from the demultiplexer 173, and accumulates the PES packets in an internal buffer. In parallel, the video decoder 174A reads PES packets from the buffer and removes the PES headers thereof, and extracts encoded pictures from the PES payloads and decodes them into uncompressed video frames.

The video decoder 174A has three operation modes separately used for different display dimensions, namely "2D display mode", "3D display mode" and "pseudo 2D display mode", as described below. These operation modes correspond to the three operation modes of the playback unit 170. The video decoder 174A accesses the display dimension storage unit 172B to check display dimensions, and selects an operation mode according to the display dimensions.

When the display dimensions are 2D, the video decoder 174A switches to the "2D display mode". In the 2D display mode, the video decoder 174A sequentially writes uncompressed pictures into the video plane memory 176 at the times indicated by PTSs specified in the original PES headers.

When the display dimensions are 3D, the video decoder 174A switches to the "3D display mode". In the 3D display mode, the demultiplexer 173 sorts PES packets into two buffers in the video decoder 174A according to the PIDs of the PES packets. As a result, the PES packets of left-view and right view video streams are separated into the two buffers. Furthermore, the video decoder 174A extracts PES packets alternately from the two, buffers, and decodes pictures contained therein into uncompressed video frames. Each time one of the compressed video frames is decoded, the video decoder 174A accesses the display dimension storage unit 172B to check display dimensions. If the display dimensions are still 3D, the video decoder 174A first writes each of the uncompressed video frames into the video plane memory 176 at the time indicated by a PTS specified in the original PES header. That is, the left-view and right-view video frames are alternately written into the video plane memory 176. Meanwhile, the video decoder 174A distinguishes which buffer has stored each PES packet from which one of the uncompressed video frames is decoded, that is, whether the video frame is for the left eye or the right eye. The video decoder 174A then notifies the video plane memory 176 of the result of the distinction by using a switching signal PTD.

On the other hand, when the display dimensions have been changed to pseudo 2D, the video decoder 174A switches from the "3D display mode" to the "pseudo 3D display mode". In the pseudo 2D display mode, similarly to the 3D display mode, the video decoder 174A first decodes pictures alternately from the two buffers into uncompressed video frames, and alternately writes the uncompressed video frames into the video plane memory 176 at the time indicated by corresponding PTSs. Meanwhile, the video decoder 174A fixes the state of the switching signal PTD regardless of which buffer stored PES packets from which the uncompressed video frames have been decoded, so that the switching signal PTD indicates that the buffer is assigned to PES packets of left-view video streams, i.e., the video frames are for the left eye.

The graphics decoder 174B receives PES packets of a graphics stream from the demultiplexer 173, extracts encoded graphics data from each of the PES packets, and decode it into uncompressed graphics data. Furthermore, the graphics data writes the uncompressed graphics data into the graphics plane memory 177C at the time indicated by the PTS described in the PES packet.

The audio decoder 174C receives, from the AV playback library, information required for the decoding of the primary audio stream to be decoded, such as the type of the decoding format. Furthermore, the audio decoder 174C determines the type of the decoding according to the received information. After that, the audio decoder 174C receives PES packets of a primary audio stream from the demultiplexer 173, and accumulates the PES packets in the internal buffer. In parallel, the audio decoder 174C reads each PES packet from the buffer and removes the PES header thereof, and extracts encoded LPCM format audio data from the PES payload and decodes them into uncompressed format data. Furthermore, the audio decoder 174C outputs the uncompressed audio data AD at the time indicated by the PTS described in the TS packet.

The rendering engine 175 is provided with software such as Java2D or Open-GL. The rendering engine 175 generates and writes graphics data into the BD-J plane memory 177B according to a Java application program through the BD-J module 1645. In particular, on receipt of graphics data GD1 for a pop-up display from the BD-J module 1645, the rendering engine 175 generates a BD-J plane from the graphics data GD1, and writes it into the BD-J plane memory 177B. Furthermore, on receipt of graphics data GD2 for an OSD from the OSD control module 1647, the rendering engine 175 generates an OSD plane from the graphics data GD2, and writes it into the OSD plane memory 177A. On receipt of a pop-up display deletion request RQ1 from the Java application program through the BD-J module 1645, the rendering engine 175 deletes the BD-J plane on the BD-J plane memory 177B. On the other hand, on receipt of an OSD deletion request RQ2 from the OSD control module 1647, the rendering engine 175 deletes the OSD plane on the OSD plane memory 177A.

The video plane memory 176 is a two-dimensionally arrayed data area secured in the built-in memory of the playback unit 170. The video plane memory 176 particularly includes two arrays of such data areas. The size of each array is equal to the size of a single video frame. Each element of the array stores a single pixel data piece. Each pixel data piece is consisted of the combination of a color coordinate value and an α value (opacity). The color coordinate value is represented as an RGB value or a YCrCb value. Uncompressed video frames are written into each array of the video plane memory 176 one by one by the video decoder 174A writes one by one. The video frames constitute a single video plane representing a primary video for a movie.

In particular, when the display dimensions are "3D" or "pseudo 2D", uncompressed video frames from the video decoder 174A are alternately written into the arrays in the video plane memory 176. Meanwhile, the video plane memory 176 receives a switching signal PTD from the video decoder 174A, and outputs a video plane from one of the two arrays according to the state of the signal. When the display dimensions are "3D", the state of the switching signal PTD changes every time an uncompressed video frame is written into one of the arrays. Thus, the video planes are alternately outputted from one of the arrays. Meanwhile, when the display dimensions are "pseudo 2D", the switching signal PTD is fixed to indicate that the uncompressed video frames are for the left-view video plane. Thus, the video planes are outputted from only the array into which the left-view video frames are written, and the video planes in the array into which the right-view video frames are written are discarded.

Each of the OSD plane memory 177A, the BD-J plane memory 177B and the graphics plane memory 177C is a two-dimensionally arrayed data areas secured in the built-in memory of the playback unit 170. The video plane memory 176 particularly includes two arrays of such data areas. The size of each array is equal to the size of a single video frame. Each element of the array stores a single pixel data piece. Each pixel data piece is consisted of the combination of a color coordinate value and an α value (opacity). The color coordinate value is represented as an RGB value or a YCrCb value. In the graphics plane memory 177C, a single graphics plane including a graphics image, in particular subtitles of the movie to be superimposed on the primary video image is constructed from the uncompressed graphics data written by the graphics decoder 174B. In OSD plane memory 177A, a single OSD plane including an OSD to be superimposed on the primary video image is constructed from the graphic data written by the rendering engine 175. In the BD-J plane memory 177B, a single BD-J plane including a pop-up display and animation images to be superimposed on the primary video image are constructed from the graphics data written by the rendering engine 175.

The plane shift engine 178 performs "plane shifting" of the plane memories 177A-177C by using the plan shift amounts for the image plane memory 177, namely the OSD plane shift amount, the BD-J plane shift amount and the graphics plane shift amount. Here, the plane shift amounts respectively represent the depths of the graphics images contained in the planes constructed in the plane memories 177A-177C. Specifically, each plane shift amount is specified by a relative displacement of the graphics image in each of the left-view and right view video frames with respective to the reference location for the graphics image. The displacements of the both video frames are equal in size, but the signs are opposite, that is, the directions of the displacements are opposite. The plane shift amounts are stored in the built-in memory of the plane shift engine 178.

The plane shifting is a process for converting a plane for 2D video display to that for stereoscopic video display. Specifically, the plane shift engine 178 performs the following operations. Every time a single plane is written into one of the plane memory 177A-177C, the plane shift engine 178 accesses the left-right flag storage unit 173A to check the state of the left-right flag. When the state of the left-right flag indicates a left-view video plane, the plane shift engine 178 selects the displacement for the left-view video frame from the plane shift amounts corresponding to the plane to be processed. When the state of the left-right flag indicates a right-view video plane, the plane shift engine 178 selects the displacement for the right-view video frame. Furthermore, the plane shift engine 178 processes each plane by using the selected displacement, and passes the processed planes to the adder 179. Before and after the processing, the horizontal locations of the graphics image differ by the displacement. In the stated manner, the left-view plane is generated when the displacement for the left-view frame is used, and the right-view plane is generated when the displacement for the right-view frame is used. The details of this processing will be explained below.

When the display dimension storage unit 172B switches the display dimensions to 3D according to a dimension signal DIM, the plane shift engine 178 accordingly receives the graphics plane shift amount GS and the OSD plane shift amount OS. After that, every time a single graphics plane is written into the graphics plane memory 177C, the plane shift engine 178 performs the plane shifting on the graphics plane by using the graphics plane shift amount GS. As a result, left-view and right-view graphics planes are alternately generated and outputted, the planes having graphics images, particularly subtitles, represented by the graphics stream, at different display locations in the horizontal direction.

The plane shift engine 178 also receives a BD-J plane shift amount BS from the BD-J module 1645. Thereafter, every time a single BD-J plane is written into the plane memory 177B, the plane shift engine 178 performs the plane shifting on the BD-J plane by using the BD-J plane shift amount BS. As a result, left-view and right-view BD-J planes, having a graphics image contained in the original BD-J plane at different display locations in the horizontal direction, are generated and outputted alternately.

When the AV playback library 1646 starts up the playback mode control API 1646C, the plane shift engine 178 saves the already-set graphics plane shift amount and BD-J plane shift amount according to an instruction from the AV playback library 1646, and changes both of them to 0. Here, the memory in the plane shift engine 178 or the RAM 160C is used as the saving area. Thereafter, graphics plane shift amount is 0, and thus the plane shifting for the graphics plane on the graphics plane memory 177C substantially stops. The plane shift engine 178 therefore outputs twice each graphics image represented by the graphics stream, in particular, each of the graphics planes having subtitles at the same display location in the horizontal direction. The same applies to BD-J planes.

Meanwhile, every time a single OSD plane is written into the OSD plane memory 177A, the plane shift engine 178 performs the plane shifting on the OSD by using the OSD plane shift amount OS. As a result, left-view and right-view OSD planes, having OSD images at different display locations in the horizontal direction, are generated and alternately outputted.

Furthermore, on receipt of a new BD-J plane shift amount BS from the BD-J module 1645, every time a single BD-J plane is written into the BD-J plane memory 177B, the plane shift engine 178 thereafter performs the plan shifting on the BD-J plane by using the new BD-J plane shift amount BS. In this case, the BD-J plane includes a pop-up display. As a result, left-view and right-view BD-J planes having different display locations in the horizontal direction of the pop-up display are generated and alternately outputted.

After that, when the AV playback library 1646 restarts the playback mode control API 1646C, the plane shift engine 178 restores the graphics plane shift amount and the BD-J plane shift amount from the saving area, according to an instruction from the AV playback library 1646.

The adder 179 combines the OSD plane, the BD-J plane or the graphics plane outputted from the plane shift engine 178 onto a single video plane outputted from the video plane memory 176 to generate a single video frame. Furthermore, video data VD is constructed from the video frame and outputted. In particular, when the display dimensions are 3D, the adder 179 combines a left-view graphics plane, a left-view BD-J plane and a left-view video plane onto a left-view video frame, and combines a right-view graphics plane, a right-view BD-J plane and a right-view video plane onto a right-view video frame. In the stated manner, the left-view and right-view video frames are alternately outputted. On the other hand, when the display dimensions are pseudo 2D, the adder 179 alternately combines a left-view OSD/BD-J plane and a right-view OSD/BD-J plane with the same combination of the graphics plane and the left-view video plane. Thus, left-view and right view video frames are generated and alternately outputted.

<Procedure of Playback Performed by Playback Device 100>

FIGS. 16-20 are flowcharts showing the playlist playback processing performed by the playback device 100 immediately after the optical disc 500 is inserted into the optical disc driver 100. Here, a state where the control unit 160 has completed the initialization of the functional units according to the firmware in response to the power-on of the playback device 100 is assumed. That is, in particular, the state where the playback control unit 164 has already prepare the execution environment of the application program. In the initialization, the AV playback library 1646 stores into the register 1646A the parameters for the setting of the playback device 100 and the display device 200, in particular, supporting modes for the stereoscopic video display. The following explains how the display device 100 uses the above-described components to realize the playlist playback processing, in the order of Steps shown in FIGS. 16-20.

Step S1: The operation unit 130 detects insertion of the optical disc 500 into the optical disc drive 110, and sends a notification INT indicating the detection to the user operation detecting module 162. The user operation detecting module sends an operation signal UO to the playback control unit 164 in response to the notification INT. In the playback control unit 164, the dispatcher 1643A notifies the OSD control module 1647 of the insertion in response to the operation signal UO. Furthermore, the dispatcher 1643A instructs the virtual file system 163 to read the index file IF through the AV playback library 1646, by using an instruction COM. Furthermore, the mode management module 1643 refers to the item "First Play" in the index table and selects an object specified in the item. Here, the object is assumed as a BD-J object that is accompanied with the building of a virtual package. In this case, the mode management module 1643 instructs the virtual file system 163 through the AV playback library 1646 to transfer the BD-J object to the dynamic scenario memory 1641. Meanwhile, the dispatcher 1643A also notifies the BD-J module 1645 of the insertion of the optical disc 500 into the optical disc drive 110.

In response to the notification, the OSD control module 1647 passes OSD graphics data GD2 showing the insertion of the optical disc to the playback unit 170. The playback unit 170 generates an OSD plane from the graphics data GD2. Here, when the playback unit 170 is in an initial state, the operation mode is usually the 2D display mode. At this moment, no video plane has been generated. Thus, the OSD plane is used and outputted for the video data VD. The video data VD is further sent to the display device 200 through the HDMI transmission unit 180 and the HDMI cable 600. As a result, an OSD is displayed on the screen of the display device 200 as a two-dimensional image. When a predetermined time has been elapsed after the sending of the graphics data GD2, the OSD control module 1647 sends an OSD deletion request RQ2 to the playback unit 170. As a result, the playback unit 170 stops outputting the OSD plane, and then, the OSD is deleted from the screen of the display device 200.

In response to the notification from the dispatcher 1643A, the BD-J module 1645 reads a BD-J object from the dynamic scenario memory 1641. Furthermore, the BD-J module 1645 executes a Java application program according to the BD-J object. The Java application program first causes the BD-J module 1645 to access the local storage 120 to check whether or not an additional content corresponding to the original contents recorded on the optical disc 500 is stored in the local storage 120. If not, the Java application program may cause the BD-J module 1645 to control the network interface 140 to download an additional content from the server 900 to the local storage 120. If an additional content is stored in the local storage 120, the Java application program causes the virtual file system 163 trough the BD-J module 1645 to build a virtual package from the paths of the original contents on the optical disc 500 and the paths of the additional contents in the local storage 120.

Step S2: The dispatcher 1643A sends an instruction COM to the virtual files system 163 through the AV playback library 1646. In response to the instruction COM, the virtual files system 163 transfers an index file IF to the mode management module 1643 from the virtual package, namely the optical disc 500 or the local storage 120.

Step S3: The mode management module 1643 refers to the item "First Play" in the index table and selects an object (hereinafter called a First Play object) specified in the item. Furthermore, the mode management module 1643 assigns current scenario information DS to the HDMV module 1644 or the BD-J module 1645 according to the type of the object. As a result, the module to be assigned the current scenario information DS, namely the module 1644 or the module 1645, reads the First Play object from the dynamic scenario information DS, and executes programs according to the object.

Step S4: When the process indicated by the First Play object is a playlist playback process, each of the modules 1644 and 1645 instructs the AV playback library 1646 to perform the playlist playback process. According to the instruction, the AV playback library 1646 requests the virtual file system 163 to read the current playlist file, by using an instruction COM. The virtual file system 163 reads the current playlist file from the virtual package according to the instruction COM, and stores the file as a piece of current static scenario information SS into the static scenario memory 1642.

Step S5: The AV playback library 1646 reads the current playlist information from the current static scenario information SS. The dimension judgment unit 1646B checks display dimensions indicated by the dimension identification flag from the current playlist information. When the display dimensions are "2D", the process advances to Step S10 (See FIG. 17). When the display dimensions are "3D", the process advances to Step S6.

Step S6: The dimension judgment unit 1646B accesses the register 1646A and checks whether the display device 200 supports stereoscopic video display. When the display device 200 does not support stereoscopic video display, the process advances to Step S20 (See FIG. 20). When the display device 200 supports stereoscopic video display, the process advances to Step S30 (See FIG. 19).

<<2D Display Mode when Playlist Information Indicates Display Dimensions being 2D>>

Figure 17:
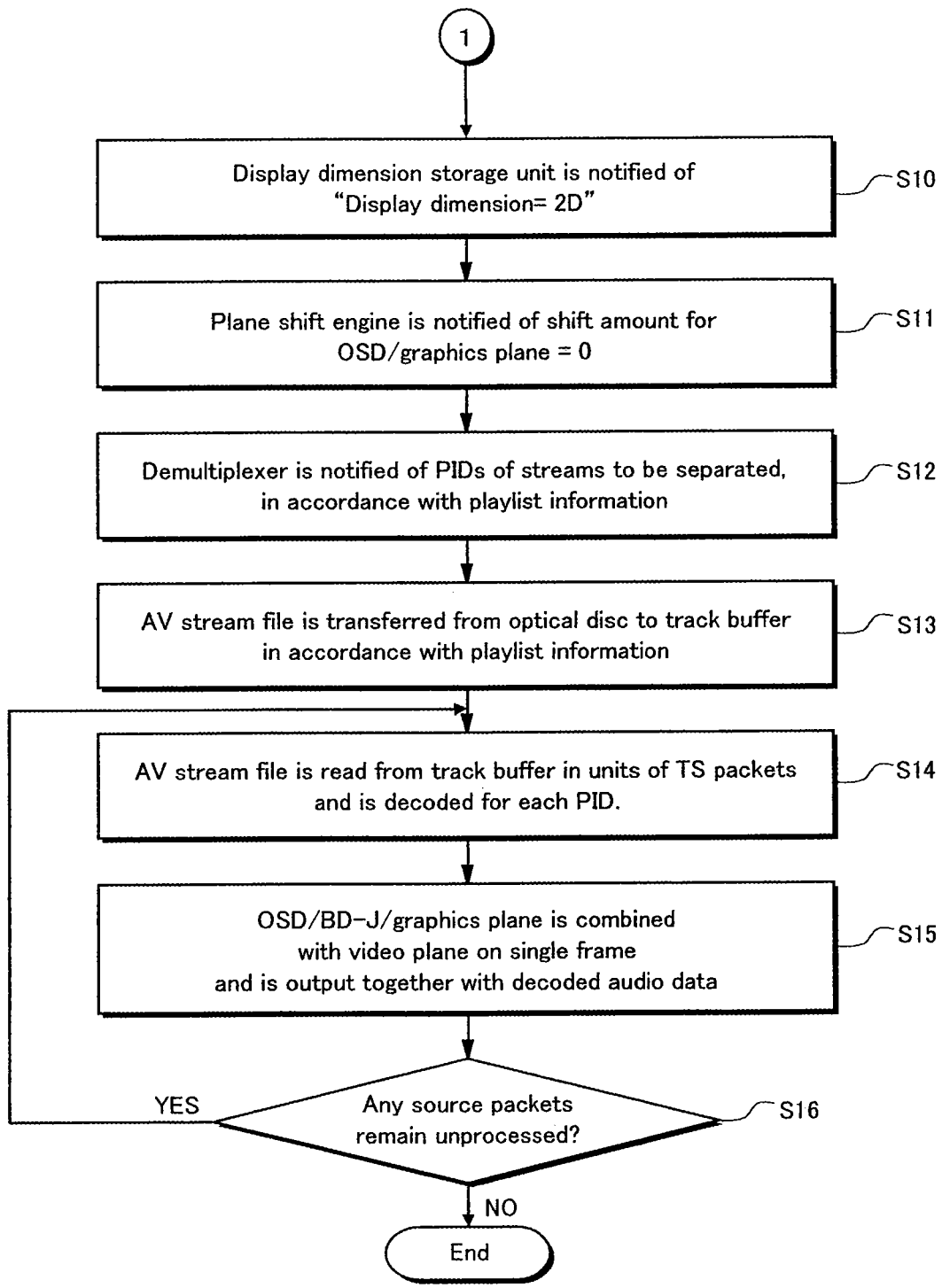
FIG. 17 is the second part of the flowchart of the playlist playback process to be executed by the playback device immediately after an optical disc is inserted into the optical disc drive.

FIG. 17 is a flowchart of the 2D display mode when the display dimensions indicted by the current playlist information are 2D.

Step S10: The dimension judgment unit 1646B judges the display dimensions as "2D", and notifies the display dimension storage unit 172B of the display dimensions, by using a dimension signal DIM. In response to the dimension signal DIM, the display dimension storage unit 173B sets the flag corresponding to the display dimensions indicated by the signal, namely 2D.

Step S11: The dimension judgment unit 1646B causes the plane shift engine 178 to set both the graphics plane shift amount GS and the OSD plane shift amount OS to 0. As a result, the plane shift engine 178 substantially stops the plane shifting of both the graphics plane and the OSD plane. Thus, the playback unit 170 outputs either of the graphics plane and the OSD plane as a two-dimensional image.

Step S12: the AV playback library 1646 sequentially refers to the playitem information pieces in the current playlist information. Thus, elementary streams that both the playback device 100 and the display device 200 can playback are detected from elementary streams registered in each stream selection table. The AV playback library 1646 further selects one with the smallest stream selection number from the detected elementary streams, and the PID thereof is notified to the demultiplexer 173. At this moment, the AV playback library 1646 transfers information necessary for the decoding of the detected elementary stream from the register 1646A to each decoder in the playback unit 170. Each decoder selects the type of decoding according to the information. The video decoder 174A further accesses the display dimension storage unit 172B, confirms that the display dimensions are 2D, and switches to the 2D display mode.

Step S13: The AV playback library 1646 selects current AV stream files according to playitem information in the current playlist information, and notifies the virtual file system 163 of the files. The virtual file system 163 causes the optical disc drive 110 or the local storage 120 to provide the current AV stream files to the bus interface 171 in the playback unit 170. The bus interface 171 transfers the current AV stream files CL to the track buffer 172A.

Step S14: The demultiplexer 173 first reads the current AV stream files CL from the track buffer 172A in units of source packets, and extracts a TS packet from each source packet. The demultiplexer 173 subsequently collects TS packets to be separated according to PID, by using PIDs contained in the TS headers of the TS packets. Furthermore, the demultiplexer 173 reconstructs PES packets from the collected TS packets, and sends them to the decoders 174A-174C according to PID. The video decoder 174A extracts encoded pictures from the received PES packets, and decodes them into uncompressed video frames. Furthermore, the video decoder 174A sequentially writes the uncompressed video frames into the video plane memory 176. The graphics decoder 174B extracts encoded graphics data from the received PES packets, decodes the encoded graphics data into uncompressed format data, and writes the uncompressed format data into the graphics plane memory 177C. The audio decoder 174C extracts encoded audio data from the received PES packets, and decodes encoded audio data into uncompressed audio data. In parallel with the above-described operations by the decoders, on receipt of graphics data GD2 from the OSD control module 1647, the rendering engine 175 generates an OSD plane on the OSD plane memory 177A from the graphics data GD2, and on receipt of graphics data GD1 from the BD-J module 1645, the rendering engine 175 generates a BD-J plane on the BD-J plane memory 177B from the graphics data GD1.

Step S15: Since every plane shift amount for the plane memories 177A-177C is 0, the plane shift engine 178 outputs the <planes in the plane memories 177A-177C to the adder 179, without change. The adder 179 combines the OSD plane, BD-J plane or the graphics plane outputted from the plane shift engine 178 with the video plane outputted from the video plane memory 176, onto a single video frame. Video data VD is constructed from the video frames, and is outputted together with uncompressed audio data AD. The HDMI transmission unit 180 converts the video data VD and the audio data AD into a video signal and an audio signal in the HDMI format respectively, and outputs the signals to the display device 200 through the HDMI cable 600. The display device 200 reproduces 2D video images according to the video signal, and outputs a sound from the built-in speaker according to the audio signal.

Step S16: The demultiplexer 173 checks whether any of the source packets constituting the current AV stream file CL remain unprocessed in the track buffer 172A. If any, the processing is repeated from Step S14. If not, the playlist playback processing finishes.

<<2D Display Mode with Display Device 200 not Supporting Stereoscopic Video Display>>

Figure 18:
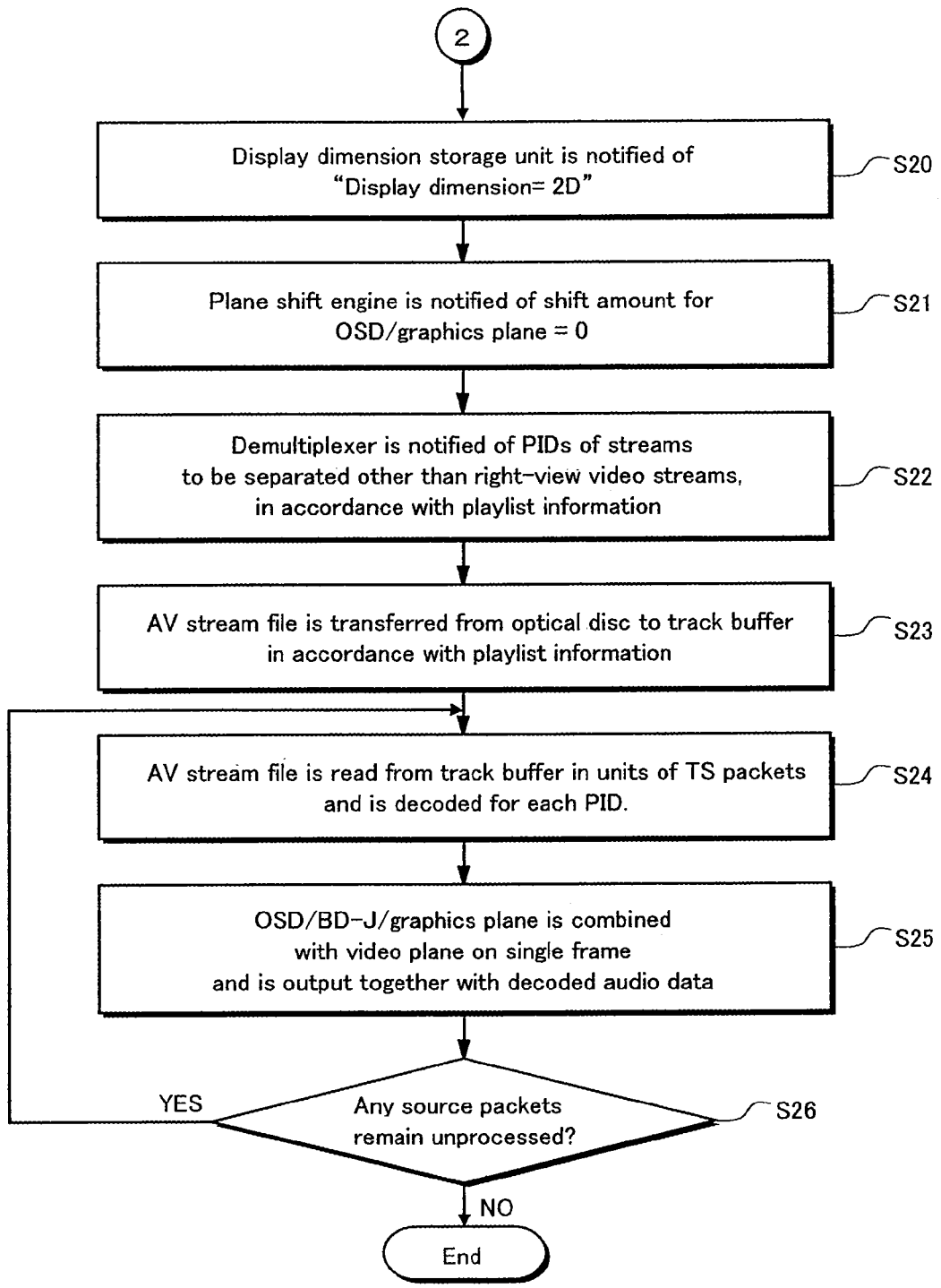
FIG. 18 is the third part of the flowchart of the playlist playback process to be executed by the playback device immediately after an optical disc is inserted into the optical disc drive.

FIG. 18 is a flowchart of the 2D display mode when the display device 200 does not support the stereoscopic video display. Steps S20-S26 shown in FIG. 18 are substantially the same as Steps S10-S16 shown in FIG. 17. Thus, the following explanation of each of Steps is simplified, except for the difference from Steps S10-S16. The details thereof are incorporated in the following by reference.

Step S20: The dimension judgement unit 1646B judges the display dimensions as 2D, and the display dimension storage unit 172B accordingly sets the flag corresponding to 2D.

Step S21: The dimension judgment unit 1646B causes the plane shift engine 178 to set each of the graphics plane shift amount GS and the OSD plane shift amount OS to 0.

Step S22: The AV playback library 1646 selects elementary streams according to the current playlist information. Here, as to the primary video stream, the right-view video stream is excluded from the selection. The PIDs of the selected elementary streams are notified to the demultiplexer 173 together with information necessary for the decoding. Each decoder determines the type of decoding according to the information. The video decoder 174A confirms that the display dimensions are 2D, and switches to the 2D display mode.

Step S23: The AV playback library 1646 selects the current AV stream file according to the current playlist information. Accordingly, the virtual file system 163 and the bus interface 171 transfers the current AV stream file from the optical disc drive 110 or the local storage 120 to the track buffer 172A.

Step S24: the demultiplexer 173 sorts TS packets to be separated according to their respective PIDs, reconstructs PES packets from the collected TS packets, and sends them to one of the decoders 174A-174C according to the PIDs. The video decoder 174A decodes the PES packets into video frames, and sequentially writes the video frames into the video plane memory 176. In the same manner, the graphics decoder 174B decodes the PES packets into graphics planes, and writes them into the graphics plane memory 177C. The audio decoder 174C decodes the PES packets into audio data. The rendering engine 175 generates an OSD plane on the OSD plane memory 177A by using the graphics data GD2 from the OSD control module 1647, and generates a BD-J plane on the BD-J plane memory 177B by using the graphics data GD1 from the BD-J module 1645.

Step S25: The plane shift engine 178 outputs the planes in the plane memories 177A-177C to the adder 179, without change. The adder 179 combines the planes outputted from the plane shift engine 178 and the video plane outputted from the video plane memory 176 onto a video frame. The video data VD is constructed from the video frames, and is outputted together with the uncompressed audio data AD. The HDMI transmission unit 180 converts the video data VD and the audio data AD into a video signal and an audio signal in the HDMI format respectively, and outputs the signals to the display device 200. The display device 200 reproduces 2D video images according to the video signal, and outputs a sound from the built-in speaker according to the audio signal.

Step S26: If any of the source packets constituting the current AV stream file CL remain unprocessed in the track buffer 172A, the processing is repeated from Step S24. If not, the playlist playback processing finishes.

<<3D Display Mode>>

Figure 19:
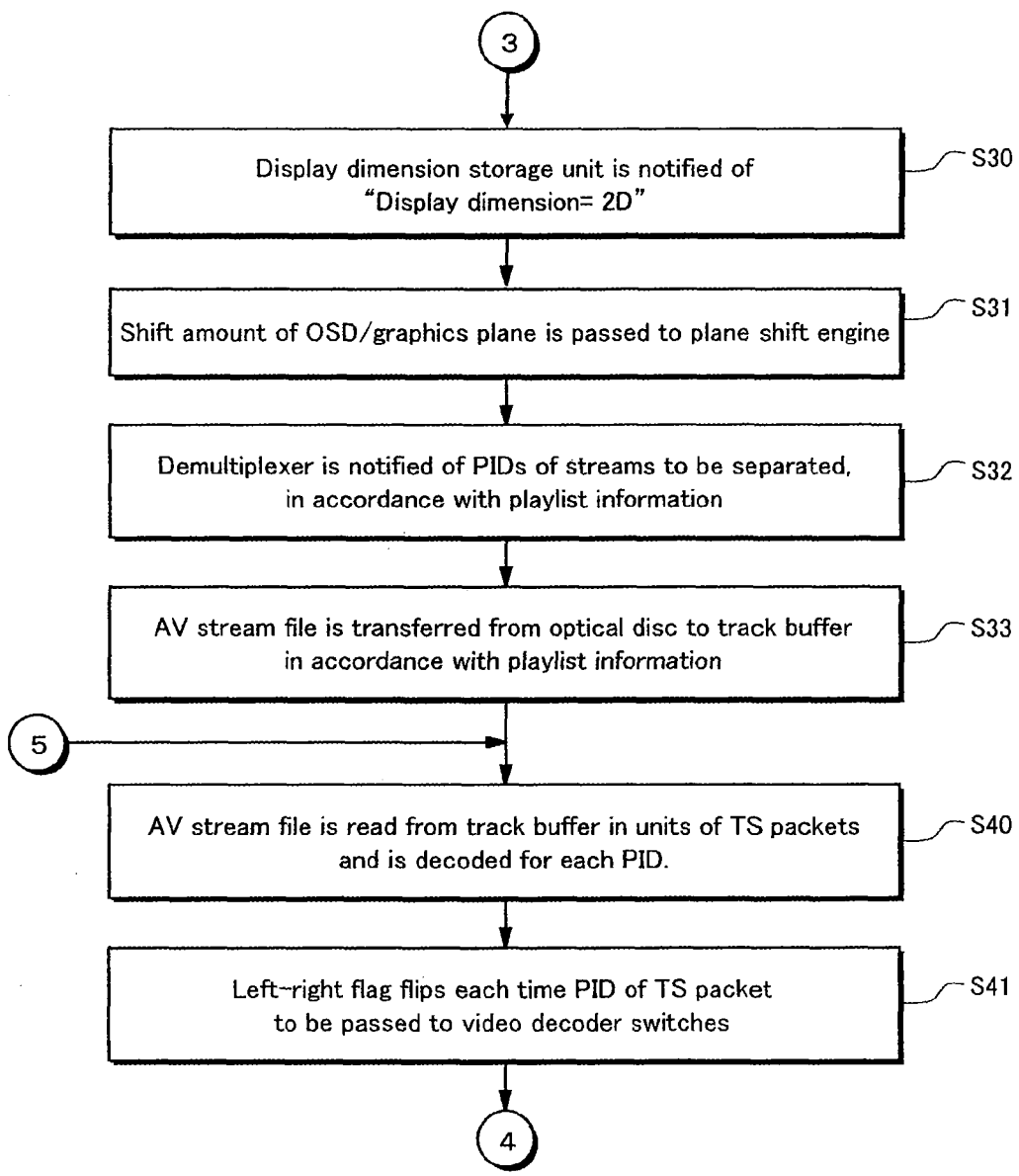
FIG. 19 is the fourth part of the flowchart of the playlist playback process to be executed by the playback device immediately after an optical disc is inserted into the optical disc drive.
Figure 20:
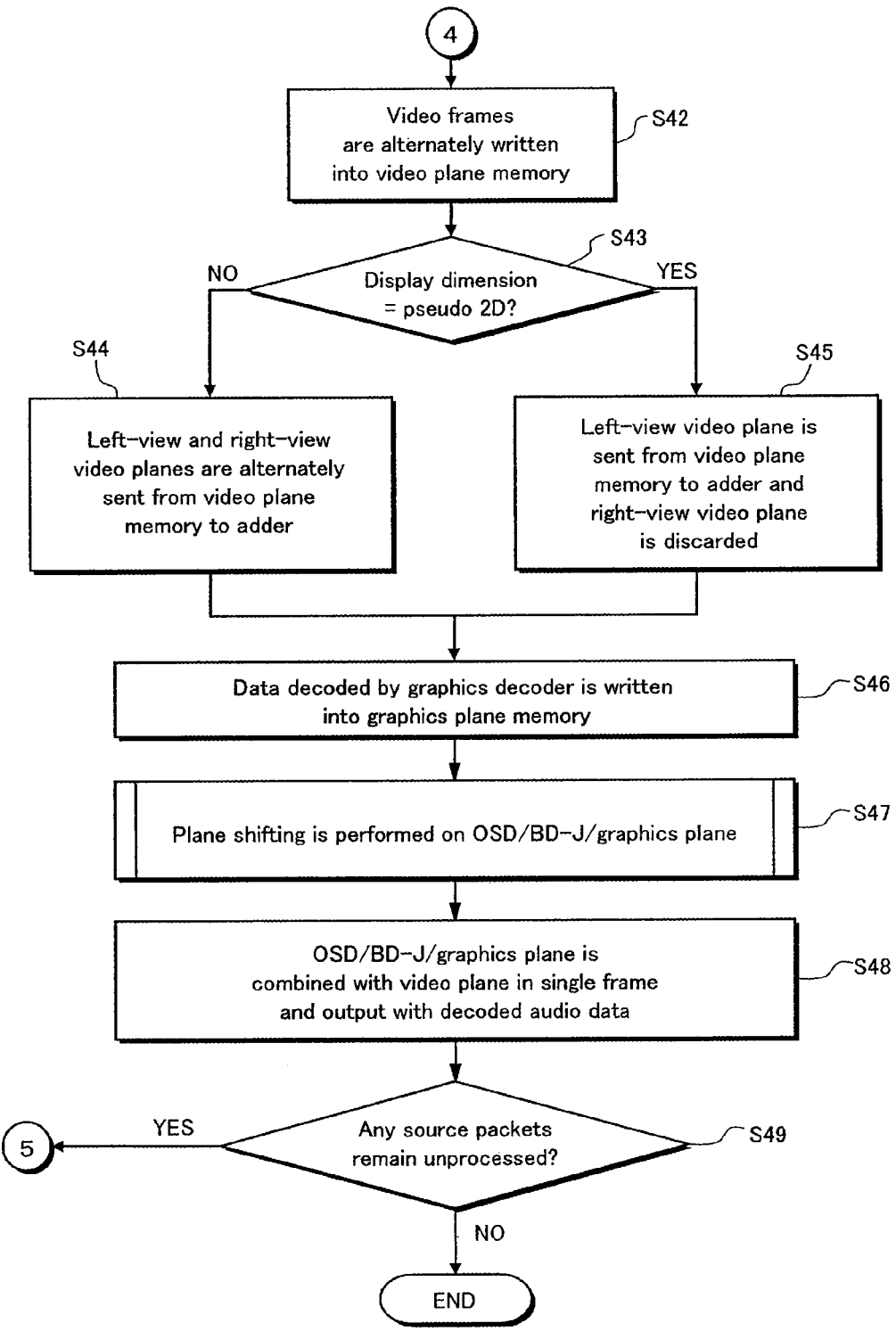
FIG. 20 is the fifth part of the flowchart of the playlist playback process to be executed by the playback device immediately after an optical disc is inserted into the optical disc drive.

FIGS. 19-20 are flowcharts of the 3D display mode. Among Steps explained below, Steps S30-S33, S40 and S41 are shown in FIG. 19, and Steps S42-S40 are shown in FIG. 20.

Step S30: The dimension judgment unit 1646B judges the display dimensions as "3D", and notifies the display dimension storage unit 172B of the display dimensions, by using a dimension signal DIM. In response to the dimension signal DIM, the display dimension storage unit 173B sets the flag corresponding to the dimensions indicated by the signal, namely 3D.

Step S31: The dimension judgment unit 1646B reads the graphics plane shift amount GS from the current playlist information, and passes the amount to the playback unit 170 together with a predetermined OSD plane shift amount OS. The plane shift engine 178 stores the plane shift amounts GS and OS into the built-in memory.

Step S32: The AV playback library 1646 sequentially refers to play item information pieces in the current playlist information. As a result, elementary streams playable by both the playback device 100 and the display device 200 are detected from the elementary streams registered in the stream selection tables. Furthermore, the AV playback library 1646 selects the elementary stream with the smallest stream selection number from the detected elementary streams, and notifies the demultiplexer 173 of the PID thereof. PIDs notified in this manner include both the PIDs of the left-view video stream and the PIDs of the right-view video stream. The AV playback library 1646 transfers information required for the decoding of the selected elementary streams, from the register 1646A to the decoders in the playback unit 170. In response to the information, each decoder determines the type of the decoding. The video decoder 174A accesses the display dimension storage unit 172B to confirm that the display dimensions are 3D, and switches to the 3D display mode.

Step S33: The AV playback library 1646 selects the current AV stream file according to the playitem information pieces contained in the current playlist information, and notifies the virtual file system 163 of the selected file. The virtual file system 163 causes the optical disc drive 110 or the local storage 120 to provide the current AV stream file to the bus interface 171 in the playback unit 170. The bus interface 171 transfers the current AV stream file CL to the track buffer 172A.

Step S40: The demultiplexer 173 first reads the current AV stream file CL from the track buffer 172A in units of source packets, and extract a TS packet from each source packet. The demultiplexer 173 subsequently collects TS packets to be separated, in association with their respective PIDs, by using the PID contained in the TS header of each TS packet. Furthermore, the demultiplexer 173 reconstructs PES packets from the collected TS packets, and sends them to one of the decoders 174A-174C according to the PID. The video decoder 174A alternately sorts the received PES packets into two buffers. As a result, the PES packets of the left-view and right view video streams are separated into the different buffers. The video decoder 174A alternately decodes PES packets from the two buffers into uncompressed video frames. The graphics decoder 174B extracts encoded graphics data from the received PES packets, and decodes them into uncompressed graphics data. The audio decoder 174C extracts encoded audio data from the received PES packets, and decodes them into uncompressed audio data.

Step S41: The demultiplexer 173 sends a left-right signal L/R to the left-right flag storage unit 173A every time the demultiplexer 173 sends a PES packet to the video decoder 174A. The left-right flag storage unit 173A sets or clears the left-right flag according to the left-right signal L/R. Thus, the left-right flag flips, or changes the state thereof every time the PID indicated by the original TS packet corresponding to the PES packet switches between "0x1011" and "0x1012".

Step S42: The video decoder 174A writes the uncompressed video frames into the two arrays in the plane memory 176 alternately.

Step S43: The video decoder 174A accesses the display dimension storage unit 172B to check display dimensions every time the video decoder 174A writes an uncompressed video frame into the video plane memory 176. If the display dimensions are still "3D", the process advances to Step S44. If the display dimensions have been changed to "pseudo 2D", the process advances to Step S45.

Step S44: the video decoder 174A keeps the "3D display mode". In particular, the video decoder 174A identifies whether the uncompressed video frame is for the left eye or for the right eye. The video decoder 174A notifies the video plane memory 176 of the result of the identification, by using a switching signal PTD. In this regard, the state of the switching signal PTD changes every time a video frame is written into one of the arrays in the video plane memory 176. The video plane memory 176 receives the switching signal PTD, and alternately outputs left-view and right-view video planes from the two arrays to the adder 179. After that, the process advances to Step S46.

Step S45: The video decoder 174A sifts from the "3D display mode" to the "pseudo 2D display mode". The video decoder fixes the state of the switching signal PTD so as to indicate that the video frame is for the left eye regardless of whether each uncompressed video frame is for the left eye or for the right eye. In this regard, the video plane memory 176 outputs video planes to the adder 179 only from the array into which the left-view video frames are to be written, and discards the video planes in the array in to which the right-view video frames are to be written. After that, the process advances to Step S46.

Step S46: The graphics decoder 174B writes uncompressed graphics data into the graphics plane memory 177C. If the rendering engine 175 has received the graphics data GD2 from the OSD control module 1647, the rendering engine 175 generates an OSD plane from the graphics data, on the OSD plane memory 177A. If the rendering engine 175 has received the graphics data GD1 from the BD-J module 1645, the rendering engine 175 generates a BD-J plane from the graphics data GD1, on the BD-J plane memory 177B.

Step S47: The plane shift engine 178 performs the plane shifting on the plane memories 177A-177C by using the OSD plane shift amount, the BD-J plane shift amount and the graphics plane shift amount. The process of the plane shifting will be explained below.

Step S48: The adder 179 combines the OSD plane, the BD-J plane or the graphics plane outputted from the plane shift engine 178 and the video plane outputted from the video plane memory 176, onto a single video frame. The video data VD is constructed from the video frames, and is outputted together with the uncompressed audio data AD. The HDMI transmission unit 180 converts the video data VD and the audio data AD into a video signal and an audio signal in the HDMI format respectively, and outputs the signals to the display device 200. The display device 200 reproduces video frames on the screen according to the video signal, and outputs a sound from the built-in speaker according to the audio signal. The display device 200 also synchronizes the switching between the left-view frame and the right-view frame with the switching between the waveforms of the left-right signal LR, by using a control signal accompanying the video signal. Thus the liquid crystal shutter glasses 300 causes the two crystal display panels 301L and 301R to transmit the light alternately in synchronization with the frame switching. As a result, the viewer wearing the liquid crystal glasses 300 perceives the horizontal displacement between the left-view and right view video frames as the depth of a stereoscopic object in the video images reproduced on the screen of the display device 200.

Specifically, when the video decoder 174A is keeping the "3D displaymode" at Step S43, both the video plane and the graphics plane are different between the left-view video frame and the right-view video frame. Thus, both the video images and subtitles of the content are reproduced as stereoscopic images. On the other hand, when the decoder 174A sifts from the "3D display mode" to the "pseudo 2D display mode" at Step S43, both the video planes and the graphics plane are the same between the left-view video frame and the right-view video frame. Thus, both the video images and subtitles of the content are reproduced as two-dimensional images. However, since the OSD plane or the BD-J plane is different between the left-view video frame and the right-view video frame, the OSD or the pop-up display is reproduced as a stereoscopic image. In particular, a viewer sees as if the OSD or the pop-up display is nearer than the video images and subtitles of the content.

Step S49: The demultiplexer 173 checks whether any of the source packets constituting the current AV stream file CL remain unprocessed in the track buffer 172A. If any, the processing is repeated from Step S40. If not, the playlist playback processing finishes.

<<Procedure of Plane Shifting by Plane Shift Engine 178>>

Figure 21:
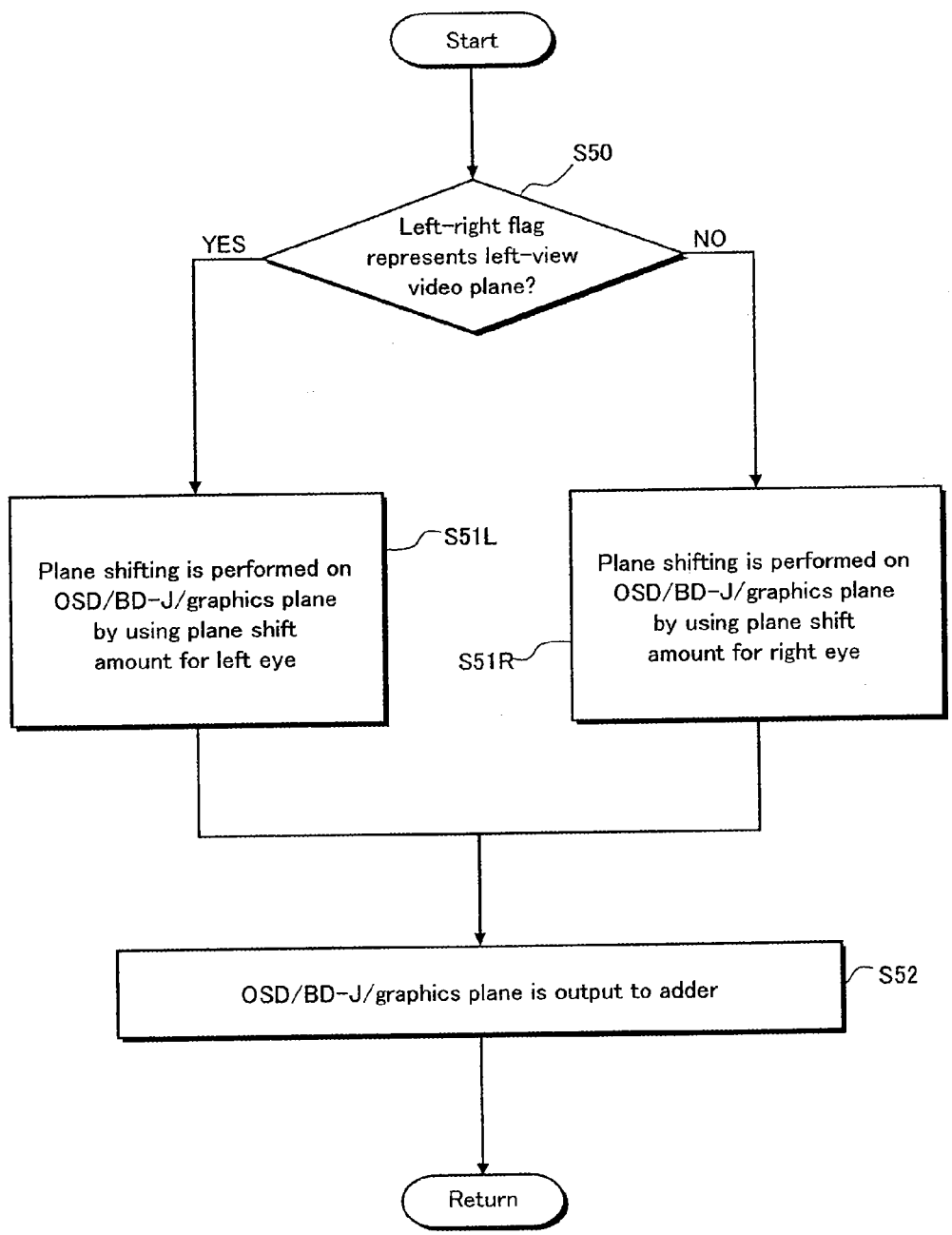
FIG. 21 is a flowchart of plane shifting performed by the plane shift engine shown in FIG. 15.

FIG. 21 is a flowchart showing the plane shifting performed by the plane shift engine 178. The following steps are sequentially performed in Step S47 in FIG. 20.

Step S50: The plane shift engine 178 accesses the left-right flag storage unit 173A to check the state of the left-right flag. When the state of the left-right flag indicates a left-view video plane, the process advances to Step S51L. When the state of the left-right flag indicates a right-view video plane, the process advances to Step S51R.

Step S51L: The plane shift engine 178 selects the displacement for the left-view video frame from the plane shift amounts corresponding to the plane to be processed, namely the OSD plane, the BD-J plane or the graphics plane. Furthermore, the plane shift engine 178 adds a strip-shaped area having the same width as the displacement to the left side of the plane to be processed, and removes a strip-shaped area having the same width from the right edge of the plane. Thus the plane to be processed is converted to a left-view plane. In this left-view plane, in comparison with the plane to be processed, the graphics elements, namely the OSD, the pop-up display and the subtitles are shifted to the right by the displacement from their original locations. The left-view plane will be held by the plane shift engine 178.

Step S51R: The plane shift engine 178 selects the displacement for the right-view video frame from the plane shift amounts corresponding to the plane to be processed. Furthermore, the plane shift engine 178 adds a strip-shaped area having the same width as the displacement to the right side of the plane to be processed, and removes a strip-shaped area having the same width from the left edge of the plane. Thus the plane to be processed is converted to a right-view plane. In this right-view plane, in comparison with the plane to be processed, the graphics elements are shifted to the left by the displacement from their original locations. The right-view plane will be held by the plane shift engine 178.

Step S52: The plane shift engine 178 outputs the left-view or the right-view plane to the adder 179.

<<Plane Shifting for Graphics Plane>>

Figure 22:
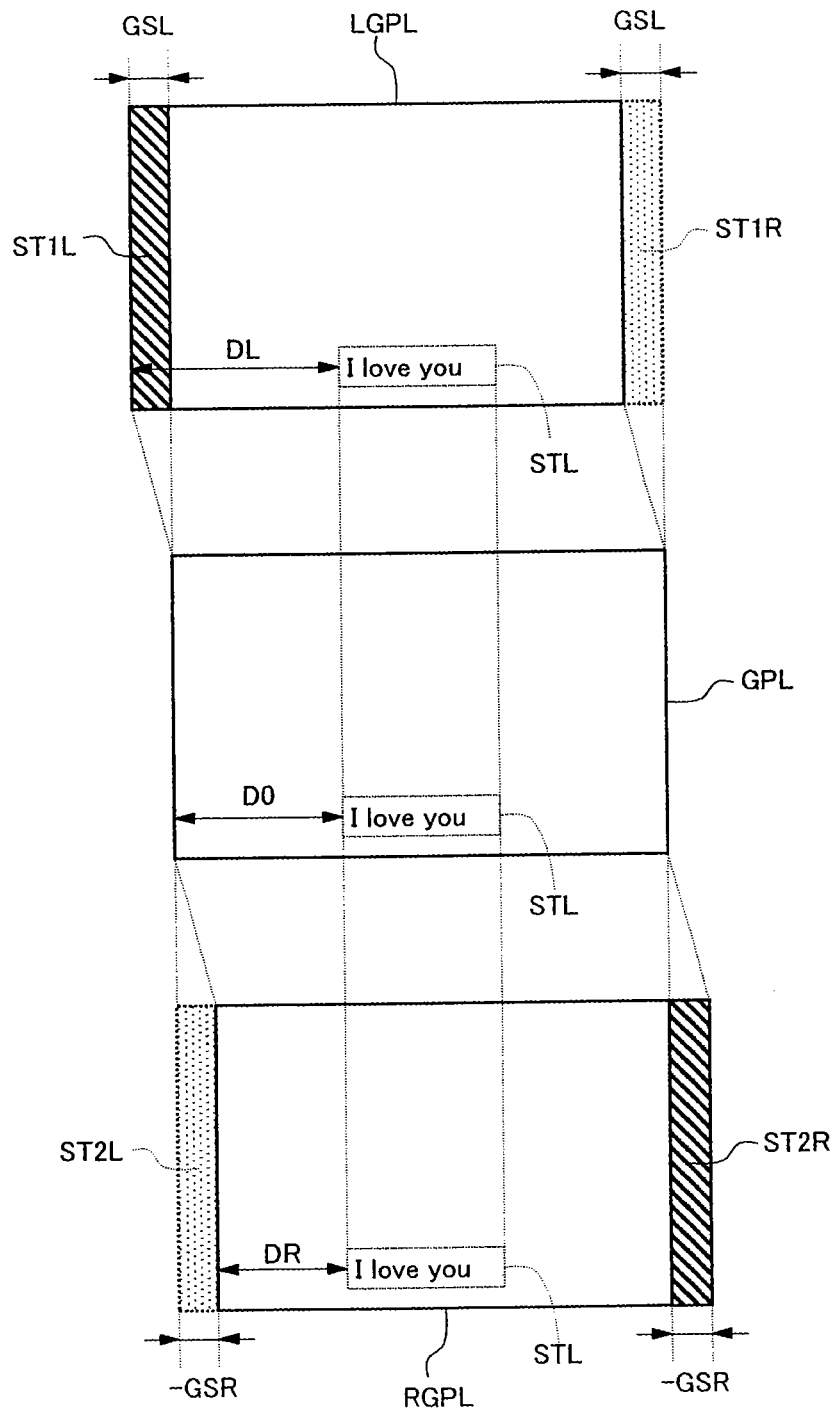
FIG. 22 is a schematic diagram showing plane shifting on a graphics plane performed by the plane shift engine shown in FIG. 15.

FIG. 22 is a schematic view showing the plane shifting for a graphics plane, performed by the plane shift engine 178. For example, suppose the case where a graphics plane GPL on the graphics plane memory 177C includes a graphics element STL that represents subtitles "I love you". In this example, the graphics plane GPL except for the graphics element STL has the α value 0, and is therefore transparent. The graphics plane shift amount is specified by a pair of displacements GSL and GSR relative to the display location of the graphics element STL within the original graphics plane GPL. One of the pair relates to the left-view video frame, and the other to the right-view video frame. The pair of displacements GSL and GSR have the same size and opposite signs (i.e. opposite displacement directions). For example, when the shifting to the right is assumed as positive shifting, the displacement GSL in the left-view video frame is positive, and the displacement GSR in the right-view video frame is negative.

The plane shift engine 178 first checks the state of the left-right flag. When the state of the left-right flag indicates a left-view video plane, the plane shift engine 178 rewrites the original graphics plane GPL by using the displacement GSL for the left-view video frame. That is, the plane shift engine 178 adds a strip-shaped area ST1L having the same width as the displacement GSL to the left side of the original graphics plane GPL, and removes a strip-shaped area ST1R having the same width from the right edge of the original graphics plane GPL. In a left-view graphics plane LGPL resulting from the rewriting, the distance DL between the left edge of the plane and the graphics element STL is greater than the corresponding distance D0 in the original graphics plane GPL by the displacement GSL. That is, the graphics element. STL is shifted by the displacement GSL to the right from the location in the original graphics plane GPL.

When the state of the left-right flag indicates a right-view video plane, the plane shift engine 178 rewrites the original graphics plane GPL by using the displacement GSR for the left-view video frame. That is, the plane shift engine 178 adds a strip-shaped area ST2R having the same width as the displacement GSR to the right side of the original graphics plane GPL, and removes a strip-shaped area ST2L having the same width from the left edge of the original graphics plane GPL. In a right-view graphics plane RGPL resulting from the rewriting, the distance DR between the left edge of the plane and the graphics element STL is greater than the distance D0 in the original graphics plane GPL by the displacement GSR. That is, the graphics element STL is shifted by the displacement GSR to the left from the location in the original graphics plane GPL.

Thus the plane shift engine 178 generates the left-view graphics plane LGPL and the right-view graphics plane RGPL from a single graphics plane GPL, and outputs them to the adder 179 alternately. Between these planes, the graphics element STL is shifted in the horizontal direction by the displacement GSL−GSR (GSR<0) which is the difference between the pair of displacements GSL and GSR indicated by the graphics plane shift amount. The viewer perceives this displacement as the binocular parallax, and feels as if the subtitles "I love you" is nearer than the screen.

<<Plane Shifting for OSD Plane>>

Figure 23:
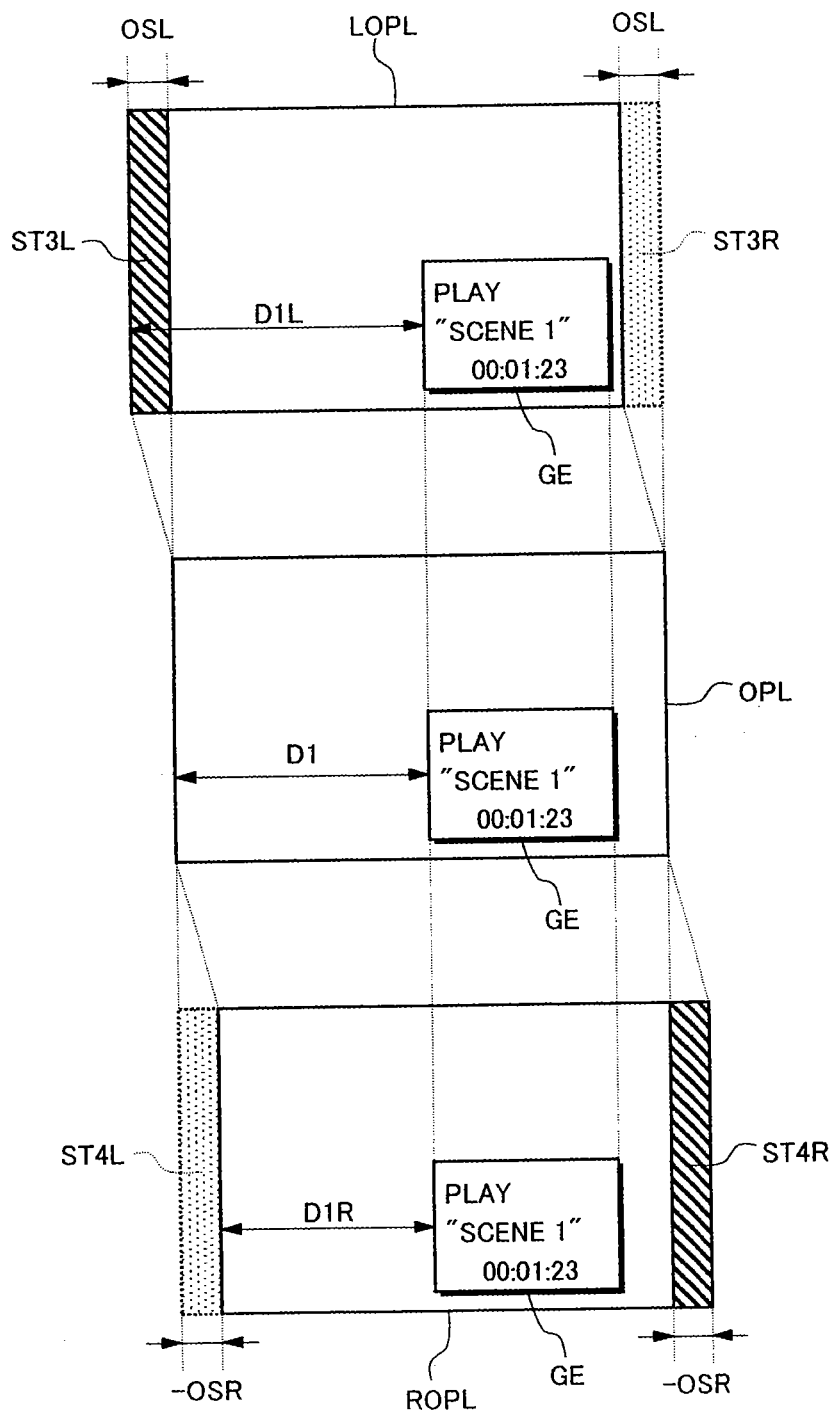
FIG. 23 is a schematic diagram showing plane shifting on an OSD plane performed by the plane shift engine shown in FIG. 15.

FIG. 23 is a schematic view showing the plane shifting for an OSD plane, performed by the plane shift engine 178. For example, suppose the case where an OSD plane OPL on the OSD plane memory 177A includes an OSD GE representing playback information. Here, the playback information relates to the video that is currently being played back, and includes, for example, playback states such as "PLAY" and "PAUSED", the tile of the scene of the video, and the elapsed time from the playback start time. The OSD plane OPL except for the OSD GE has the α value 0, and is therefore transparent. The OSD plane shift amount is specified by a pair of displacements OSL and OSR relative to the display location of the OSD GE within the original OSD plane OPL. The pair of displacements OSL and OSR have the same size and opposite signs (i.e. opposite displacement directions). For example, when the shifting to the right is assumed as positive shifting, the displacement OSL in the left-view video frame is positive, and the displacement OSR in the right-view video frame is negative.

The plane shift engine 178 first checks the state of the left-right flag. When the state of the left-right flag indicates a left-view video plane, the plane shift engine 178 rewrites the original OSD plane OPL by using the displacement OSL for the left-view video frame. That is, the plane shift engine 178 adds a strip-shaped area ST3L having the same width as the displacement OSL to the left side of the original OSD plane OPL, and removes a strip-shaped area ST3R having the same width from the right edge of the original OSD plane OPL. In a left-view graphics plane LOPL resulting from the rewriting, the distance D1L between the left edge of the plane and the OSD GE is greater than the distance D1 in the original OSD plane OPL by the displacement OSL. That is, the OSD GE is shifted by the displacement OSL to the right from the location in the original OSD plane OPL.

When the state of the left-right flag indicates a right-view video plane, the plane shift engine 178 rewrites the original OSD plane OPL by using the displacement OSR for the left-view video frame. That is, the plane shift engine 178 adds a strip-shaped area ST4R having the same width as the displacement OSR to the right side of the original OSD plane OPL, and removes a strip-shaped area ST4L having the same width from the left edge of the original OSD plane OPL. In a right-view OSD plane ROPL resulting from the rewriting, the distance D1R between the left edge of the plane and the OSD GE is greater than the distance D1 in the original OSD plane OPL by the displacement OSR. That is, the OSD GE is shifted by the displacement OSR to the left from the location in the original OSD plane OPL.

Thus, the plane shift engine 178 generates the left-view OSD plane LOPL and the right-view OSD plane ROPL from a single OSD plane OPL, and outputs them alternately to the adder 179. Between these planes, the OSD GE is shifted in the horizontal direction by the displacement OSL−OSR (OSR<0) which is the difference between the pair of displacements OSL and OSR indicated by the OSD plane shift amount. The viewer perceives this displacement as the binocular parallax, and feels as if the OSD GE is nearer than the screen.

<OSD Plane Control by Playback Device 100>

Figure 24:
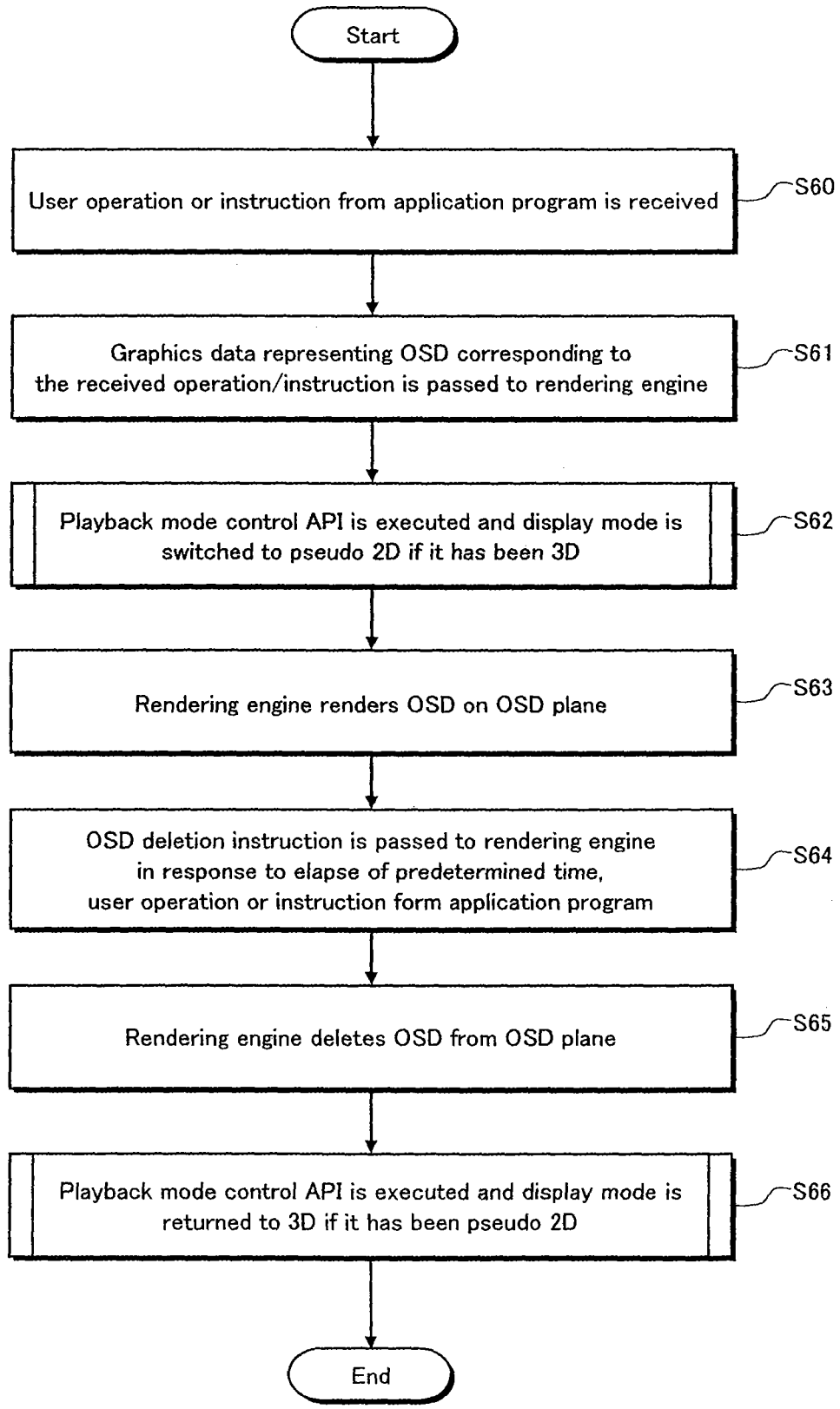
FIG. 24 is a flowchart relating to control of an OSD plane performed by the playback device.

FIG. 24 is a flowchart showing the control of the OSD plane, performed by the playback device 100. While performing the playlist playback processing explained above, the playback device 100 monitors user operations and instructions from the application programs. Every time the playback device 100 detects the operations and the instructions, it renders the corresponding OSD on the OSD plane. The generated OSD plane is combined onto the video frame through the playlist playback processing, and is outputted to the display device 200. The following explains the control of the OSD plane by the playback device 100 in the order of Steps shown in FIG. 24.

Step S60: The operation unit 130 detects a command from the remote control 400 or pressing of a button provided on the front panel of the playback device 100, and sends a notification INT corresponding to the command or the button to the user operation detecting module 162. In response to the notification INT, the user operation detecting module 162 sends an operation signal UO to the dispatcher 1643A. The dispatcher 1643A notifies the OSD control module 1647 of the operation signal UO. In addition, the HDMV module 1644 or the BD-J module 1645 notifies the OSD control module 1647 of an instruction relating to the OSD display, according to the application program.

Step S61: In response to the operation signal UO or the instruction, the OSD control module 1647 generates graphics data GD2 representing an OSD that corresponds to the details of the operation signal UO or the instruction, and passes the graphics data GD2 to the rendering engine 175.

Step S62: The OSD control module 1647 calls the OSD control module API 1464C. As a result, the operation mode of the playback unit 170 switches to the "pseudo 2D display mode" if it has been the "3D display mode". The process performed by the playback mode control API 1646C will be described below.

Step S63: The rendering engine 175 decodes the graphics data GD2 received from the OSD control module 1647, and writes the result into the OSD plane memory 177A. The OSD plane is thus generated.

Step S64: After the sending of the graphics data GD2, the OSD control module 1647 sends an OSD deletion request RQ2 to the rendering engine 175 in response to an elapse of a predetermined time, receipt of a new operation signal UO, or instructions from other modules 1644 and 1645.

Step S65: In response to the deletion request RQ2, the rendering engine 175 deletes the OSD plane OPL held by the plane memory 177A. As a result, the output of the OSD plane from the plane shift engine 178 stops.

Step S66: The OSD control module 1647 calls the playback mode control API 1646C. As a result, the operation mode of the playback unit 170 returns from the "pseudo 2D display mode" to the "3D display mode". The process performed by the playback mode control API 1646C will be described below.

<Control of BD-J Plane by Playback Device 100>

Figure 25:
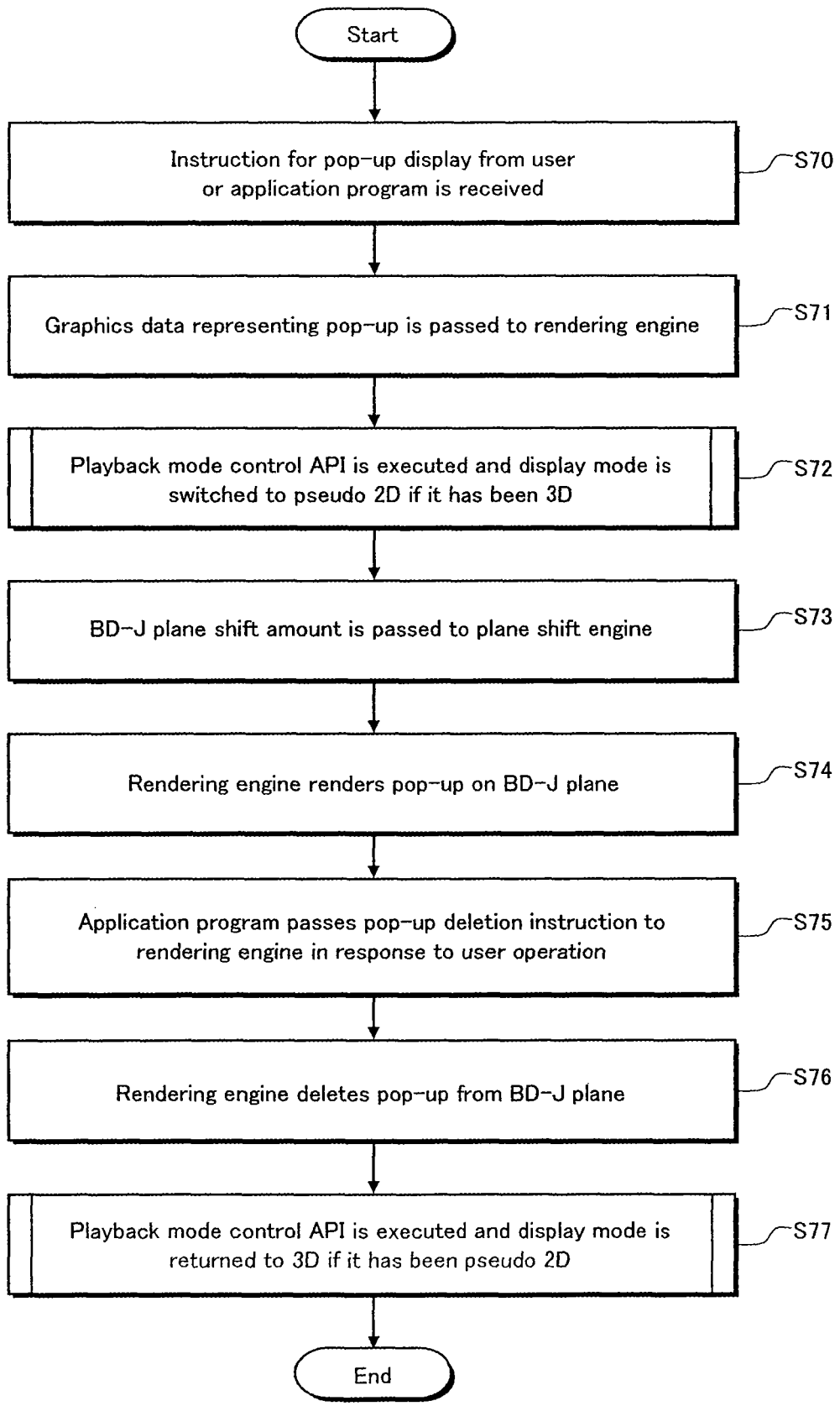
FIG. 25 is a flowchart relating to control of a BD-J plane performed by the playback device.

FIG. 25 is a flowchart relating to control of the BD-J plane performed by the playback device 100. In the playback device 100, when the pop-up display is requested by user operations or instructions from the application program, first the BD-J module 1645 reads a BD-J object for controlling the pop-up display from the optical disc 500 and executes a Java application program according to the BD-J object, in parallel with the playlist playback processing explained above. Next, the Java application program causes the BD-J module 1645 to render graphics data for the pop-up display on the BD-J plane. The BD-J plane generated in the stated manner is combined onto the video frame through the playlist playback processing, and is outputted to the display device 200. The following explains the control of the BD-J plane by the playback device 100, in the order of the Steps shown in FIG. 25.

Step S70: The operation unit 130 detects a command from the remote control 400 or pressing of the button provided on the front panel of the playback device 100, and sends a notification INT corresponding to the command or the button to the user operation detecting module 162. The user operation detecting module 162 sends an operation signal UO to the dispatcher 1643A in accordance with the notification INT. When the operation signal UO is a request for the pop-up display, the dispatcher 1643A notifies the BD-J module 1645 of the operation signal UO. Beside, the HDMV module 1644 requests the BD-J module 1645 to display the pop-up display, according to the application program. Alternatively, the BD-J module 1645 per se judges according to the application program that the pop-up display is required.

Step S71: The BD-J module 1647 reads from the optical disc 500 a BD-J object for controlling the requested pop-up display, in response to the operation signal UO or the instruction. Furthermore, the BD-J module 1647 executes a Java application program according to the BD-J object. As a result, the Java application program causes the BD-J module 1645 to generate graphics data GD1 for the pop-up display, and to send it to the rendering engine 175.

Step S72: Java application program calls the playback mode control API 1646C. As a result, the operation mode of the playback unit 170 switches to the "pseudo 2D display mode" if it has been the "3D display mode". The process performed by the playback mode control API 1646C will be described below.

Step S73: The Java application program causes the BD-J module 1647 to generate a BD-J plane shift amount BS according to the depth to be perceived of the pop-up display, and to send it to the plane shift engine 178.

Step S74: The rendering engine 175 decodes the graphics data GD1 received from the BD-J module 1645, and writes the result into the BD-J plane memory 177B. The BD-J plane is thus generated.

Step S75: After the sending of the graphics data GD1, on receipt of a new operation signal UO, the Java application program sends a pop-up display deletion request RQ1 to the rendering engine 175 by using the API.

Step S76: In response to the deletion request RQ1, the rendering engine 175 deletes the BD-J plane held by the BD-J plane memory 177B. As a result, the output of the BD-J plane from the plane shift engine 178 stops.

Step S77: The Java application program calls the playback mode control API 1646C. As a result, the operation mode of the playback unit 170 returns from the "pseudo 2D display mode" to the "3D display mode". The process performed by the playback mode control API 1646C will be described below.

<Procedure Performed by Playback Control API 1646C>

Figure 26:
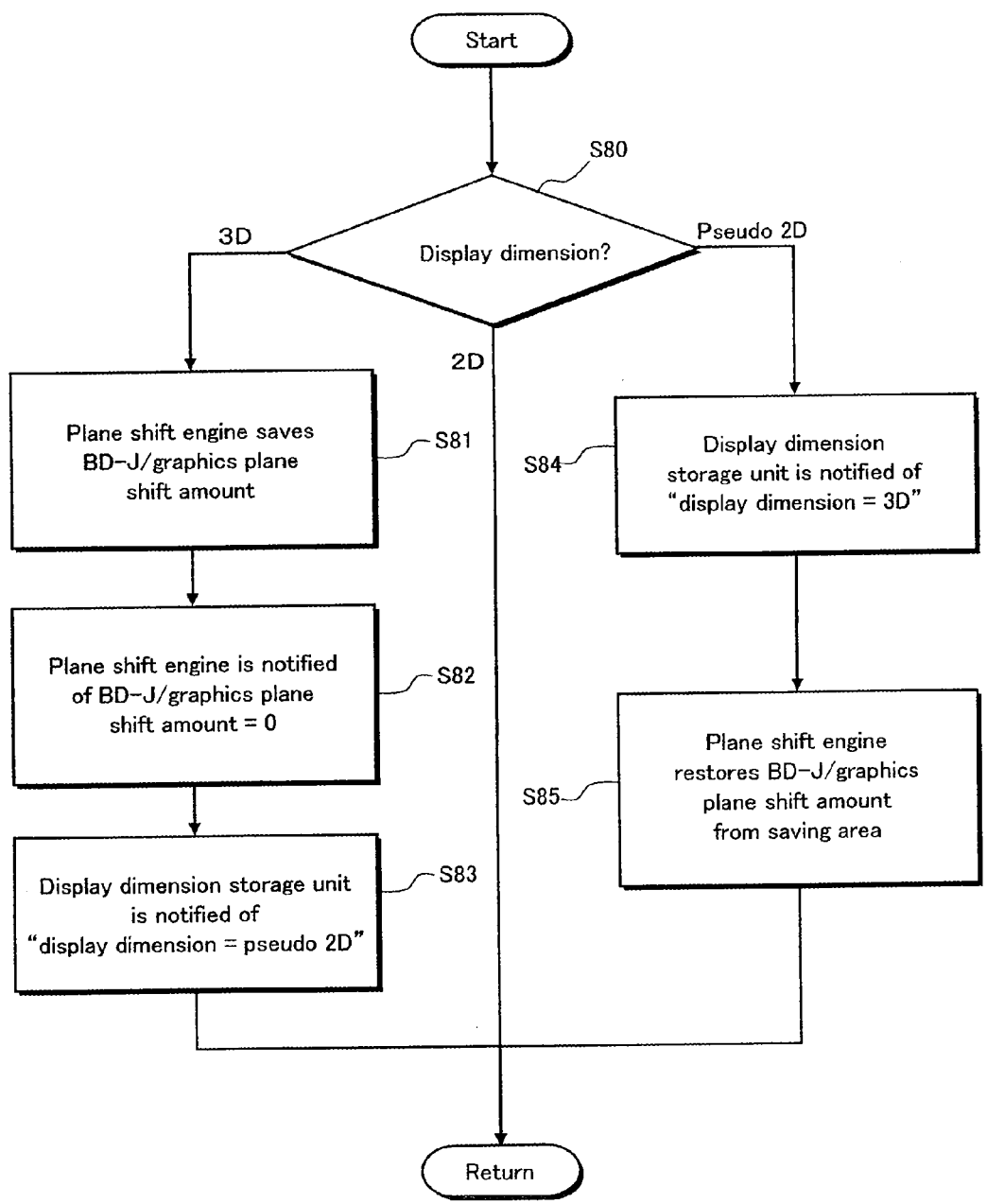
FIG. 26 is a flowchart of a process performed by the playback mode control API shown in FIG. 14.

FIG. 26 is a flowchart showing the process performed by the playback mode control API 1646C. The playback mode control API 1646C is called by the OSD control module 1647 in Steps S62 and S66 shown in FIG. 24, and is called by the Java application program in Steps S72 and 77 shown in FIG. 25. The playback mode control API 1646C that has been called is executed by the AV playback library 1646. As a result, the switching of operation modes of the playback unit 170 and the accompanying processes are performed in the order of the following steps.

Step S80: The AV playback library 1646 accesses the display dimension storage unit 172B, and checks the states of the flags indicating display dimensions. Thus the AV playback library 1646 the checks the operation mode of the playback unit 170. When the flag indicating 3D is on, the operation mode of the playback unit 170 is the "3D display mode". In this case, the process advances to Step S81. When the flag indicating pseudo 2D is on, the operation mode of the playback unit 170 is the "pseudo 2D display mode". In this case, the process advances to Step S84. When the flag indicating 2D is on, the operation mode of the playback unit 170 is the "2D display mode". In this case, the processing finishes.

Step S81: The AV playback library 1646 causes the plane shift engine 178 to temporarily save the graphics plane shift amount and the BD-J plane shift amount which have been already set.

Step S82: The AV playback library 1646 causes the plan shift engine 178 to set both the graphics plane shift amount and the BD-J plane shift amount to 0.

Step S83: The AV playback library 1646 sends a dimension signal DIM indicating that display dimensions are "pseudo 2D" to the display dimension storage unit 172B. In response to the dimension signal DIM, the display dimension storage unit 172B clears the flag indicating that display dimensions are "3D", and sets the flag indicating that display dimensions are "pseudo 2D". After that, the process finishes.

Step S84: The AV playback library 1646 sends a dimension signal DIM indicating that the display dimensions are "3D" to the display dimension storage unit 172B. In response to the dimension signal DIM, the display dimension storage unit 172B clears the flag indicating that display dimensions are "pseudo 2D", and sets the flag indicating that display dimensions are "3D".

Step S85: The AV playback library 1646 causes the plane shift engine 178 to restore the graphics plane shift amount and the BD-J plane shift amount from the saving area. After that, the processing finishes.

<Changes of Video Plane Accompanied by Switching of Operation Modes of Video Decoder 174A>

Figure 27:
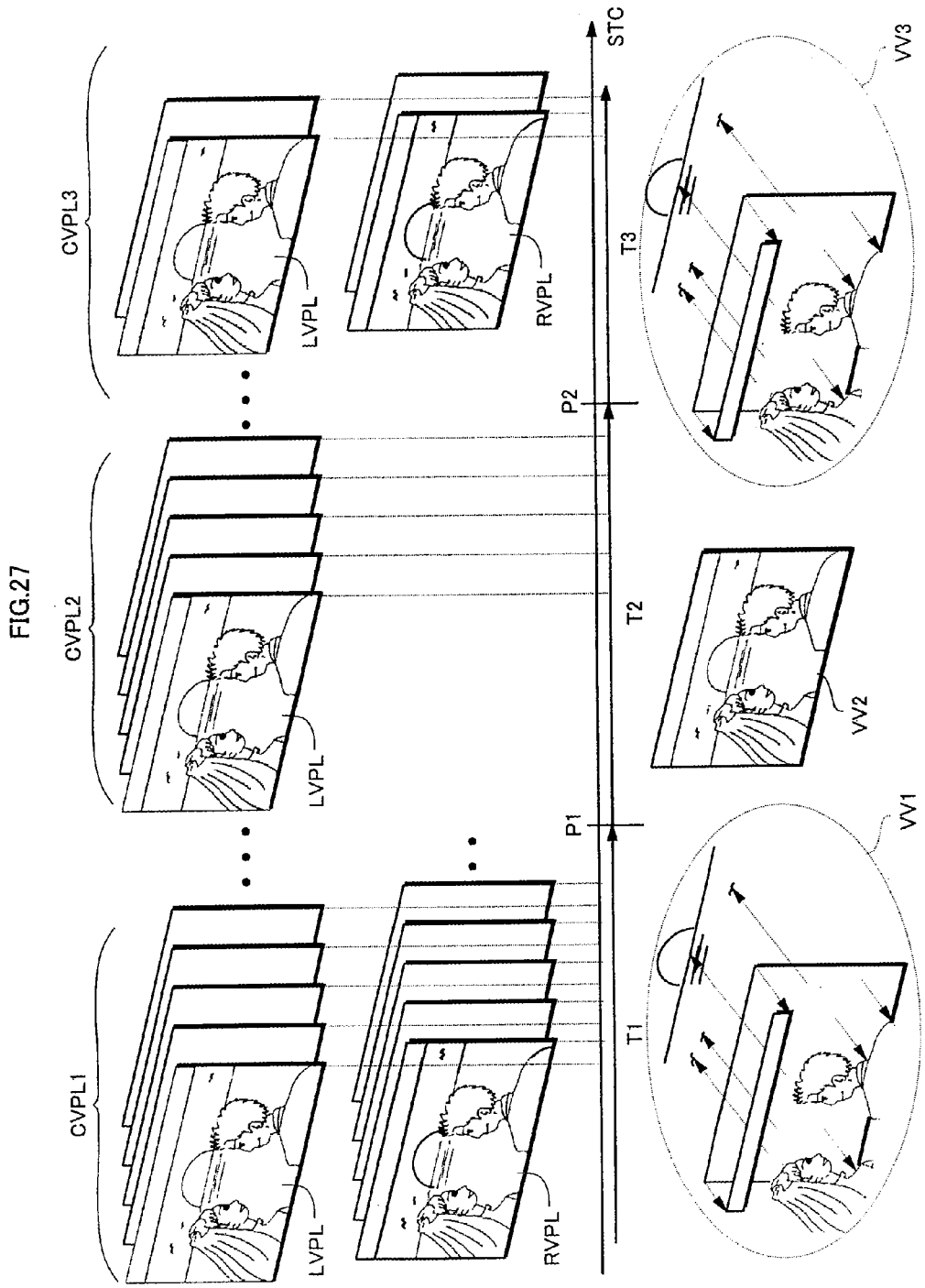
FIG. 27 is a schematic diagram showing video plane sequences to be outputted from the video plane memory to the adder, which are shown in FIG. 15.

FIG. 27 is a schematic view showing video plane sequences CVPL1 to CVPL3, which are outputted from the video plane memory 176 to the adder 179. The time line shown in FIG. 27 represents the clock used in the playback unit 170 as a reference for the PTS. This clock is called STC (System Time Clock), and corresponds to the playback time. First, assume the case where the display dimensions are kept "3D" during the first period T1, and the video decoder 174A operates in the "3D display mode". In the first period T1, the left-view video planes LVPL and the right-view video planes RVPL are alternately outputted from the video plane memory 176, and thus stereoscopic video images VV1 are reproduced from the video plane sequence CVPL1.

For example, assume the case where the user presses a button of the remote controller 400 at a time P1 to request that the playback information be displayed. The operation unit 130 detects the pressing, and sends the notification INT corresponding thereto to the user operation detecting module 162. Furthermore, in response to the notification INT, the user operation detecting module 162 sends an operation signal UO to the dispatcher 1643A, and the dispatcher 1643A notifies the OSD control module 1647 of the operation signal UO. In response to the operation signal UO, the OSD control module 1647 calls the playback mode control API 1646C. As a result, a dimension signal DIM indicating that display dimensions are "pseudo 2D" is outputted from the AV playback library 1646. In response to the dimension signal DIM, the display dimension storage unit 172B clears the flag indicating that display dimensions are "3D" and sets the flag indicating that display dimensions are "pseudo 2D". That is, display dimensions are switched from "3D" to "pseudo 2D". The video decoder 174A detects the changes of the flags, and then switches from the "3D display mode" to the "pseudo 2D display mode". Thus, the video decoder 174A thereafter writes only left-view video frames into the video plane memory 176. In the stated manner, only the left-view video planes LVPL are outputted from the video plane memory 176 during the second period T2 immediately after the time P1, and thus 2D video images VV2 are reproduced from the video plane sequence CVPL2.

Assume the case where the user makes an instruction to delete the playback information by, for example, pressing the button of the remote control 400 again at a time P2 after the time P1. The operation unit 130 detects the operation indicating the instruction, and sends the notification INT corresponding thereto to the user operation detecting module 162. Furthermore, in response to the notification INT, the user operation detecting module 162 sends a operation signal UO to the dispatcher 1643A, and the dispatcher notifies the OSD control module 1647 of the operation signal UO. In response to the operation signal UO, the OSD control module 1647 calls the playback mode control API 1646C. As a result, a dimension signal DIM indicating that the display dimensions are "3D" is outputted from the AV playback library 1646. In response to the dimension signal DIM, the display dimension storage unit 172B cancels the flag indicating that the display dimensions are "pseudo 2D" and sets the flag indicating that the display dimensions are "3D". That is, the display dimensions are returned from "pseudo 2D" to "3D". The video decoder 174A detects the changes of the flags, and returns to the "3D display mode" from the "pseudo 2D display mode". Thus, the video decoder 174A thereafter alternately writes the right-view video frames and the left-view video frames into the video plane memory 176. In the stated manner, the left-view video planes LVPL and the right-view video planes RVPL are alternately outputted from the video plane memory 176 during the third period T3 that follows the time P2, and thus stereoscopic video images VV3 are reproduced from the video plane sequence CVPL3.

<Changes of Graphics Plane Accompanied by Switching of Display Dimensions>

Figure 28:
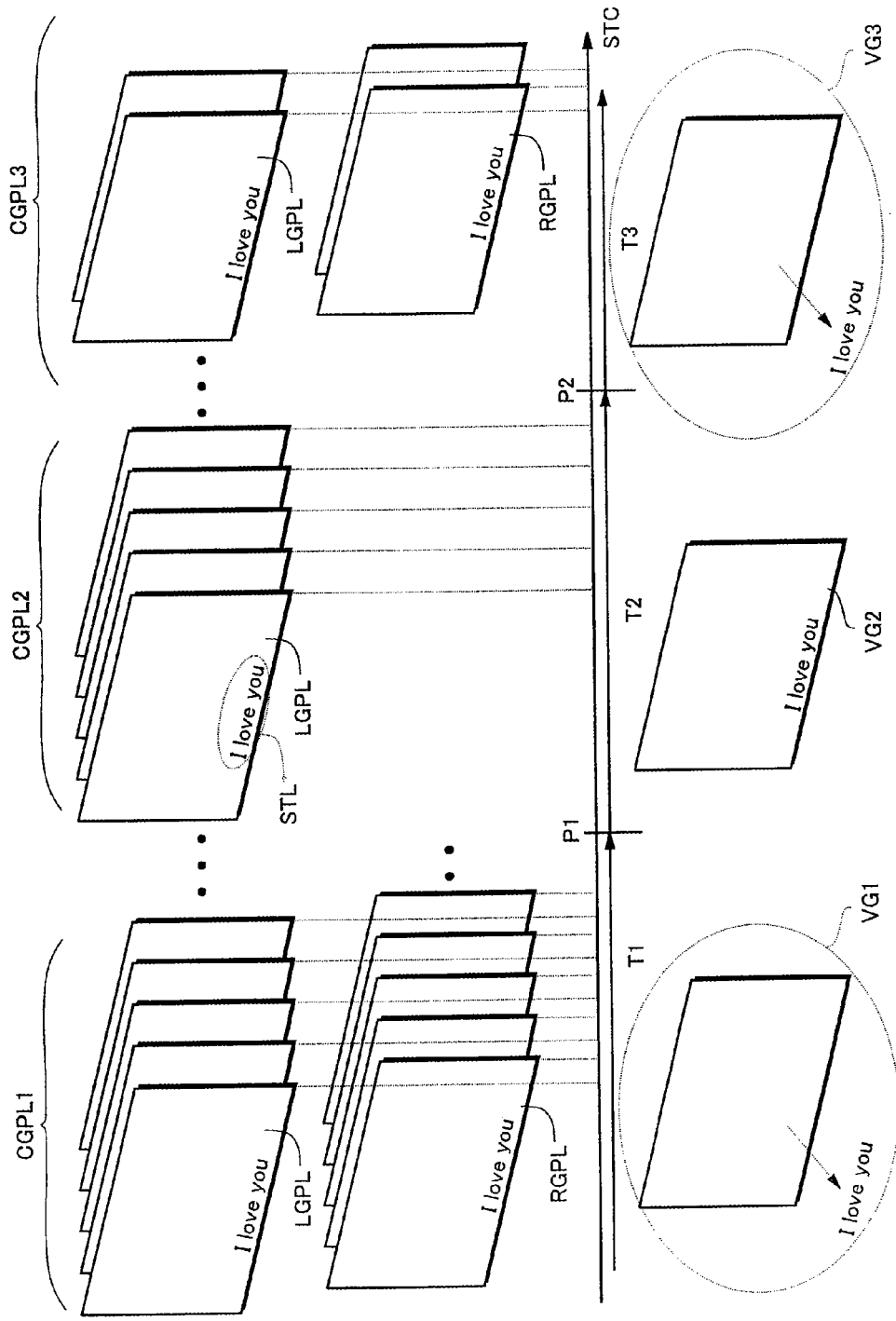
FIG. 28 is a schematic diagram showing video plane sequences to be outputted from the plane shift engine to the adder, which are shown in FIG. 15.

FIG. 28 is a schematic view showing graphics plane sequences CGPL1 to CGPL3, which are outputted from the plane shift engine 178 to the adder 179. The time line shown in FIG. 27 represents the STC. In the same manner as in FIG. 27, FIG. 28 assumes the case where the user presses a button of the remote control 400 at a time P1 under the condition that the display dimensions are kept 3D to request that the playback information be displayed, and requests at the time P2 that the playback information be deleted. In this Case, the playback period is divided into three periods T1, T2, and T3, with the boundaries at the times P1 and P2, and the display dimensions are kept 3D, pseudo 2D, and 3D during these periods T1, T2, and T3, respectively.

In the first period T1 before the time P1, the plane shift engine 178 continues the plane shifting for the graphics plane GPL shown in FIG. 22 by using the plane shift amount. As a result, the left-view graphics planes LGPL and the right-view graphics planes RGPL are alternately outputted from the plane shift engine 178. In the first period T1, a stereoscopic image VG1 of subtitles STL is thus reproduced from the graphics plane sequence CGPL1.

When the user presses the button of the remote control 400 at the time P1 to request that the playback information be displayed, the OSD control module 1647 calls the playback mode control API 1646C in a manner similar to the case of FIG. 27. Thus the AV playback library 1646 causes the plane shift engine 178 to temporarily save the graphics plane shift amount that has been set, and then to reset it to be 0. Accordingly, the plane shift engine 178 thereafter substantially stops the plane shifting for the graphics plane GPL, and repeatedly outputs the graphics plane GPL having the same display location in the horizontal direction of the subtitles STL. As a result, in the second period T2, a 2D image VG2 of the subtitles STL is reproduced from the graphics plane sequence CGPL2.

When the user requests at the time P2 that the playback information be deleted, the OSD control module 1647 calls the playback mode control API 1646C in a manner similar to the case of FIG. 27. Thus the AV playback library 1646 causes the plane shift engine 178 to restore the graphics plane shift amount from the saving area. Accordingly, the plane shift engine 178 restarts the plane shifting on the graphics plane GP by using the graphics plane shift amount. That is, the left-view graphics planes LGPL and the right-view graphics planes RGPL are again alternately outputted from the plane shift engine 178. As a result, in the third period T3, a stereoscopic image VG2 of the subtitles STL is reproduced from the graphics plane sequence CGPL3.

<Control of OSD Plane>

Figure 29:
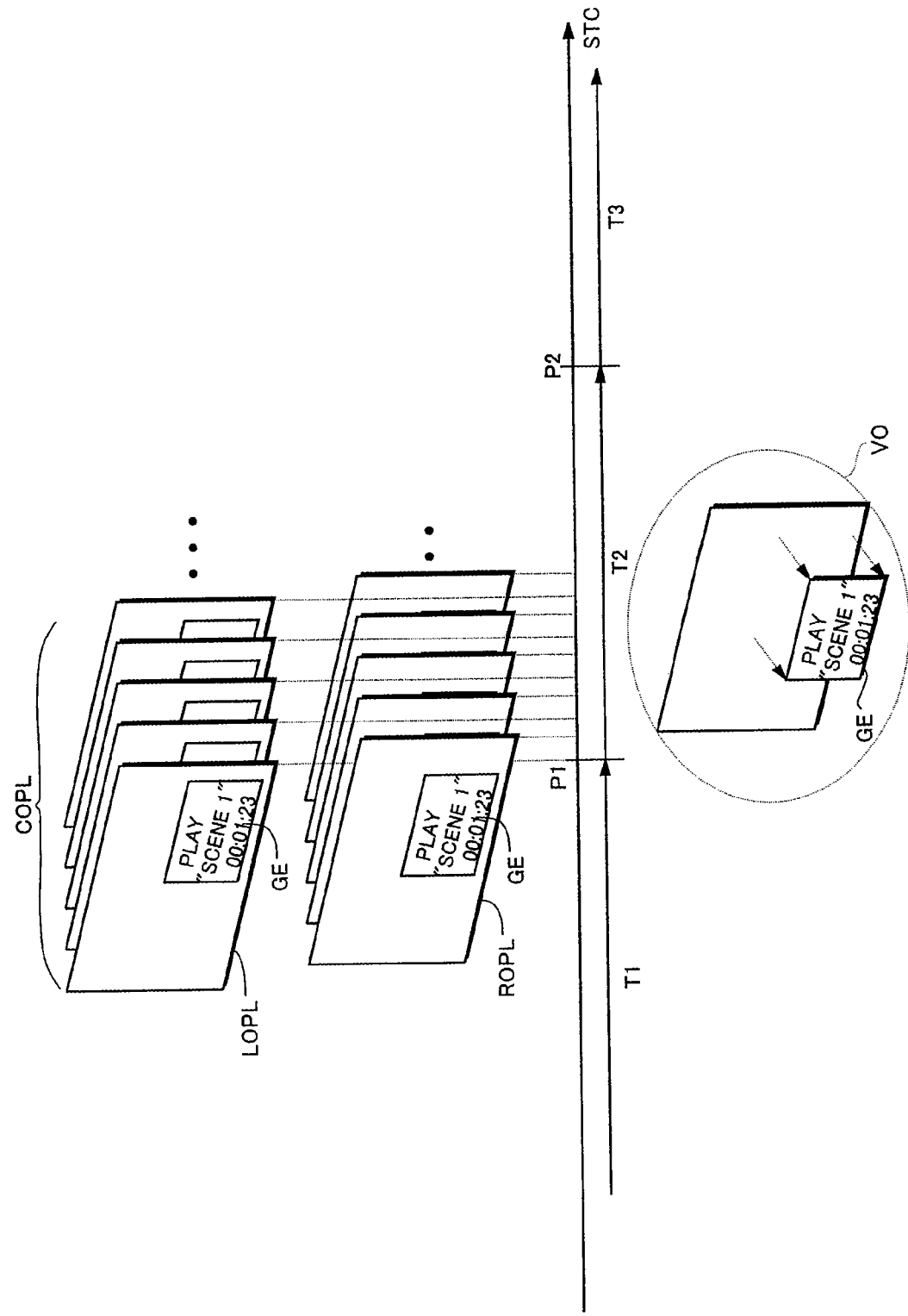
FIG. 29 is a schematic diagram showing OSD plane sequences to be outputted from the plane shift engine to the adder, which are shown in FIG. 15.

FIG. 29 is a schematic view showing an OSD plane sequence COPL, which is outputted from the plane shift engine 178 to the adder 179. The time line shown in FIG. 29 represents the STC. In the same manner as in FIG. 27, FIG. 29 assumes the case where the user presses a button of the remote control 400 at a time P1 under the condition that the display dimensions are kept 3D to request that the playback information be displayed, and requests at the time P2 that the playback information be deleted. In this case, the playback period is divided into three periods T1, T2, and T3, with the boundaries at the times P1 and P2, and the display dimensions are kept 3D, pseudo 2D, and 3D during these periods T1, T2, and T3, respectively.

In the first period T1, the OSD plane memory 177A contains no OSD plane, and therefore no OSD plane is outputted from the plane shift engine 178.

When the user requests at the time P1 that the playback information be displayed, the OSD control module 1647 receives an operation signal UO from the dispatcher 1643A in a manner similar to the case of FIG. 27. In response to the operation signal UO, the OSD control module 1647 generates graphics data GD2 for the OSD GE that represents the playback information, and passes the graphics data GD2 to the rendering engine 175. The rendering engine 175 decodes the graphics data GD2 and writes the result into the OSD plane memory 177A. An OSD plane OPL is thus generated. The plane shift engine 178 performs the plane shifting on the OSD plane OPL by using the OSD plane shift amount. Accordingly, left-view OSD planes LOPL and right-view OSD planes ROPL having different display locations in the horizontal direction of the OSD GE are generated and alternately outputted from the plane shift engine 178. As a result, in the second period T2, a stereoscopic image VO of the OSD GE is generated from the OSD plane sequence COPL.

When the user requests at the time P2 that the playback information be deleted, the OSD control module 1647 receives an operation signal UO from the dispatcher 1643A in a manner similar to the case of FIG. 27. In response to the operation signal UO, the OSD control module 1647 outputs an OSD deletion request RQ2 to the rendering engine 175. In response to the OSD deletion request RQ2, the rendering engine 175 deletes the OSD plane OPL held by the OSD plane memory 177A. As a result, the output of the OSD plane from the plane shift engine 178 stops, and therefore the OSD disappears from the video frames during the third period T3.

<Changes of Stereoscopic Video Accompanied by OSD Display>

Figure 30:
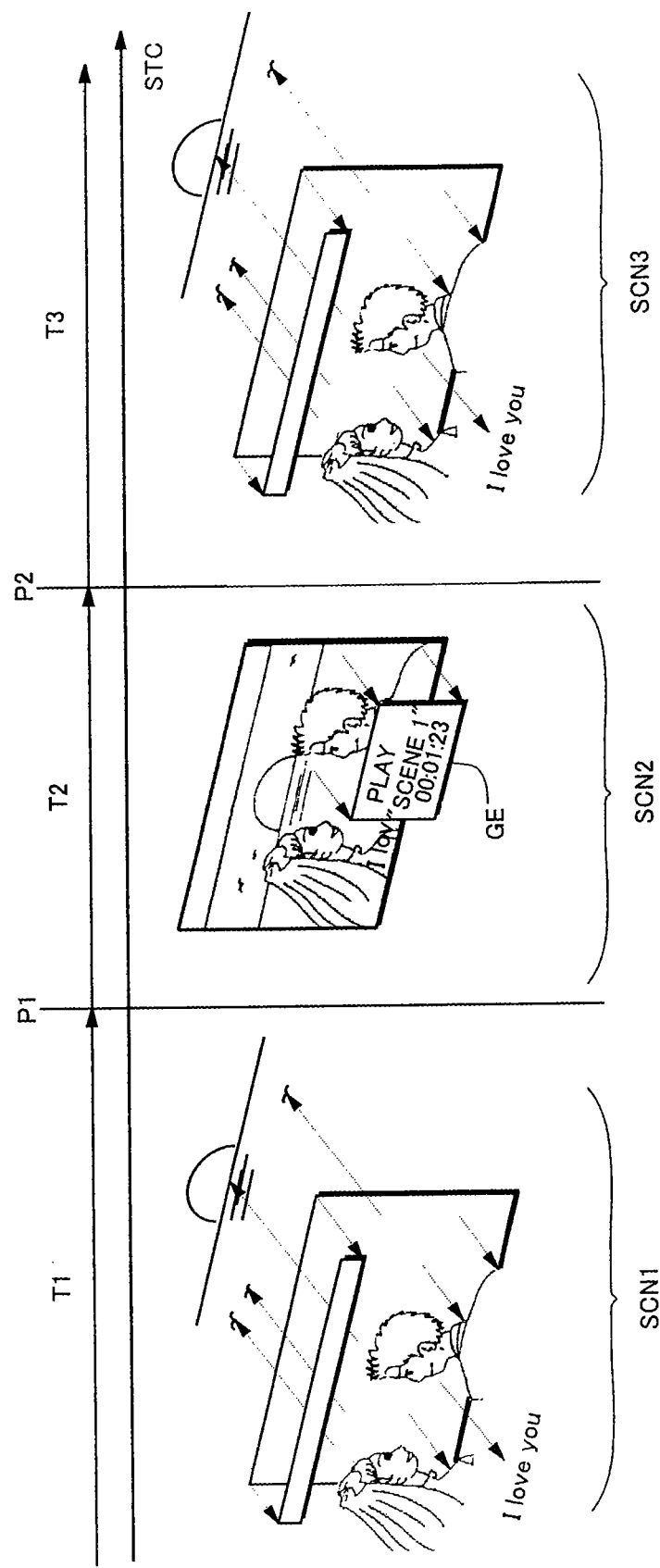
FIG. 30 is a schematic diagram showing stereoscopic video images reproduced from video frame sequences combined from the plane sequences shown in FIG. 27 to FIG. 29.

FIG. 30 is a schematic view showing stereoscopic video images reproduced from a video frame sequence combined from the plane sequence shown in FIG. 27 to FIG. 29. The time line shown in FIG. 30 represents the STC. The times P1 and P2 and the periods T1, T2 and T3 are the same as those shown in FIG. 27 to FIG. 29.

In the periods T1, the display dimensions are kept 3D. The video plane memory 176 alternately outputs left-view video planes LVPL and right-view video planes RVPL to the adder 179. Mean while, the plane shift engine 178 alternately outputs left-view graphics planes LGPL and right-view graphics planes RGPL to the adder 179. The adder 179 combines a single left-view video plane LVPL and a single left-view graphics plane LGPL onto a single left-view video frame, and combines a single right-view video plane RVPL and a single right-view graphics plane RGPL onto a single right-view video frame. The adder 179 repeats these combining operations alternately, and outputs left-view and right-view video frames alternately. Consequently, in the video images SCN1 in the first period T1, both the video images and subtitles of the content are reproduced as stereoscopic images.

When the user requests at the time P1 that the playback information be displayed, the display dimensions are changed from 2D to pseudo 2D. Accordingly, only the left-view video planes LVPL are outputted from the video plane memory 176 to the adder 179. Meanwhile, a graphics plane GPL with subtitles STL at a constant display location in the horizontal direction is repeatedly outputted from the plane shift engine 178 to the adder 179. Thus, in the video images SCN2 in the second period T2, both the video images and subtitles of the content are reproduced as two-dimensional images. However, the left-view OSD planes LOPL and the right-view OSD planes ROPL are alternately outputted from the plane shift engine 178 to the adder 179. As a result, only the OSD GE is reproduced as a stereoscopic image in the video images SCN2 during the second period T2, and the OSD GE looks as if it is nearer than any of the video images and subtitles of the content.

When the user requests at the time P2 that the playback information be deleted, the display dimensions return from pseudo 2D to 3D. Accordingly, again the left-view video planes LVPL and the right-view video planes RVPL are alternately outputted from the video plane memory 176, and the left-view graphics planes LGPL and the right-view graphics planes RGPL are alternately outputted from the plane shift engine 178 to the adder 179. Meanwhile, since the OSD plane OPL is deleted, the output of the OSD plane from the plane shift engine 178 to the adder 179 stops. The adder 179 combines a single left-view video plane LVPL and a single left-view graphics plane LGPL onto a single left-view video frame, and combines a single right-view video plane RVPL and a single right-view graphics plane RGPL onto a single right-view video frame. The adder 179 repeats these composting operations alternately, and outputs left-view and right-view video frames alternately. Consequently, in the video SCN3 in the third period T3, the OSD GE is deleted, and then, both the video images and subtitles of the content are stereoscopically reproduced again.

Note that when the Java application program executed by the BD-J module 1645 performs the pop-up display after causing the playback unit 170 to shift from the "3D display mode" to the "pseudo 2D display mode", the changes of the stereoscopic video shown in FIG. 30 are the same except that the OSD GE is replaced with the pop-up display.

<Effect of Stereoscopic Video Playback Device According to First Embodiment of Present Invention>

As explained above, the playback unit 170 in the display device 100 is operable in two types of operation modes for stereoscopic video display, namely the "3D display mode" and the "pseudo 2D display mode". In the 3D display mode, both left-view and right-view video frames are decoded from the content and alternately used as video planes. In the pseudo 2D display mode, although both left-view and right-view video frames are decoded from the content, one type of the video frames is repeatedly used as the video planes and the other is discarded.

In addition, when outputting the OSD or the pop-up display to the display device 200 while displaying stereoscopic video images, the playback device 100 causes the playback unit 170 to switch from the 3D display mode to the pseudo 2D display mode. On the other hand, the playback device 100 causes the playback unit 170 to output the OSD and the graphics image of the pop-up display as stereoscopic images. Thus, on the screen of the display device 200, the video images of the content are displayed as 2D video images while the OSD and the pop-up display are displayed as stereoscopic images. Consequently, it is possible to further improve the visibility of the OSD and the pop-up display.

Furthermore, the playback device 100 realizes the switching between the "3D display mode" and the "pseudo 2D display mode" simply by writing of the right-view video frames into the video plane memory 176A and stopping of it. The switching can be therefore realized at a hither speed than the switching between the "3D display mode" and the "2D display mode". For this reason, it is unnecessary to insert a so-called "black screen" during the processes for combining OSDs and pop-up displays with the video images of the content. Consequently, it is possible to further improve the operability of the playback device 100.

<Modifications>

(1) In the example shown in FIG. 6, the left-view and right-view primary video streams VL and VR are multiplexed into a single AV stream file 515A. Alternatively, left-view and right-view primary video streams may be separated as two AV stream files. In this case, the play list information for the stereoscopic video includes information used for referring to the two AV stream files at the same time. With this structure, the virtual file system 163 causes the optical disc drive 110 or the local storage 120 to transfer the two AV stream files to the track buffer 172A in parallel. The demultiplexer reads PES packets from the AV streams alternately and sends them to the video decoder 174A. Alternatively, the playback unit 170 may be provided with two pairs of the track buffer 172A and the demultiplexer 173, and cause the pairs to process the two AV stream files respectively. The playback unit 170 may also be provided with two pairs of the video decoder 174A and the video plane memory 176, and cause the pairs to generate left-view video planes and right-view video planes in parallel.

(2) The adder 179 may be constructed from known elements. For example, a video plane outputted from the plane memory 176 may be concurrently combined with an OSD plane, a BD-J plane and a graphics plane outputted from the graphics shift engine 178. Alternatively, the adder 179 may include following two parts. First, the first part combines a graphics plane with a video plane. Next, the second part combines an OSD plane or a BD-J plane with the combination of the first part. The adder 179 may be integrated with the plane shift engine 178. In this case, the plane shifting for planes by the plane shift engine 178 and the combining of planes by the adder 179 are performed as a series of processes.

(3) According to the first embodiment, the dimension identification flag 534 is contained in the playlist information 530 as shown in FIG. 9, as information showing the display dimensions of the video images of the content, namely, information used for distinguishing AV stream files for 2D video images and AV stream files for stereoscopic video images. Alternatively, this information may be contained in, for example, each of the play item information pieces 531-533, the clip information file 514A, or the object files 512B and 516A for the playlist playback process.

(4) According to the first embodiment, the graphics plane shift amount 535 is contained in the playlist information 530 as shown in FIG. 9. Alternatively, the graphics plane shift amount may be contained in, for example, each of the play item information pieces 531-533, the clip information file 514A, the index file 512A, the object files 512B and 516A for the playlist playback process, the XML file 518A, or the AV stream file 515A. If the graphics plane shift amount is contained in dynamic scenario information such as the object files 512B and 516A or the XML file 518A, the dimension judgment unit 1646B may read the graphics plane shift amount from the dynamic scenario information or the XML file 518A and passes the amount to the plane shift engine 178 earlier than Step S5 shown in FIG. 16, for example at Step S3. With this structure, it is unnecessary to set the graphics plane shift amount at every playlist playback process if the graphics plane shift amount is constant in the whole content, and thus the load on the playback device can be reduced. Meanwhile, when the graphics plane shift amount is contained in the AV stream file 515A, the shift amount may be represented as a "Z value" showing the depth of the graphics element, in particular subtitles represented by the graphics stream, accompanied with the coordinate values thereof within the frames. In this case, the graphics decoder 174B reads the graphics plane shift amount from the decoded graphics data, and passes the amount to the plane shift engine 178.

(5) According to the first embodiment, the graphics streams A1 and A2 multiplexed with the AV stream file 515A are used for displaying 2D video images. The plane shift engine 178 generates a pair of graphics planes for displaying stereoscopic video images from a single graphics plane each time the single graphics plane is decoded from the graphics streams by the graphics decoder 174C. A stereoscopic video display method using such plane shifting requires smaller amount of calculations of a playback device than a stereoscopic video display method using pairs of left-view and right-view planes. Thus, the stereoscopic video display method using the plane shifting is advantageous for use in electronic devices with a relatively small memory capacity or relatively low graphics ability, such as mobile phones. Alternatively, a pair of graphics streams for stereoscopic video images, namely left-view and right-view graphics streams, may be beforehand multiplexed with the AV stream file 515A. In this case, the graphics decoder 174C is operable in the two operation modes, "3D display mode" and "pseudo 2D display mode", in the same manner as the video decoder 174A. In the 3D display mode, left-view and right-view graphic planes are alternately generated. In the pseudo 2D display mode, only left-view graphics planes are generated. As a result, in the same manner as shown in FIG. 30, graphics images represented by graphics planes, in particular subtitles, are displayed as 2D images while an OSD or a pop-up display is being displayed as stereoscopic images.

(6) According to the first embodiment, the OSD control module 1647 generates the OSD graphics data GD2 as data for a 2D video. Each time the rendering engine 175 generates a single OSD plane from the graphics data GD2, the plane shift engine 178 generates a pair of OSD planes for a stereoscopic video from the single OSD plane. Alternatively, the OSD control module 1647 generates the OSD graphics data GD2 as data for a stereoscopic video, that is, as a pair of left-view and right-view data pieces. In this case, the rendering engine 175 alternately uses the left-view and right-view OSD graphics data pieces, thereby alternately generating left-view and right-view OSD planes. As a result, in the same manner as shown in FIG. 29, the OSD is displayed stereoscopically. The same applies to the graphics data for the pop-up display performed by the BD-J module 1645.

(7) According to the examples shown in FIG. 16 to FIG. 20, the playlist playback process is executed according to the object referred to in the item "First Play" in the index table contained in the index file 512A. That is, the playlist playback process is executed immediately after the optical disc 500 is inserted into the optical disc drive 110. Alternatively, the playlist playback process may be executed according to an object refereed to as indicated in another item in the index table. The item is, for example, referred to by the module management module 1643 in response to detection by the operation unit 130 of pressing of the playback button by the user. The playlist playback process triggered to be executed at this moment proceeds from Step S2 in the same manner as shown in FIG. 16 to FIG. 20.

(8) According to the first embodiment, either of the graphics plane shift amount, the OSD plane shift amount and the BD-J plane shift amount is defined as a pair of displacements relative to the predetermined location within the video frame. However, each plane shift amount may be defined as, for example, the difference between absolute coordinate values within the video frame before and after the plane shifting. Each plane shift amount is represented with use of a common measurement unit that does not depend on the type of the plane shift engine 178, such as the number of pixels. In this case, the plane shift engine 178 performs calculations for converting the plan shift amounts to values that the hardware can handle, such as conversion from the number of pixels to the number of bits. Alternatively, the plane shift amounts may be beforehand represented in units that the hardware can handle without conversion, such as the number of bits.

(9) According to the first embodiment, each plane shift amount is specified by a pair of displacements having the same magnitude and different signs. Alternatively, the displacements may have different magnitudes. Furthermore, the plane shift amount may be defined only with a displacement for the left-view video plane, for example. In this case, the plane shift engine 178 may invert the signs of the plane shift amount according to the state of the left-light flag.

(10) As shown in FIGS. 22 and 23, the plane shifting by the plane shift engine 178 keeps constant sizes of the graphics elements such as the subtitles STL and the OSD GE. Alternatively, the plane shift engine 178 may perform scaling of the plane to be processed in addition to the plane shifting, and thereby change the sizes of graphics elements to be shifted, according to the plane shift amount. In particular, the sizes are changed such that an image to be displayed nearer to the viewer has a larger size. In this case, in the stereoscopic video generated through the plane shifting, a nearer object looks larger among objects having the same size. Thus, such stereoscopic images make the viewer feel less uncomfortable, and the visibility of the subtitles, the OSD and the like can be further improved.

(11) According to the first embodiment, the control unit 160 reads a graphics plane shift amount from the current playlist information, and passes the amount to the playback unit 170 without change. Alternatively, the control unit 160 may adjust the graphics plane shift amount according to the resolution and the size of the screen of the display device 200. This prevents that the displacement of the graphics image between left-view and right-view video frames exceeds the range that a viewer can perceive as the binocular parallax of a single object. As a result, it is possible to prevent the viewer from seeing the graphics image as a double image not a stereoscopic image. This can further improve the visibility of OSDs, pop-up displays, and the likes.

(12) According to the first embodiment, the left-right flag storage unit 173A is caused to flip the left-right flag each time the demultiplexer 173 reconstructs PES packets from TS packets of left-view and right-view video streams and sends them to the video decoder 174A. Alternatively, the left-right flag storage unit 173A may be caused to flip the left-right flag each time the adder 179 outputs a single video frame resulting from the combining to the display device 200.

(13) Through the plane shifting shown in FIG. 27, a single plane written in the image plane memory 177 is rewritten as a left-view plane when the displacement in the left-view video frame is used, and is rewritten as a right-view plane when the displacement in the right-view video frame is used. Alternatively, a single plane written in the image plane memory 177 may be first used as a left-view plane without change, and then be rewritten as a right-view plane thorough plane shifting using the difference of the displacements between the left-view and right view video frames. In this case, the plane shift amount may be beforehand specified by the difference.

(14) According to the AV stream file 515A shown in FIG. 6, the PID of the left-view video stream V1 is "0x1011", and the PID of the right-view video stream V2 is "0x1012". At Step S45 shown in FIG. 20, the right-view video frame written into the video plane memory 176 is discarded without being outputted to the adder 179. In either of these operations, the difference between the "left-view" and the "right-view" is not essential, and they may be configured to be opposite.

(15) At Step S22 shown in FIG. 18, in the playlist playback process when the display dimensions are 2D, the AV playback library 1646 excludes the right-view video stream from selection. In this case, it depends on the encoding scheme of the left-view and right-view video streams whether the video stream excluded from the selection can be changed to left-view video stream. If the video streams are decoded independently from each other, that is, if the inter-frame correlation between the streams is not used for the encoding, the left-view video stream may be excluded from the selection instead of the right-view video stream. On the other hand, if the inter-frame correlation between the streams is used for the encoding, only the video stream that can not be decoded independently can be excluded from the selection. In this case, in the stream selection table in each of the playitem information pieces 531-533, the video stream that can not be excluded from the selection is given a less stream selection number than the other video stream.

(16) The calling of the playback mode control API 1646C by the OSD control module 1647 in Steps S62 and S66 shown in FIG. 24, and the calling of the playback mode control API 1646C by the Java application program in Steps S72 and S77 shown in FIG. 25 are both performed in advance to the checking of display dimensions in Step S80 shown in FIG. 26. Alternatively, the checking of display dimensions may be performed in advance to the playback mode control API 1646C, and the playback control API 1646C may be actually called only if the display dimensions are not 2D. In this case, when it is checked in Step S80 that the display dimensions are 2D, the AV playback library 1646 may notifies the modules 1645 and 1647 of a display dimension setting error.

According to the first embodiment, the video decoder 174A monitors the state of the flag in the display dimension storage unit 172B, and switches the operation modes relating to the output process of the decoded video frames according to the changes of the state. Alternatively, the video decoder 174A may skip the decoding of the PES packets in one of the buffers according to the changes of the flag in the display dimension storage unit 172B. Alternatively, the demultiplexer 173 may monitor the state of the flag in the display dimension storage unit 172B and switch the PIDs of the video streams to be sent to the video decoder 174A, according to the changes of the state. Specifically, while the display dimensions are kept 3D for example, the demultiplexer 173 holds the PIDs of the both left-view and right view video streams, as the PIDs of the streams to be sent to the video decoder 174A. On the other hand, when the display dimensions are switched to pseudo 2D, the demultiplexer 173 excludes the PIDs of the right-view video streams from the PIDs of the streams to be sent to the video decoder 174A. This also allows the video plane memory 176 to hold only a left-view video plane while the display dimensions are pseudo 2D.

According to the first embodiment, left-view and right-view video planes are each independently generated in different arrays in the single video plane memory 176. Alternatively, the left-view and right-view video plans may be alternately overwritten with each other. In this case, in the pseudo 2D display mode, each time the video decoder 174A decodes a single uncompressed video frame, the video decoder 174A identifies which buffer's PES packets the uncompressed video frame is decoded from. If the buffer is that allocated to PES packets of the left-view video stream, the video decoder 174A writes the video frame into the video plane memory 176. On the other hand, if the buffer is that allocated to PES packets of the right-view video stream, the video decoder 174A discards the video frame. Thus only left-view video frames are written into the video plane memory 176 while the display dimensions are kept pseudo 2D.

(19) According to the first embodiment, the video plane memory 176 selects one of the two arrays according to the state of the switching signal PTD, and outputs video planes from the selected one to the adder 179. Alternatively, the adder 179 monitors the state of the flag in the display dimension storage unit 172B, selects one of the two arrays according to the changes of the flag, and outputs video planes from the selected one. Specifically, while the display dimensions are kept 3D for example, the adder 179 reads video planes alternately from the two arrays. When the display dimensions are switched to pseudo 2D, the adder 179 reads, only from the array holding left-view video planes, each of the video planes twice. Thus only left-view video frames are given to the adder 179 from the video plane memory 176 while the display dimensions are kept pseudo 2D.

(20) The playback mode control API 1646C may be configured as a series of programs for realizing the whole flowchart shown in FIG. 26, or may be configured as a combination of an API to be used for switching the display dimensions from 3D to pseudo 2D and, conversely, an API to be used for switching the display dimensions from pseudo 2D to 3D. The playback mode control API 1646C may also be configured such that the judgment at Step S80 is executed by each of the modules 1645 and 1647 that has called the API, and the playback mode control API 1646C receives, as a parameter, the value of the display dimensions acquired by the judgment.

(21) According to the first embodiment, only the OSD and the pop-up display are displayed as stereoscopic images while the display dimensions are pseudo 2D. Alternatively, while the display dimensions are pseudo 2D, both the OSD plane shift amount and the BD-J plane shift amount may be set to 0 and accordingly the OSD and the pop-up display may be displayed as 2D images. Also in this case, the video/subtitles images of the content are displayed as 2D images, and thus, does not degrade the visibility of the OSD and the pop-up display. This can also allow people not wearing liquid crystal shutter glasses to see screen displays, in particular, the OSD and the pop-up display.

(22) The playback unit 170 may further be provided with a background plane memory. Similarly to the other plane memories, the background plane memory is a two-dimensionally arrayed data area secured in the built-in memory of the playback unit 170. On the background plane memory, for example the rendering engine 175 constructs a background plane from a still image to be combined as the background onto the video frame. The still image is provided from, for example, the optical disc 500 or the local storage 120. After that, the background plane is handled in the same manner as the graphics plane. That is, while the display dimensions are kept 3D, the background plane is processed through the plane shifting by the plane shift engine 178. The left-view and right-view background planes generated as a result are alternately outputted from the plan shift engine 178 to the adder 179, and are alternately combined onto the left-view and right-view video frames, together with the left-view and right view video planes. Thus, the background image represented by the background plane is stereoscopically displayed on the screen. On the other hand, when the display dimensions are switched to pseudo 2D, the plane shift engine 178 substantially stops the plane shifting on the background plane, and outputs each background plane twice to the adder 179. In this case, the same background plane is combined twice with the same left-view video planes, and such combined planes are outputted to the display device 200 as left-view and right-view video frames, respectively. Thus the background image is displayed in 2D on the screen. Such a background image does not degrade the visibility of the OSD or the pop-up display.

(23) According to the first embodiment, the playback device 100 plays back stereoscopic video from the optical disc 500. Alternatively, the playback device 100 may be provided with a tuner, use the tuner to receive stream data for a stereoscopic video distributed via terrestrial broadcast, satellite broadcast or cable broadcast, and playback the received data similarly to the playback of AV stream files. The tuner demodulates a video stream from the received broadcast wave, and judges whether the video stream is for stereoscopic video images or not. The tuner notifies the dimension judgment unit 1646B of the display dimensions as the result of the judgment. Meanwhile, the graphics plane shift amount may be contained in the above-mentioned stream data being broadcasted, as accompanying data. In this case, the tuner demodulates the graphics plane shift amount from the broadcast wave, and passes the amount to the plane shift engine 178.

Second Embodiment

The playback device in accordance with the second embodiment of the present invention is different from that in accordance with the first embodiment in that an operation mode for stereoscopically displaying the video/subtitles of the contents as well as the OSD is selectable. The other features, such as the data structure on the optical disc, the hardware configuration of the playback device, and the structures of the control unit and the playback unit are the same as those of the first embodiment. Thus the following explanation only describes the features of the second embodiments different from the features of the first embodiment, and the features similar to those of the first embodiment are hereby incorporated by reference.

The playback device displays a prescribed selection screen on the display device 200 in response to a user operation or an instruction from an application program. The selection screen is displayed by the OSD control module 1647 or the BD-J module 1645. Using this selection screen, a user can select whether the video/subtitles images of the content are to be displayed as 2D or stereoscopic images while OSDs and the likes are being displayed on a screen. When the user selects the displaying of the video/subtitles images of the content as 2D images, the AV playback library 1646 enables the playback mode control API 1646C. On the other hand, when the user selects the displaying of the video/subtitles images of the content as stereoscopic images, the AV playback library 1646 disables the playback mode control API 1646C. The information about whether the playback mode control API is enabled or disabled is recorded in the register 1646A.

Figure 31:
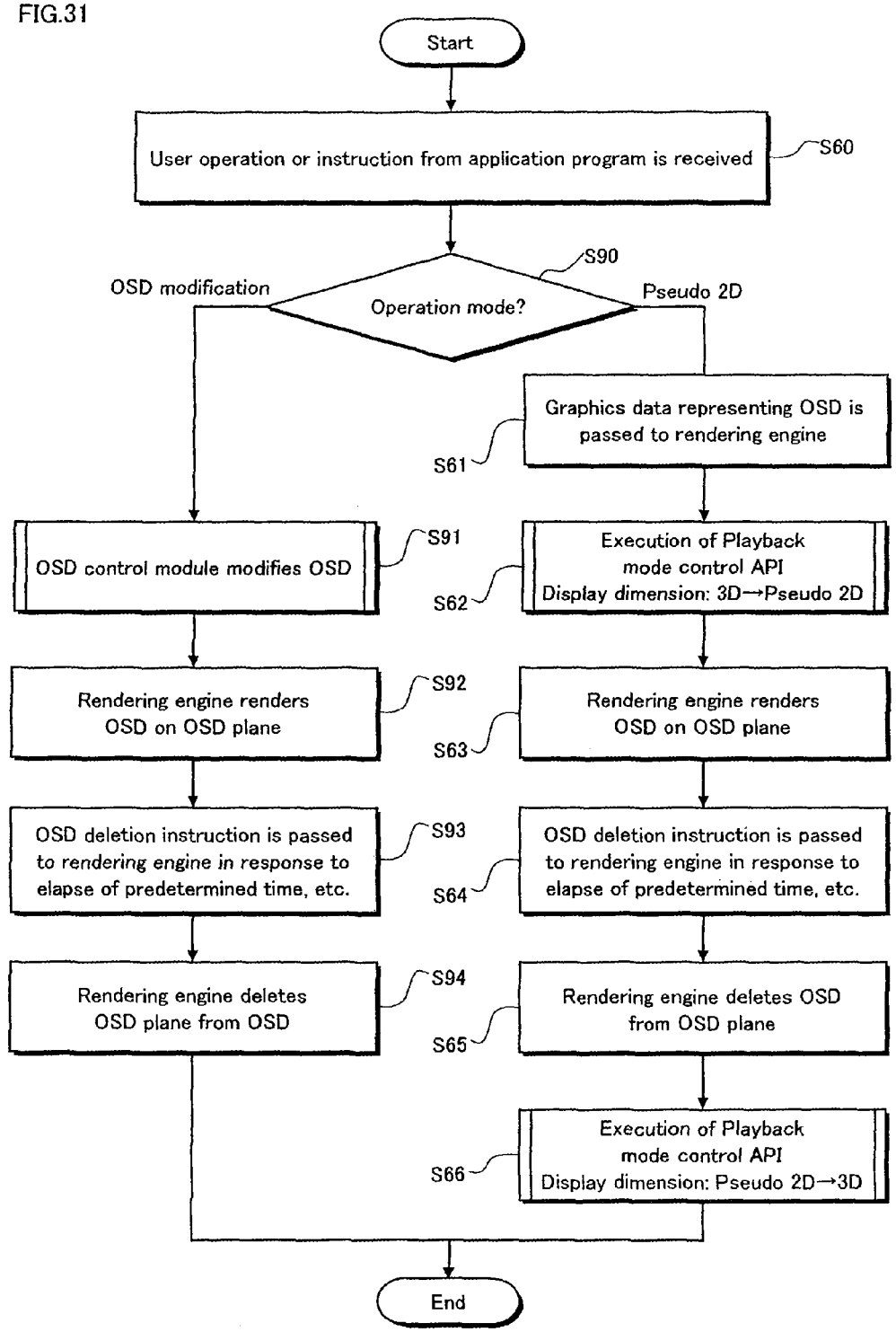
FIG. 31 is a flowchart relating to control of OSD plane performed by a playback device in accordance with the second embodiment of the present invention.

FIG. 31 is a flowchart relating to the control of the OSD plane, performed by the playback device 100. While performing the playlist playback process explained above, the playback device 100 monitors user operations and instructions from the application programs. Every time the playback device 100 detects the operations and the instructions, it renders the corresponding OSD on the OSD plane. The generated OSD plane is combined onto the video frame through the playlist playback process, and is outputted to the display device 200.

The following explains the control of the OSD plane by the playback device 100 in the order of Steps shown in FIG. 31. Note that Steps S60 to S66 in FIG. 31 are the same as those shown in FIG. 24. Thus the explanations thereof for FIG. 24 are hereby incorporated by reference.

Step S60: The operation unit 130 detects pressing of a button of the remote control 400 or the front panel. In response, an operation signal UO is sent to the OSD control module 1647 via the user operation detecting module 162 and the dispatcher 1643A. Alternatively, the HDMV module 1644 or the BD-J module 1645 sends an instruction relating to the OSD display to the OSD control module 1647 according to the application program.

Step S90: The OSD control module 1647 accesses the register 1646A in response to the operation signal UO of the instruction, and checks whether the playback mode control API 1646C has been enabled or disabled. If the playback mode control API has been enabled, the process advances to Step S61. If the playback mode control API 1646C has been disabled, the process advances to Step S91.

Step S61: The OSD control module 1647 generates the OSD graphics data GD2 corresponding to the details of the operation signal UO or the instruction, and passes the OSD graphics data GD2 to the rendering engine 175.

Step S62: The OSD control module 1647 calls the playback mode control API 1646C, and sifts the display mode of the playback unit 170 from the 3D display mode to the pseudo 2D display mode.

Step S63: The rendering engine 175 generates an OSD plane by using the graphics data GD2 from the OSD control module 1647.

Step S64: After the sending of the graphics data GD2, in response to elapse of a predetermined time, the OSD control module 1647 sends an OSD deletion request RQ2 to the rendering engine 175.

Step S65: The rendering engine 175 deletes the OSD plane in response to the deletion request RQ2.

Step S66: The OSD control module 1647 calls the playback mode control API 1646C, and returns the display mode of the playback unit 170 from the pseudo 2D display mode to the 2D display mode. Thus the processing finishes.

Step S91: First, the OSD control module 1647 selects graphics data of OSD corresponding to the details of the operation signal UO or the instruction. Next, the OSD control module 1647 processes the graphics data. This processing is made to the part to be perceived in front of the OSD of the stereoscopic image represented by a pair of left-view and right-view video frames, such that the part does not have an area that is hidden in one of the pair and is not hidden in the other. The necessity and the details of the processing will be described below. After the processing, the OSD control module 1647 passes the OSD graphics data GD2 to the rendering engine 175.

Step S92: The rendering engine 175 decodes graphic data GD2 received from the OSD control module 1647, and writes the decoded data into the OSD plane memory 177A. Thus the OSD plane is generated.

Step S93: After the sending of the graphics data GD2, the OSD control module 1647 sends an OSD deletion request RQ2 to the rendering engine 175 in response to an elapse of a predetermined time, receipt of a new operation signal UO, or instructions from other modules 1644 and 1645.

Step S94: In response to the deletion request RQ2, the rendering engine 175 deletes the OSD plane held by the OSD plane memory 177A. As a result, the output of the OSD plane from the plane shift engine 178 is stopped. Thus the processing finishes.

<Necessity of OSD Processing in Step S91>

While the OSD plane shift amount is being kept constant, the depth of the OSD perceived by the viewer is kept constant. Meanwhile, in the stereoscopic video of the content, the depths of various objects change widely in various manners. Thus, the OSD may be displayed in the view direction to an object that is displayed in front of the OSD.

Figure 32A:
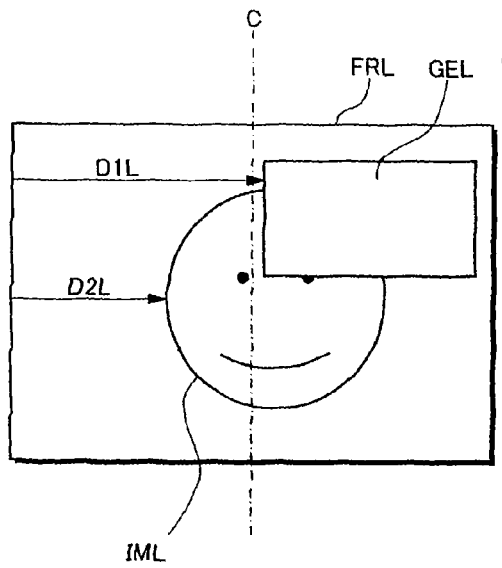
FIGS. 32A to 32C are schematic diagrams each showing a stereoscopic video images in which an OSD is superimposed without change onto an object to be displayed in front of the depth of the OSD.
Figure 32B:
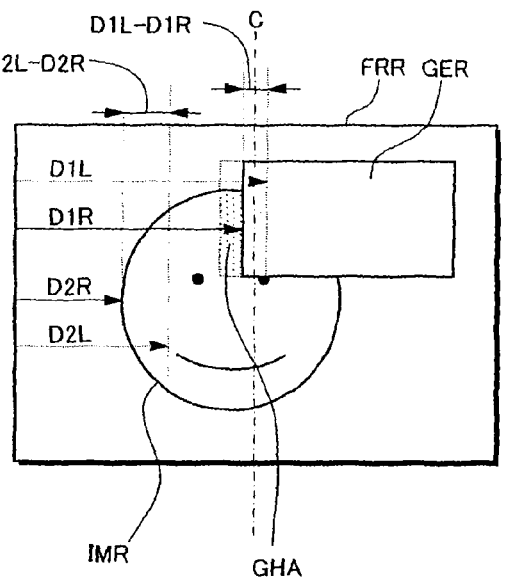
Figure 32C:
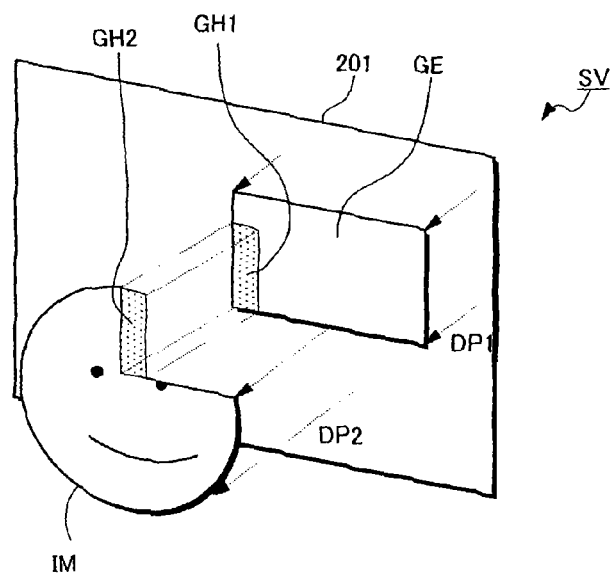

FIGS. 32A-32C are schematic views showing a stereoscopic video SV in which the unprocessed OSD GE is superimposed on an object IM displayed in front of the OSD GE. FIG. 32A shows a left-view video frame FRL used for displaying the stereoscopic video SV. FIG. 32B shows a right-view video frame FRR used for displaying the stereoscopic video SV. FIG. 32C schematically shows the stereoscopic video SV seen on the screen 201 of the display device 200. In FIG. 32A and FIG. 32B, the center line C of the video frames FRL and the center line C of the video frame FRR are each illustrated with a dashed-doted line.

As seen from comparison between FIG. 32A and FIG. 32B, the distance D1L from the left end of the left-view video frame FRL and to the OSD GEL is greater than the distance D1R from the left end of the right-view video frame FRR and to the OSD GER. Thus, as shown in FIG. 32C, the OSD GE in the stereoscopic video images SV looks as if it is nearer than the screen 201 by the first distance DP1. On the other hand, the distance D2L from the left end of the left-view video frame FRL to the object IML is greater than the distance D2R from the left end of the right-view video frame FRR to the object IMR. Thus, as shown in FIG. 32C, the object IM in the stereoscopic video SV looks as if it is nearer than the screen 201 by the second distance DP2. Here, between the left-view video frame FRL and the right-view video frame FRR, the displacement D2L−D2R between the objects IML and IMR is greater than the displacement D1L−D1R between the OSDs GEL and GER. Thus, in the stereoscopic video images SV, the object IM is displayed in front of the OSD GE. That is, the second distance DP2 is greater than the first distance DP1. However, as shown in FIGS. 32A and 32B, the OSD GEL and GER in the video frames FRL and FRR partially cut off the views of the objects IML and IMR. Thus, in the stereoscopic images SV, the object IM looks as if its part overlapping the OSD GE is cut away.

As further seen from comparison between FIG. 32A and FIG. 32B, the strip-shaped area GHA on the object IMR, which is seen adjacent to the left of the OSD GER in the right-view video frame FRR, cannot be seen in the left-view video frame FRL because it is hidden behind the left end of the OSD GEL. This means "although the object IM is seen in front of the OSD GE in the stereoscopic video images SV, the strip-shaped area GH2 on the object IM shown in FIG. 32C is seen from the right eye of a viewer but not from the left eye thereof". In other words, "the strip-shaped area GH1 on the OSD GE is seen from the left eye of a viewer even though the area should not be seen because it is hidden behind the strip-shaped area GH2 on the object IM". As a result, the viewer cannot properly perceive the depths of the areas GH1 and the GH2, and thus sees the areas unnaturally bent or flickering. If such areas are excessively large, there is a risk that the OSD GE looks as if unnaturally embedded in the object IM. This is unfavorable because it might reduce the visibility of the OSD GE, and moreover, cause eyestrain of the viewer. Thus, it is necessary to process the OSDs GEL and GER such that areas like the area GHA are not generated in any of the left-view video frame FRL and the right-view video frame FRR.

<Details of OSD Processing at Step S91>

The processing of the OSD performed in Step S91 is a process for preventing that an area like the area GHA shown in FIG. 32B is generated in any of the left-view video frame FRL and the right-view video frame FRR. Such an area is characterized by contained in a part of stereoscopic video images to be perceived in front of the OSD, the stereoscopic video images represented by the pair of left-view and right-view video frames, and hidden behind the OSD in one of the pair but not in the other.

As the methods for the OSD processing, the following three types A to C are effective: (A) increasing the horizontal width of the OSD to cover the full width of a frame; (B) making at least the part of the OSD overlapping other stereoscopic video images translucent; (C) in the case of a stereoscopic video image to be seen in depth in front of the OSD, adding a strip to a right side of the OSD on the left-view image plane when a right end of the OSD overlaps the stereoscopic video image, and adding a strip to a left side of the OSD on the right-view image plane when a left end of the OSD overlaps the stereoscopic video image. The following explains the three types A to C in this order.

Figure 33A:
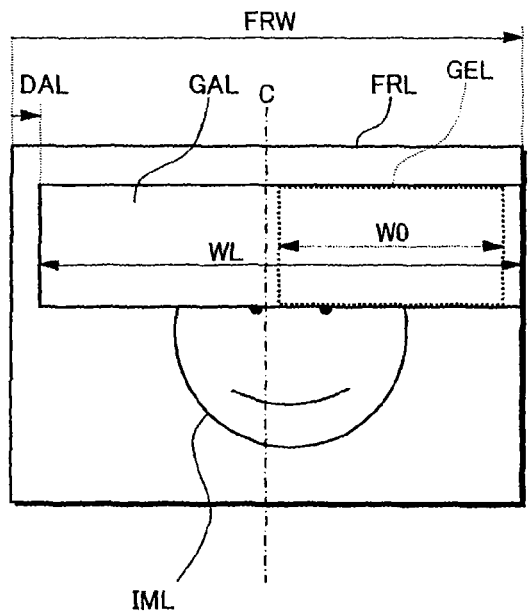
FIGS. 33A to 33C are schematic diagrams for explaining OSD processing A in accordance with the second embodiment of the present invention.
Figure 33B:
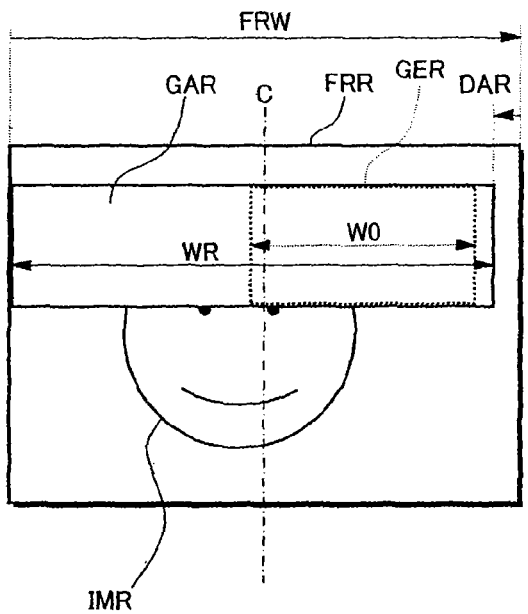
Figure 33C:
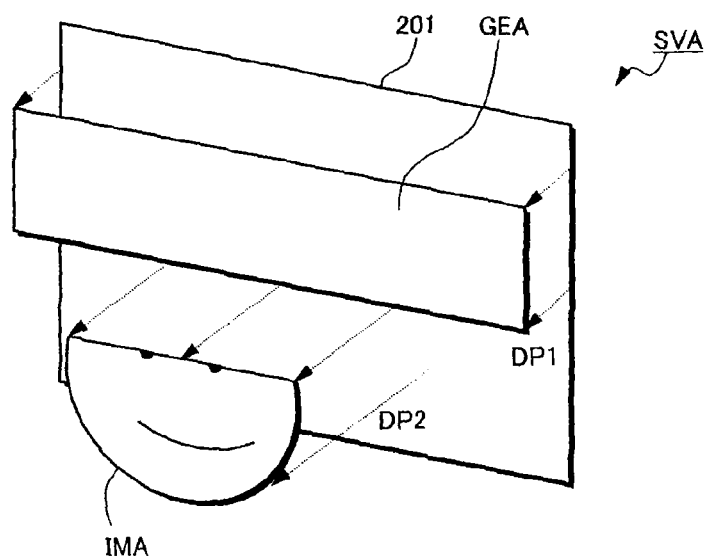

(A) FIGS. 33A to 33C are schematic views for explaining the OSD processing A. FIG. 33A shows a left-view video frame FRL obtained through the OSD processing A. FIG. 33B shows a right-view video frame FRR obtained through the OSD processing A. FIG. 33C schematically shows a stereoscopic video SVA displayed with the pair of video frames FRL and FRR, on the screen 201 of the display device 200. In FIG. 33A and FIG. 33B, the center line C of the video frames FRL and the center line C of the video frame FRR are each illustrated with a dashed-dotted line. The OSDs GEL and GER before the processing are each illustrated with a dotted line.

FIG. 33A shows that, in the left-view video frame FRL, the length of the OSD GAL in the horizontal direction, namely the width WL, is extended from the width W0 of the unprocessed OSD such that the width WL is less than the width FW of the video frame by the difference DAL. Furthermore, the extended OSD GAL is placed such that the right end thereof is substantially at the same location as the right end of the video frame FRL. Here, the difference DAL therebetween is equal to the displacement D1L−D1R between the OSDs GEL and GER in the left-view video frame FRL and the right-view video frame LRR shown in FIGS. 33A and 33B (i.e. DAL=D1L−D1R). Meanwhile, as shown in FIG. 33B, in the right-view video frame FRR, the length of the OSD GAR in the horizontal direction, namely the width WL, is extended from the width WO of the unprocessed OSD such that the width WL is less than the width FW of the video frame by the difference DAR. Furthermore, the extended OSD GAR is placed such that the left end thereof is substantially at the same location as the left end of the video frame FRR. As shown in FIGS. 33A and 33B, the displacement between the extended OSD GAL in the left-view video frame FRL and the extended OSD GAR in the right-view video frame FRR is horizontal and amounts DAL=D1L−D1R. Thus, as shown in FIG. 33C, the extended OSD GAE in the stereoscopic video SVA has the same depth as the OSD GE shown in FIG. 32C, which means that the OSD GAE looks as if it is nearer than the screen 201 by the first distance DP1. However, the width of the OSD GAE looks as if it is substantially the same as the full width of the screen 201.

On the other hand, the displacement D2L−D2R between the object IML in the left-view video frame FRL and the object IMR in the right-view video frame FRR is the same as that shown in FIGS. 32A and 32B. Thus, as shown in FIG. 33C, the object IMA in the stereoscopic video SVA has the same depth as the object IM shown in FIG. 32C, which means that the object IMA looks as if it is nearer than the screen 201 by the second distance DP2. That is, in FIG. 33C, the object IMA is seen in front of the OSD GEA in the same manner as in FIG. 32C. Here, as shown in FIGS. 33A and 33B, the OSD GEL in the left-view frame FRL and the OSD GER in the video frame FRR are displayed such that the same part of each of the objects IML and IMR is hidden behind the corresponding OSD GEL or GER. As a result, the object IMA in the stereoscopic video SVA looks as if the part is cut away with the OSD GEA. However, in FIGS. 33A and 33B, unlike in FIGS. 32A and 32B, neither of the objects IML and IMR in the video frames FRL and FRR contains such an area that is seen from only one eye of the viewer. Thus, the viewer properly perceives the difference between the depths of the object IMA and the OSD GEA.

Figure 34A:
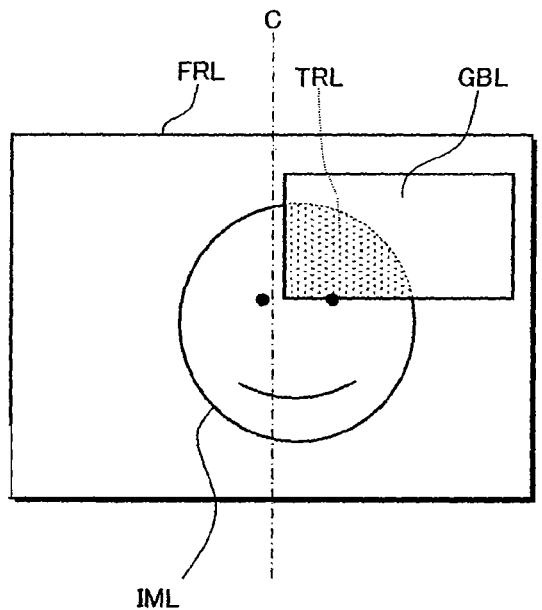
FIGS. 34A to 34C are schematic diagrams for explaining OSD processing B in accordance with the second embodiment of the present invention.
Figure 34B:
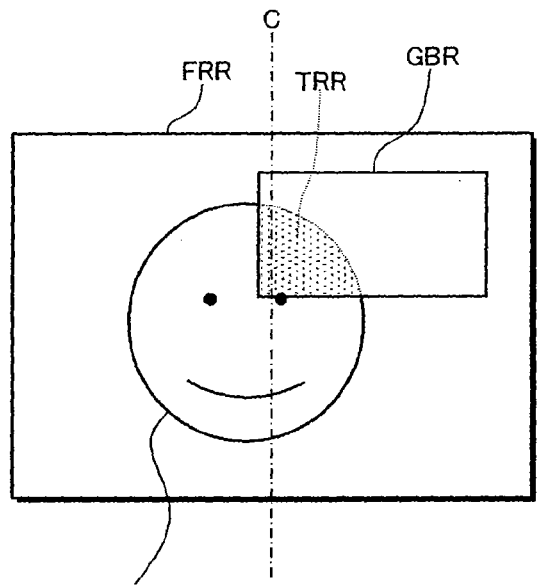
Figure 34C:
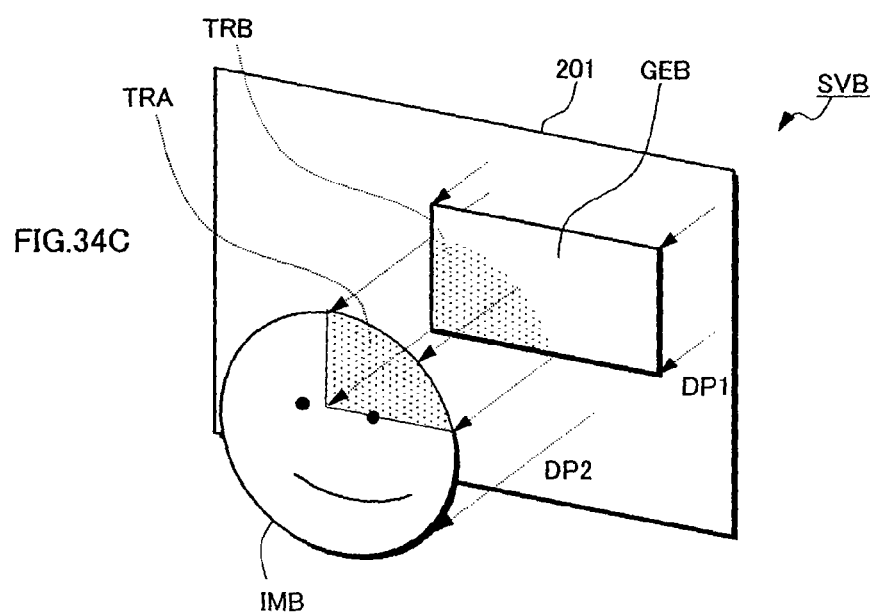

(B) FIG. 34 is a schematic view for explaining the OSD processing B. FIG. 34A shows a left-view video frame FRL obtained through the OSD processing B. FIG. 34B shows a right-view video frame FRR obtained through the OSD processing B. FIG. 34C schematically shows stereoscopic video images SVB displayed with the pair of video frames FRL and FRR on the screen 201 of the display device 200. In FIGS. 34A and 34B, the center lines C of the video frames FRL and FRR are each illustrated with a dashed-dotted line.

As shown in FIGS. 34A and 34B, OSDs GBL, GBR and objects IML, IMR in the video frames FRL, FRR are located in the same manner as that shown in FIGS. 32A and 32B, respectively. However, in FIGS. 34A and 34B, areas TRL and TRR of the OSDs GBL and GBR overlapping the objects IML and IMR in the video frames FRL and FRR, respectively, has an a value set to a positive value that is sufficiently less than one, e.g., 0.5. That is, the areas TRL and TRR are constructed to be translucent.

The OSD control module 1647 performs the following process to determine the areas TRL and TRR to be translucent. The OSD control module 1647 accesses the video plane memory 176, and searches for the video data in the same address range as the OSDs GBL and GBR in the OSD plane. As a result, if the OSD control module 1647 detects the areas TRL and TRR that contain the video data pieces for the objects IML and IMR to be displayed in front of the OSDs GBL and GBR, the OSD control module 1647 determines the areas TRL and TRR as the areas to be translucent.

The adder 179 combines the OSD planes containing the partially-translucent OSDs GBL and GBR with the video planes representing the objects IML and IMR, according to the Porter-Duff rule. That is, the adder 179 performs a blending. Thus, as illustrated with dots in FIGS. 34A and 34B, parts of the objects IML and IMR in the video frames FRL and FRR after the combining, which are hidden behind the areas TRL and the TRR of the OSDs GBL and GBR, are seen through the areas.

In the left-view and right-view frames FRL and FRR shown in FIGS. 34A and 34B, the displacement between the OSDs GBL and GBR and the displacement between the objects IML and IMR are the same as those shown in FIGS. 32A and 32B. Thus, in the stereoscopic video SVB shown in FIG. 34C, the object IMB is seen in front of the OSD GEB in the same manner as the stereoscopic video SV shown in FIG. 32C. However, in FIGS. 34A and 34B, unlike in FIGS. 32A and 32B, both the objects IML and IMR in the video frames FRL and FRR are respectively seen through the OSDs GBL and the GBR in whole. As a result, in FIG. 34C, unlike in FIG. 32C, the part TRB of the OSD GEB behind the object IMB is seen through the area TRA of the object IMB. Thus, the viewer properly perceives the difference between the depth of the object IMA and the depth of the OSD GEA.

Figure 35A:
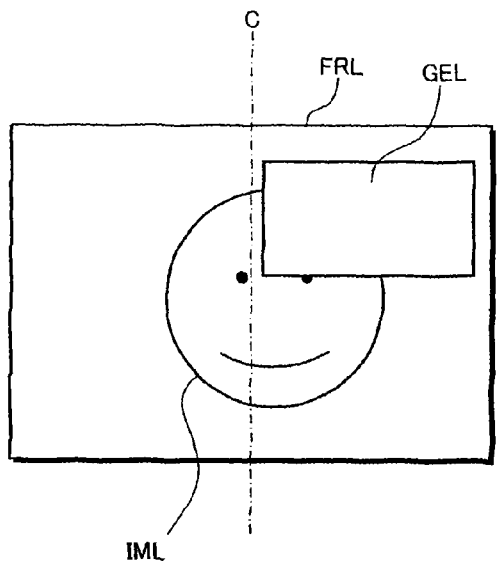
FIGS. 35A to 35C are schematic diagrams for explaining OSD processing C in accordance with the second embodiment of the present invention, where
Figure 35B:
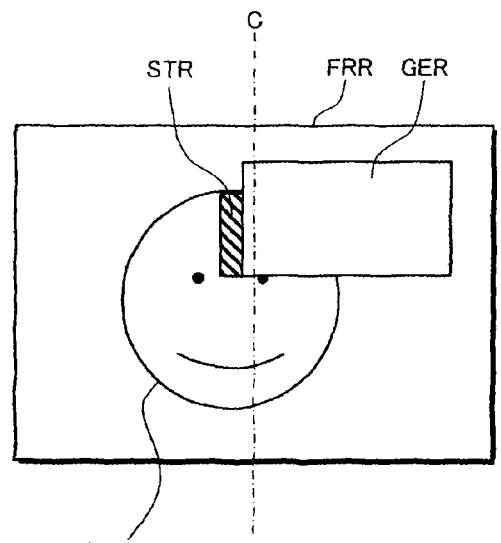
Figure 35C:
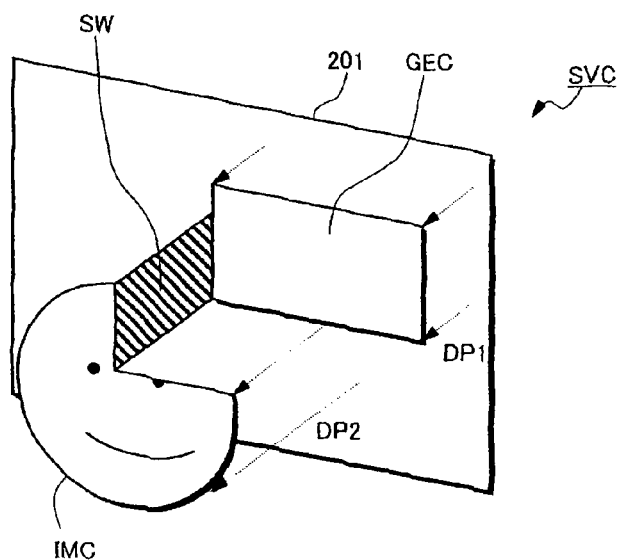

(C) FIGS. 35A to 35C are schematic views for explaining the OSD processing C. FIG. 35A shows a left-view video frame FRL obtained through the OSD processing C. FIG. 35B shows a right-view video frame FRR obtained through the OSD processing C. FIG. 35C schematically shows a stereoscopic video SVC displayed with the pair of video frames FRL and FRR on the screen 201 of the display device 200. In FIGS. 35A and 35B, the center lines C of the video frames FRL and FRR are each illustrated with a dashed-dotted line.

As shown in FIGS. 35A and 35B, OSDs GEL and GER and objects IML and IMR in the video frames FRL and FRR are located in the same manner as that shown in FIGS. 32A and 32B, respectively. However, in FIG. 35B, unlike in FIG. 32B, a black strip STR is added to the left end of the OSD GER. As a result, the strip-shaped area GHA on the object IMR, which is seen adjacent to the left end of the OSD GER in FIG. 32B, is hidden behind the black strip STR in FIG. 35B. That is, in FIGS. 35A and 35B, unlike in FIGS. 32A and 32B, neither of the objects IML, IMR adjoining the left end of the OSDs GEL and GER, respectively, contains such an area that is seen from only the right eye of a viewer.

The OSD control module 1647 performs the following process to place the black strip STR. The OSD control module 1647 accesses the video plane memory 176, and searches for the video data in the same address range as the OSDs GEL and GER in the OSD plane. As a result, if the OSD control module 1647 detects the areas that contain the video data pieces for the objects IML and IMR to be displayed in front of the OSDs GEL and GER, the OSD control module 1647 further searches for the areas adjoining the left end or the right end of the OSDs GEL and GER, within the address range of the video data pieces for the objects IML and IMR. As a result, if the OSD control module 1647 detects the area GHA that is out of the address range of the graphics data of the OSDs GEL and GER from the from the adjoining area in either one of the left-view and right-view video planes, the OSD control module 1647 places the black strip STR on the area GHA.

As clearly seen from FIGS. 35A and 35B, the black strip STR is not seen from the left eye of the viewer, but is seen from the right eye. Thus, as shown in FIG. 35C, the black strip STR in the stereoscopic video images SVC looks like a side wall SW extending in the depth direction between the object IMC and the OSD GEC. As a result, since the boundary between the object IMC and the OSD GEC is clearly seen, the viewer properly perceives the difference in depth therebetween.

As explained above, any of the processing A-C prevents that in stereoscopic video images (cf. the stereoscopic video images SVA-SVC) represented by a pair of video frames (cf. the pair of video frames FRL and FRR), such an area that is hidden behind an OSD (cf. the OSDs GEA-GEC) in one of the pair but not in the other (i.e., the area GHA shown in FIG. 32B) is generated in an object to be perceived in front of the OSD (cf. the objects IMA-IMC). As a result, even when the video/subtitles images of the content are to be displayed together with the OSD as stereoscopic images, it is possible to further improve the visibility of the OSD.

<Modifications>

(1) For the OSD processing A, it may be judged in advance whether the OSD is to be displayed nearer to the viewer than any of the objects displayed in the same view direction of the OSD. Further, the OSD processing A may be performed only when the judgment is negative.

(2) In the OSD processing C, the color of the strip added to the right and the left of the OSD is not limited to black. The color may be a mixture of two or more colors. Furthermore, the strip may be patterned.

(3) Similarly to the OSD control module 1647 in accordance with the second embodiment, the BD-J module 1645 may process the pop-up display such that the video/subtitles can be displayed together with the pop-up display stereoscopically.

(4) In the second embodiment, the OSD control module 1647 performs the processing A to C. Alternatively, the plane shift engine 178 or the adder 179 may perform the processing A to C.

(5) In the second embodiment, the playback device 100 may use a tuner to receive stream data for a stereoscopic video distributed via terrestrial broadcast, satellite broadcast or cable broadcast, and playback the received data similarly to the playback of AV stream files.

(6) According to the second embodiment, the excellent visibility of an OSD is maintained through the OSD processing A to C even when the OSD in stereoscopic video images is displayed in the view direction of an object in front of the depth of the OSD. Alternatively, an OSD plan shift amount may be determined such that an OSD in stereoscopic video images is displayed nearer to a viewer than any other objects to be displayed in the same view direction as the OSD. For example, the content provider finds out the depth of the object to be displayed the nearest to the viewer among the stereoscopic video images, and determines the OSD plane shift amount such that the OSD is seen in depth in front of the object. Here, if the display area of the OSD is limited, depths of objects in the stereoscopic video images may be checked only within the display area. The thus determined OSD plane shift amount is recoded in the index file, the object file, the playlist file, the clip information file, the AV stream file, or the XML file. In this case, the playback device first reads the OSD plane shift amount from the content, and then sets the amount to the plane shift engine 178. Alternatively, information indicating the depth of the object to be displayed the nearest in the stereoscopic video images may be recorded in the index file, the object file, the playlist file, the clip information file, the AV stream file, or the XML file. In this case, the playback device first reads the information from the content, next determines an OSD plane shift amount such that an OSD is to be seen in front of the depth indicated by the information, and then sets the amount to the plane shift engine 178.

The playback device may further cause the HDMI transmission unit 180 to notify the display device 200 of the OSD plane shift amount determined as above. In this case, the display device 200 uses the OSD plane shift amount for the plane shifting to display the OSD of the screen brightness setting screen or the like. As a result, it is possible to display the OSD in front of the objects in the stereoscopic video of the content. The HDMI transmission unit 180 may use a CEC (Consumer Electronics Control) wire in the HDMI cable 600. The communication with use of the CEC line will be mentioned in the explanation of the fourth embodiment.

(7) In the second embodiment, an OSD plane shift amount may be determined every time a graphics plane shift amount 535 is read from current playlist information, such that an OSD will be seen in front of the depth indicated by the graphics plane shift amount 535. In this case, it is unnecessary to perform one of the OSD processing A to C when the OSD is to be displayed in the view direction of a graphics image, particularly subtitles, represented by graphics streams.

Third Embodiment

Unlike the playback device in accordance with the first embodiment, the playback device in accordance with the third embodiment of the present invention is capable of allowing the user to manually adjust the depth of the OSD. The other features, such as the data structure on the optical disc, the hardware configuration of the playback device, and the structures of the control unit and the playback unit, are the same as those in the first embodiment. Thus, in the following, the explanations of the features of the first embodiment are hereby incorporated with reference.

The OSD control module 1647 generates graphics data GD2 of the corresponding OSD according to an operation signal UO or instructions from other modules 1644 and 1645, and passes the graphics data GD2 to the playback unit 170. After that, on elapse of a predetermined time, or on receipt of a new operation signal UO, or on receipt of instructions from other modules 1644 and 1645, the OSD control module 1647 sends an OSD deletion request RQ2 to the playback unit 170. According to the third embodiment, the OSD control module 1647 accepts from the user an instruction for changing the depth of the OSD in the period between the transmission of the graphics data GD2 and the transmission of the deletion request RQ2. To change the depth, the OSD control module 1647 decrements or increments the OSD plane shift amount by a predetermined amount every time the user presses a predetermined button on the remote control or on the control panel, which is similar to the case of changing the volume of sound, for example.

FIG. 36 is a flowchart showing the process for changing the OSD plane shift amount. This process is performed by the OSD control module 1647 in the period between the transmission of the OSD graphics data GD2 and the transmission of the deletion request RQ, that is, it is performed in Step S64 shown in FIG. 24. The following explains the process in the order of Steps shown in FIG. 36.

Step S100: The OSD control module 1647 measures the elapsed time from the transmission of the graphics data D2, and judges whether a predetermined time, e.g. five seconds, has elapsed from the transmission. The predetermined time may be changed depending on the type of the OSD. If judged that the predetermined has elapsed, the process advances to Step S107. If judged not, the process advances to Step S101.

Step S101: The OSD control module 1647 checks whether a new operation signal UO has been received from the dispatcher 1643A, and whether an instruction in accordance with an application program has been received from the HDMV module 1644 or the BD-J module 1645. If either the operation signal UO or the instruction has been received, the process advances to Step S102. If neither of them has been received, the process will be repeated from Step S100.

Step S102: The OSD control module 1647 judges whether or not the operation signal UO or the instruction indicates the change of the depth of the OSD. If judged affirmatively, the process advances to Step S103. If judged negatively, the process advances to Step S105.

Step S103: The OSD control module 1647 judges the direction of changing the OSD depth indicated by the operation signal UO or the instruction. If the direction of changing is the direction of pulling out the OSD from the screen, the OSD control module 1647 increase the OSD plane shift amount OSL for the left-view video frame by a predetermined amount, and decreases the OSD plane shift amount OSR for the right-view video frame by a predetermined amount. The displacements OSL and OSR are shown in FIG. 23. If the direction of changing is the direction of pushing back the OSD to the screen, the OSD control module decreases the OSD plane shift amount OSL and increases the OSD plane shift amount OSR in the same manner. Here, the amounts of the decrease and the increase are equal. After that, the process advances to Step S104.

Step S104: The OSD control module 1647 passes the OSD plane shift amount, which has been changed, to the plane shift engine 178. After that, the process advances to Step S106. Meanwhile, the plane shift engine 178 performs the plane shifting on the OSD plane written in the OSD plane memory 177A by using the OSD plane shift amount which has been changed. As a result, the viewer perceives that the depth of the OSD is changed in the direction indicated by the instruction.

Step S105: The operation signal UO, which has been subject to the judgment by the OSD control module 1647 in Step S102, has also been given from the dispatcher 1643A to the HDMV module 1644 or the BD-J module 1645 whichever assigned with the dynamic scenario information at the moment. The instruction from the application program, which has been subject to the judgment by the OSD control module 1647 in Step S102, reflects the process performed by the module 1644 or 1645 that has been executing the program. That is, when the operation signal UO or the instruction is not for changing the depth of the OSD, the module 1644 or 1645 performs the process corresponding thereto. After that, the process advances to Step S106.

Step S106: The OSD control module 1647 accesses the HDMV module 1644 or the BD-J module 1645, and checks whether it is necessary to wait for a new user operation or new instruction from the application program. If it is necessary, the processing will be repeated from Step S100. If not, the process advances to Step S107.

Step S107: OSD control module 1647 sends an OSD deletion request RQ2 to the rendering engine 175. After that, the process advances to Step S65 shown in FIG. 24.

Like the playback device according to the first embodiment, the playback device according to the third embodiment displays the video images of the content as 2D images while displaying OSDs as stereoscopic images on the display device 200. This can improve the visibility of the OSDs. Moreover, it allows a user to manually adjust the depth of the OSDs as explained above. This makes it possible to suit the visibility of the OSDs to the user's taste.

<Modifications>

(1) The OSD control module 1647 may save the changed OSD plane shift amount in a non-volatile storage device included in the playback device 100, such as in the local storage 120. With this structure, the changed OSD plane shift amount will not be lost when the playback device 100 is turned off. This enables the playback device 100 to reproduce the depth of the OSD which has been adjusted.

(2) Similarly to the playback device in accordance with the second embodiment, the playback device in accordance with the third embodiment may be provide with an operation mode for stereoscopically displaying the video/subtitles of the content together with an OSD. In this operation mode, the OSD processing in accordance with the second embodiment may be performed when the changed OSD depth is less than the depth of the subtitles indicated by the graphics plane shift amount.

(3) In the third embodiment, the playback device 100 may use a tuner to receive stream data for a stereoscopic video distributed via terrestrial broadcast, satellite broadcast or cable broadcast, and playback the received data similarly to the playback of AV stream files.

Fourth Embodiment

Similarly to the playback device 200 shown in FIG. 1, a display device in accordance with the fourth embodiment of the present invention constitutes a stereoscopic video display system, together with the playback device 100, the liquid crystal shutter glasses 300, the remote control 400 and the optical disc 500 in accordance with the first embodiment. The display device of the fourth embodiment is also capable of receiving terrestrial broadcast, satellite broadcast or cable broadcast, and playing back a stereoscopic vide from distributed stream data.

A display device in accordance with the fourth embodiment is, for example, a liquid crystal display. Alternatively, it may be a flat panel display such as a plasma display and an organic EL display, or a projector. Similarly to the display device 200 shown in FIG. 1, the display device is connected to the playback device 100 via the HDMI cable 600. When the playback device 100 plays back the stereoscopic video content from the optical disc 500, the display device receives video/audio signals in the HDMI format from the playback device 100 via the HDMI cable 600. The display device is further connected to an antenna. The display device demodulates video/audio signals for stereoscopic video images from broadcast waves received via the antenna. The display device reproduces video images on the screen and generates sounds from a built-in speaker, according to the video/audio signals from the playback device 100 or the antenna. In particular, since both left-view and right view video frames are time-division multiplexed into the video signals, left-view and right-view video images are alternately reproduced on the screen 201. Meanwhile, the display device sends a left-right signal LR to the liquid crystal glasses 300. The waveform of the left-right signal LR changes in synchronization with the frame switching. As a result, the liquid crystal glasses 300 causes the two liquid crystal display panels 301L and 301R to transmit lights in synchronization with the frame switching. Thus the viewer wearing the liquid crystal glasses 300 perceives a stereoscopic video from the left-view and right-view images alternately displayed on the screen.

<Hardware Configuration of Display Device>

FIG. 37 is a block diagram showing a hardware configuration of a display device 210 in accordance with the fourth embodiment. As shown in FIG. 37, the display device 210 includes a tuner 211, an HDMI terminal 212, an HDMI receiving unit 213, a CEC interface unit 214, a operation unit 215, a left-right signal transmission unit 216, a bus 217, a control unit 216, a signal processing unit 219, a display unit 220 and an audio output unit 221. The tuner 211, the HDMI receiving unit 213, the CEC interface unit 214, the operation unit 215, the left-right signal transmission unit 216 and the signal processing unit 219 can communicate with the control unit 218 via the bus 217.

The tuner 211 is connected to an antenna AT. The tuner 211 receives broadcast waves, such as terrestrial broadcast waves or satellite broadcast waves, via the antenna AT. The tuner demodulates video/audio stream data STD1 from the broadcast waves, and directly passes the stream data STD1 to the signal processing unit 217. Note that the tuner 211 may be connected to a cable broadcast station and receive cable broadcast waves from it.

The HDMI terminal 212 complies with the HDMI standards, and is connected to the playback device 100 via the HDMI cable 600. The HDMI terminal 212 receives video/audio signals from the playback device 100 via the HDMI cable 600, and passes them to the HDMI receiving unit 213. Meanwhile, the HDMI terminal 212 receives a control signal, namely a CEC message, from the playback device 100 via the CEC line in the HDMI cable 600, and passes the CEC massage to the CEC interface 214.

The HDMI receiving unit 213 converts the video/audio signals received from the HDMI terminal 212 into video/audio streams STD2. Each of the streams STD2 is passed directly to the signal processing unit 217.

The CEC interface unit 214 decodes the CEC message received from the HDMI terminal 212, and passes the decoded result to the control unit 218 via the bus 218. The CEC message includes a "VSC" (Vendor Specific Command), in particular. The CEC interface unit 214 extracts a VSC from the CEC message, and reads the OSD plane shift amount therefrom. The CEC interface unit 214 passes the OSD plane shift amount to the control unit 218.

The communication function with use of the CEC line is standardized in the HDMI standards version 1.2a. A plurality of electronic devices connected together via an HDMI cable exchange CEC messages through a CEC line in the cable. Thus, the electronic devices are coordinated together. VSCs are instructions used by the vendors of the electronic devices to provide unique coordination functions to their devices. An electronic device that can use VSCs stores a vendor ID therein. The vendor ID is a unique identifier assigned to the vendor of the electronic device. By exchanging VSCs with other electronics devices, each electronic device identifies the devices that have the same vendor ID as its own vendor ID. After that, VSCs are exchanged among only the devices of the same vendor. The coordination function unique to the vendor is thus realized.

Figure 38:
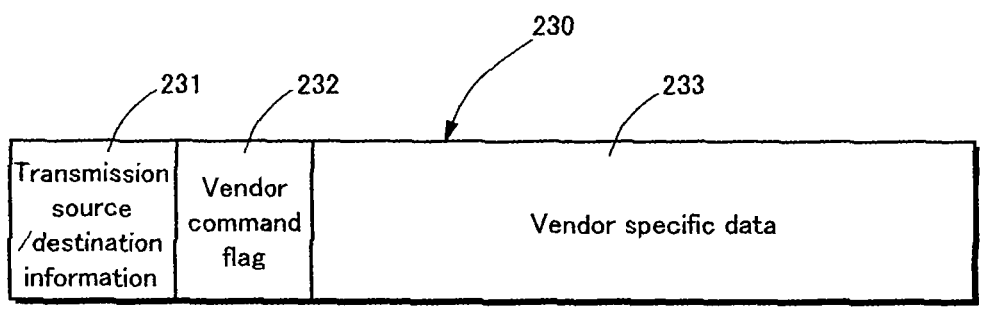
FIG. 38 is a schematic diagram showing the format of Vendor Specific Command (VSC)

FIG. 38 is a schematic diagram showing the format of a VSC 230. As shown in FIG. 38, the VSC 230 includes transmission source/destination information 231, a vendor command flag 232 and a vendor specific data 233 in this order from the top. The transmission source/destination information 231 and the vendor command flag 232 are contained not only in VSCs, but are generally contained in CEC messages in common. The transmission source/destination information 231 is one-byte data, and indicates the transmission source and destination of the CEC message. The vendor command flag 232 is one-byte data, and is consisted of a group of flags each showing a CEC message type. In the vendor order flag 232 of the VSC 230, a flag indicating that the message is a VSC is on in particular. The vendor specific data 233 is a variable-length data having a length in the range from 1 byte to 14 bytes. The data structure of the vendor specific data 233 is defined as a payload of the VSC 230, by the vendor of the electronic device. The playback device 100 records the OSD plane shift amount into the vendor specific data 233. When extracting the VSC 230, the CEC interface unit 214 reads the OSD plane shift amount from the vendor specific data 233.

See FIG. 37 again. The CEC interface unit 214 receives an instruction from the control unit 218 via the bus 217, generates a CEC message according to the instruction, and passes the message to the playback device 100 via the HDMI terminal 212. Thus, when the playback device 100 or the display device 210 is started up, the playback device 100 is notified of, for example, the type of the output scheme, the encoding scheme of the video/audio signals supported by the display device 210, and, in particular, the type of a stereoscopic video display scheme supported by the display device 210.

The operation unit receives and decodes a command IR sent from the remote control 400 by radio, such as by infrared rays, and notifies the control unit 218 of the details of the command IR. The operation unit 215 also detects pressing of a button provided on the front panel of the display device 210, and notifies the control unit 218 of the pressing.

The left-right signal transmission unit 216 sends a left-right signal LR to the liquid crystal shutter glasses 300 by infrared rays or by radio. The left-right signal LR indicates whether the video displayed on the screen 201 at the moment is for the left eye or for the right eye. The left-right signal transmission unit 216 distinguishes between the left-view video frame and the right-view video frame outputted from the processing unit 219 to the display unit 220, by accessing the signal processing unit 210 via the bus 217. The left-right signal transmission unit 216 uses the result of the distinguishing to synchronize the switching of the waveform of the left-right signal LR with the frame switching.

The control unit 218 is a microcomputer system, and includes a CPU 218A, a ROM 218B and a RAM 218C which are connected to each other via an internal bus 218D. The ROM 218B stores therein the firmware of the display device 210. The CPU 218A reads the firmware from the ROM 218B in response to, for example, the power on. The RAM 218C provides a work area for the CPU 218A. The control unit 218 executes the firmware and the application program by using the combinations of the components 218A-218C, and controls the other components 211-216 and 219 accordingly The control unit 218 accesses the signal processing unit 219 to check the display dimensions of the stream data given from the tuner 211 or the HDMI receiving unit 212 to the signal processing unit 219. When the display dimensions are "2D", the control unit 218 disables the left-right signal transmission unit 216. When the display dimensions are "3D", the control unit 218 enables the left-right signal transmission unit 216.

The control unit 218 is further equipped with an OSD function unique to the control unit 218. OSDs according to this function include, for example, screens similar to the screen G4 for setting the brightness of the screen shown in FIG. 13D shows and the screen G5 for setting the volume of sound shown in FIG. 13E. In response to the user operation received by the operation unit 215, the control unit 218 generates graphics data for the corresponding OSD, and passes the graphics data to the signal processing unit 219 via the bus 217. In particular, when the display dimensions are "3D", the control unit 218 beforehand receives the OSD plane shift amount from the CEC interface unit 214 and passes the amount to the signal processing unit 210. When receiving a user operation while the display dimensions are being kept "3D", the control unit 218 first causes the signal processing unit 219 to change the display dimensions to "pseudo 2D". Next, the control unit 218 generates graphics data for the OSD corresponding to the operation, and passes the graphics data to the signal processing unit 219. The operations of the signal processing unit 219 when the display dimensions are changed to "pseudo 2D" will be explained below.

After sending the graphics data for the OSD, the control unit 218 sends an OSD deletion request to the signal processing unit 219 in response to an elapse of a predetermined time or a user operation. While transmitting the deletion request, the control unit causes the signal processing unit 219 to returns the display dimensions to "3D". Thus the control unit 218 causes the signal processing unit 210 to keep the display dimensions at "pseudo 2D" while outputting the OSD on the screen.

When receiving stream data from the tuner 211 or the HDMI receiving unit 212, the signal processing unit 219 first separates a video stream, an audio stream, a synchronization signal and accompanying data therefrom. Next, the signal processing unit 219 analyzes the accompanying data to check whether the display dimensions of the received video stream are "2D" or "3D". If the display dimensions are "2D", the signal processing unit 219 sequentially uses the video frames contained in the video stream, as video planes. If the display dimensions are "3D", it shows that left-view and right view video frames has been alternately time-division multiplexed in the video stream. The signal processing unit 219 uses the left-view and right-view video frames alternately, as the video planes. Video data VD is generated from the video planes, and is outputted to the display unit 220 together with the synchronization signal SYNC. As a result, the video images represented by the video data VD are reproduced as stereoscopic video images. Meanwhile, together with the output of them, audio data AD is generated from the audio stream, and is outputted to the audio output unit 221. The signal processing unit 210 also analyzes the accompanying data to check whether the generated video plane is for the left eye or the right eye, and stores the result together with the display dimensions, into the built-in memory.

The processing unit 219 is capable of changing display dimensions to "pseudo 2D" in response to an instruction from the control unit 218. If the display dimensions are "pseudo 2D", although left-view and right-view video frames have been alternately multiplexed into the video stream, the signal processing unit 219 uses each left-view video frame twice as a video plane, and discards right-view video frames. Thus, only left-view video planes are generated while the display dimensions are "pseudo 2D".

If display dimensions are "3D", the signal processing unit 219 has been provided an OSD plane shift amount from the control unit 218 in advance. When the display dimensions are switched from "3D" to "pseudo 2D", the signal processing unit 219 first receives graphics data for an OSD from the control unit 218, and generates an OSD plane from the graphics data. Next, the signal processing unit 219 performs the plane shifting on the OSD plane by using the OSD plane shift amount. Thus, left-view and right-view OSD planes having the OSD at different display locations in the horizontal direction are alternately generated. Furthermore, the signal processing unit 219 alternately combines the left-view and right-view OSD planes with the same left-view video planes. Left-view and right-view video frames thus combined are alternately outputted to the display unit 220. As a result, the OSD is reproduced as a stereoscopic image, whereas the video images represented by the video stream are reproduced as 2D images.

The control unit 218 and the signal processing unit 219 are implemented on separate chips. Alternatively, they may be implemented on a single chip. The details of the signal processing unit 219 will be explained below.

The display unit 220 includes a liquid crystal display panel. The display unit 220 adjusts the brightness of the liquid display panel in units of pixels, according to the video frames contained in the video data VD. Thus, the video images represented by the video frames are reproduced on the display panel.

The audio output unit 221 includes a speaker. The audio output unit 221 converts the audio data AD into an audio signal in the output format that is suitable for the speaker, and sends the audio signal to the speaker. As a result, sound represented by the audio data AD is outputted from the speaker. Note that the audio signal may be outputted to an amplifier or a speaker of a surround system or the like externally attached to the display device 210.

<Details of Signal Processing Unit 219>

Figure 39:
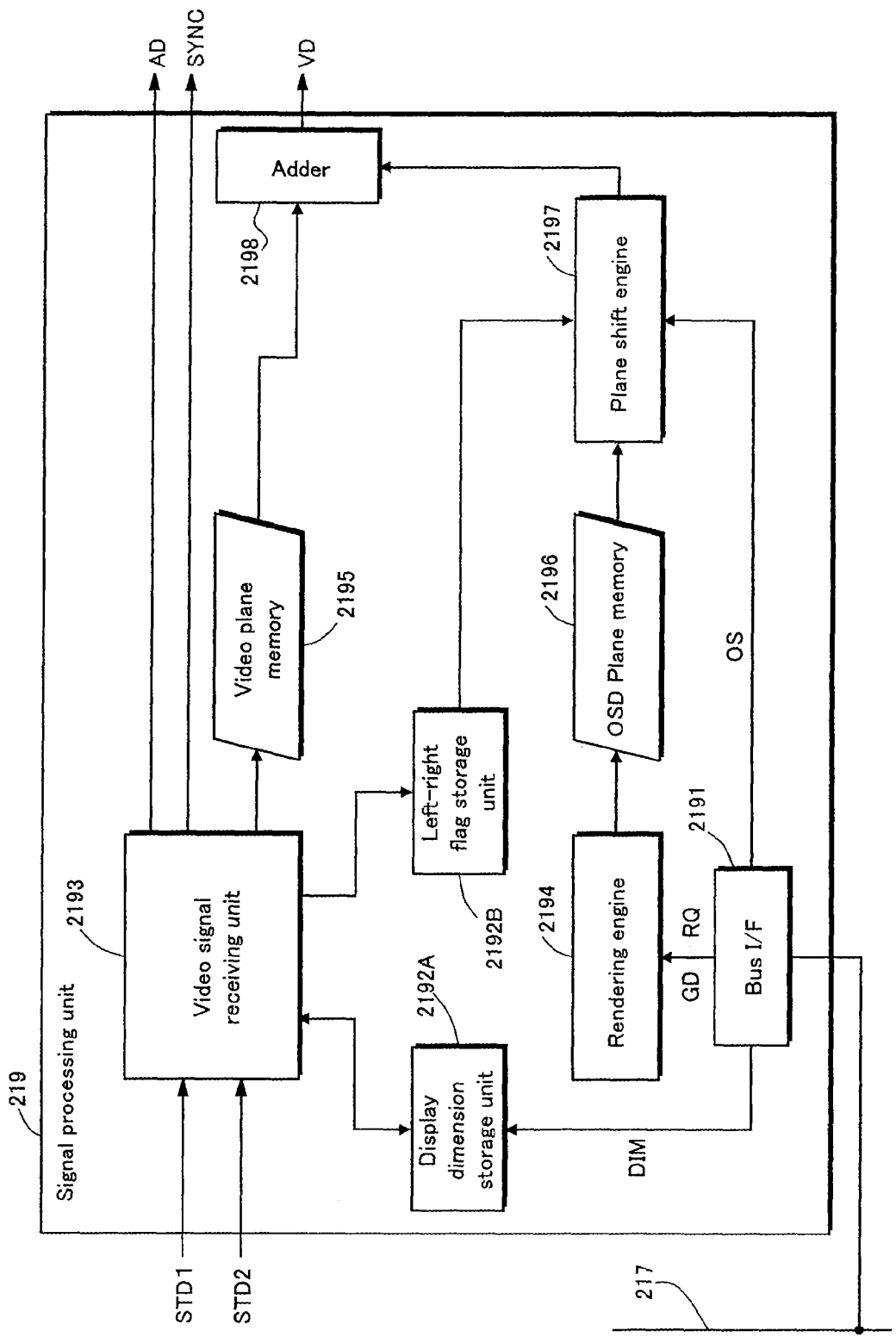
FIG. 39 is a functional block diagram of the signal processing unit shown in FIG. 37.

FIG. 39 is a functional block diagram of the signal processing unit 219. As shown in FIG. 39, the signal processing unit 219 includes a bus interface 2191, a display dimension storage unit 2192A, a left-right flag storage unit 2192B, a video signal receiving unit 2193, a rendering engine 2194, a video plane memory 2195, an OSD plane memory 2196, a plane shift engine 2197 and an adder 2198. These functional units are implemented on a single chip. Alternatively, some of the functional units may be implemented on a different chip.

The bus interface 2191 connects the functional units in the signal processing unit 210 to the control unit 218 via the bus 217 such that they can communicate with each other.

The display dimension storage unit 2192A stores flags showing the display dimensions in a rewritable manner. The flags include one indicating that the display dimensions are "2D", one indicating that the display dimensions are "3D" and one indicating that the display dimensions are "pseudo 2D". The display dimension storage unit 2192A sets the flag corresponding to the display dimensions as instructed from the video signal receiving unit 2193, and clears the other flags. Also, at receipt of each dimension signal DIM from the control unit 218 via the bus interface 2191 and the bus 217, the display dimension storage unit 2192A sets the flag corresponding to the display dimensions indicated by the dimension signal DIM, and clears the other flags.

The left-right flag storage unit 2192B stores the left-right flag in a rewritable manner. The left-right flag shows which between for the left eye and for the right eye the video plane to be outputted from the video signal receiving unit 2193 to the video plane memory 2195 is. For example, when the left-right flag is on, it shows that the video plane is for the left eye, and when the left-right flag is off, it shows that the video plane is for the right eye. The left-right flag storage unit 2192B sets the left-right flag when notified of "the video plane is for the left eye" by the video signal receiving unit 2193, and cancels the left-right flag when notified of "the video plane is for the right eye".

The video signal receiving unit 2193 receives stream data from the tuner 211 or the HDMI receiving unit 212. The video signal receiving unit first separates a video stream, an audio stream a synchronization signal and accompanying data from the stream data. Next, the video signal receiving unit 2193 analyzes the accompanying data to check whether the display dimensions of the received video stream are "2D" or "3D". The display dimensions found by the analysis is notified to the display dimension storage unit 2192A.

As explained below, the video signal receiving unit 2193 is operable in three operation modes separately used for different display dimensions, namely "2D display mode", "3D display mode", and "pseudo 2D display mode".

When the display dimensions are "2D", the video signal receiving unit 2193 switches to the "2D display mode". In the 2D display mode, the video signal receiving unit 2193 sequentially writes video frames contained in the video stream into the video plane memory 2195.

When the display dimensions are "3D", the video signal receiving unit 2193 switches to the "3D display mode". Here, in the video stream, left-view and right-view video frames have been alternately time-division multiplexed. In the 3D display mode, the video signal receiving unit 2193 accesses the display dimension storage unit 2192A every time it extracts a single video frame, to check the display dimensions. If the display dimensions are being kept 3D, the video signal receiving unit 2193 writes the video frames into the video plane memory 2195 without change. The video signal receiving unit 2193 analyzes the accompanying data to identify whether the video frame is for the left eye or for the right eye, and notifies left-right flag storage unit 2192B of the result. The video signal receiving unit 2193 repeats the series of operations for each video frame. As a result, the left-view ad right-view video frames are alternately written into the video plane memory 2196 while the display dimensions are being kept 3D.

On the other hand, if the display dimensions have been changed to pseudo 2D, the video signal receiving unit 2193 sifts from the "3D display mode" to the "pseudo 2D display mode". In the pseudo 2D display mode, the video signal receiving unit 2193 first analyzes the accompanying data, and identifies whether the video frame extracted from the video stream is for the left eye or for the right eye. If the video frame is for the left eye, the video signal receiving unit 2193 writes the video frame into the plane memory 2195 without change. On the contrary, if the video frame is to be visible to the right eye, the video signal receiving unit 2193 discards the video frame. Thus only left-view video frames are written into the video plane memory 2195 while the display dimensions are being kept pseudo 2D. Note that the video signal receiving unit 2193 notifies the left-right flag storage unit 2192B of the result of the identification from the accompanying data, without change. Thus, every time a single video frame is extracted from the video stream, the left-right flag storage unit 2192B flips the left-right flag regardless of whether the video frame has been written into the video plane memory 2195.

The video signal receiving unit 2193 also extracts audio data AD from the audio stream, and outputs it together with a synchronization signal SYNC.

The rendering engine 2194 receives graphics data GD for an OSD from the control unit 218, and generates an OSD plane by using it, and writes the OSD plane into the OSD plane memory 2196. The rendering engine 2194 also deletes an OSD plane on the OSD plane memory 2196 when receiving an OSD deletion request RQ from the control unit 218.

The video plane memory 2195 and the OSD plane memory 2196 are each a two-dimensionally arrayed data area secured in the built-in memory of the signal processing unit 219. The size of each array is equal to the size of a single video frame. Each element of the array stores a single pixel data piece. Each pixel data piece is consisted of the combination of a color coordinate value and an a value (opacity). The color coordinate value is represented as an RGB value or a YCrCb value. On the video plane memory 2195, a single video plane is constructed from video frames written by the video signal receiving unit 2193. On the OSD plane memory 2196, a single OSD plane including an OSD is constructed from the graphics data GD.

The plane shift engine 2197 receives an OSD plane shift amount OS from the control unit 218, and performs the plane shifting on the OSD plane memory 2196 by using it. The OSD plane shift amount OS is saved in the built-in memory of the plane shirt engine 2197. The explanation of the plane shifting of the first embodiment is hereby incorporated with reference.

When the display dimension storage unit 2192A changes the display dimensions to 3D in response to an instruction from the video signal receiving unit 2193, the plane shift engine 2197 receives the OSD plane shift amount OS. After that, every time a single OSD plane is written into the OSD plane memory 2196, the plane shift engine 2197 performs the plane shifting on the OSD plane by using the OSD plane shift amount OS. Thus, left-view and right-view OSD planes having an OSD at different display locations in the horizontal direction are generated and alternately outputted from the plane shift engine 2197 to the adder 2198.

After that, the rendering engine 2194 deletes an OSD plane on the OSD plane memory 2196 in response to an OSD deletion request RQ from the control unit 218. The OSD is thus deleted from the screen. Thereafter, the plane shift engine 2197 pauses the plane shifting on the OSD plane and waits until the rendering engine 2194 generates a new OSD plane.

While the display dimensions are being kept pseudo 2D, the adder 2198 generates a single video frame by combining a single OSD plane outputted from the plane shift engine 2197 with a single video plane outputted from the video plane memory 2195. Furthermore, video data VD is constructed from the video frame, and outputted to the display unit 220. The adder 2198 particularly combines left-view and right-view OSD planes outputted from the plane shift engine 2197 with the same left-view video planes. Left-view and right-view video frames thus combined are alternately outputted from the adder 2198 to the display unit 220.

As explained above, in the display device 210 according to the fourth embodiment, the video signal receiving unit 2193 is operable in two types of operation modes, namely the 3D display mode and the pseudo 2D display mode, for outputting video frames. Furthermore, while an OSD is being outputted on the screen, the video signal receiving unit 2193 switches to the pseudo 2D display mode, and one of the pair of left-view and right-view video frames is repeatedly outputted. Thus, while the OSD is being stereoscopically displayed on the screen, the video images represented by the video frames are two-dimensionally displayed. This can further improve the visibility of the OSD.

<Modification>

(1) The display device 210 may be connected to the playback device in accordance with the modification (6) of the second embodiment via, for example, an HDMI cable, and acquire from the playback device an OSD plane shift amount used for displaying the OSD as if it is nearer to the viewer than any of the objects in the stereoscopic video of the content, at least in the same view direction. The display device 210 uses the OSD plane shift amount for the plane shifting to stereoscopically display a specific OSD such as a screen for setting the screen brightness. In this regard, the display device 210 may change the OSD plane shift amount such that the OSD will be displayed still nearer to the viewer. As a result, it is possible to display the OSD as if it is nearer to the viewer than any of the objects in the stereoscopic video of the content.

(2) According to the forth embodiment, only OSDs are displayed as stereoscopic images while the display dimensions are being kept pseudo 2D. Alternatively, while the display dimensions are being kept pseudo 2D, the OSD plane shift amount may be set to 0 so that OSDs are also displayed as 2D images. Even in this case, since the video/subtitles images of the content are displayed as 2D images, the visibility of the OSDs will not be degraded. Moreover, viewers not wearing liquid crystal shutter glasses can see screen displays, in particular, OSDs.

(3) According to the forth embodiment, the HDMI cable 600 is used for transmitting stream data from the playback device 100 to the display device 210. The CEC line of the HDMI cable 600 is used for transmitting the OSD plane shift amount from the playback device 100 to the display device 210. Alternatively, when the playback device 100 and the display device 210 have a communication function such as IrDA, Bluetooth™, or a TCP/IP, the playback device 100 and the display device 210 may use the communication function to transmit the stream data and the OSD plane shift amount.

INDUSTRIAL APPLICABILITY

The present invention relates to playback and display technologies for stereoscopic videos. When outputting an OSD and a pop-up display, the present invention switches the video plane generation unit from the 3D display mode to the pseudo 2D display mode or processes the OSD, as explained above. Thus, it is clear that the present invention is industrially applicable.

What is claimed is:

1. A playback method, comprising:
presenting graphics data on a graphics plane;
shifting the graphics plane based on first offset data to produce a first shifted graphics plane;
shifting the graphics plane based on second offset data to produce a second shifted graphics plane, a shift magnitude of the first shifted graphics plane being equal to a shift magnitude of the second shifted graphics plane, a shift direction of the first shifted graphics plane being opposite a shift direction of the second shifted graphics plane; and
presenting video data on a video plane;
wherein the video data of the video plane and graphics data of the first shifted graphics plane are overlaid to provide one frame for a left-eye output, and
wherein the video data of the video plane and graphics data of the second shifted graphics plane are overlaid to provide another frame for a right-eye output.

2. The playback method according to claim 1,
wherein the graphics data of the first shifted graphics plane and the graphics data of the second shifted graphics plane provide a pop-up graphics effect,
wherein the video data of the video plane for the left-eye output and for the right-eye output provide a monoscopic video effect,
wherein the video plane is one of a first video plane and a second video plane, and
wherein the video data of the one of the first video plane and the second video plane and second video data of an other of the first video plane and the second video plane provide a stereoscopic video effect.

3. The playback method according to claim 2,
wherein the pop-up graphics effect and the stereoscopic video effect are not provided at a same time, and
wherein, when the video data of the video plane and the graphics data of the first shifted graphics plane are overlaid to provide the left-eye output, the second video data of the other of the first video plane and the second video plane, instead of the video data of the video plane, and the graphics data of the second shifted graphics plane are not overlaid to provide the right-eye output.

4. The playback method according to claim 1,
wherein the graphics data is for a menu screen.

5. A playback method, comprising:
presenting graphics data on a graphics plane;
shifting the graphics plane based on first offset data having a first magnitude and a first shift direction;
shifting the graphics plane based on second offset data having a second magnitude and a second shift direction, the first magnitude being identical to the second magnitude, the first shift direction being opposite to the second shift direction;
presenting video data on a video plane; and
outputting a first frame for a left eye and a second frame for a right eye;
wherein data from the video plane and data from the graphics plane shifted based on the first offset data are overlaid to output the first frame for the left eye,
wherein the data from the video plane and data from the graphics plane shifted based on the second offset data are overlaid to output the second frame for the right eye, and
wherein timing of output is different between the first frame and the second frame.

6. A playback apparatus, comprising:
a graphics presenter that presents graphics data on a graphics plane;
a shifter that shifts the graphics plane based on first offset data to produce a first shifted graphics plane and that shifts the graphics plane based on second offset data to produce a second shifted graphics plane, a shift magnitude of the first shifted graphics plane being equal to a shift magnitude of the second shifted graphics plane, a shift direction of the first shifted graphics plane being opposite a shift direction of the second shifted graphics plane; and
a video presenter that presents video data on a video plane,
wherein the video data of the video plane and graphics data of the first shifted graphics plane are overlaid to provide one frame for a left-eye output, and wherein the video data of the video plane and graphics data of the second shifted graphics plane are overlaid to provide another frame for a right-eye output.

7. A playback apparatus, comprising:

a graphics presenter that presents graphics data on a graphics plane;

a shifter that shifts the graphics plane based on first offset data having a first magnitude and a first shift direction and that shifts the graphics plane based on second offset data having a second magnitude and a second shift direction, the first magnitude being identical to the second magnitude, the first shift direction being opposite to the second shift direction;

a video presenter that presents video data on a video plane; and an outputter that outputs a first frame for a left eye and a second frame for a right eye, wherein data from the video plane and data from the graphics plane shifted based on the first offset data are overlaid to output the first frame for the left eye, wherein data from the video plane and data from the graphics plane shifted based on the second offset data are overlaid to output the second frame for the right eye, and wherein timing of output is different between the first frame and the second frame.

* * * * *